(12) United States Patent
Boothroyd

(10) Patent No.: US 7,690,794 B2
(45) Date of Patent: Apr. 6, 2010

(54) IMAGE-COMBINING DEVICE AND PROJECTION DISPLAY APPARATUS HAVING IMAGE-COMBINING DEVICES INCORPORATED THEREIN

(75) Inventor: Simon Andrew Boothroyd, 1679 Country Walk Drive, Ottawa, ON (CA) K1C 8E1

(73) Assignee: Simon Andrew Boothroyd, Ottawa, ON (CA)

( * ) Notice: Subject to any disclaimer, the term of this patent is extended or adjusted under 35 U.S.C. 154(b) by 515 days.

(21) Appl. No.: 11/770,247

(22) Filed: Jun. 28, 2007

(65) Prior Publication Data
US 2008/0180636 A1 Jul. 31, 2008

Related U.S. Application Data

(60) Provisional application No. 60/806,474, filed on Jul. 2, 2006.

(51) Int. Cl.
*G03B 21/14* (2006.01)

(52) U.S. Cl. ............................ 353/20; 353/31; 359/464; 348/58; 349/9

(58) Field of Classification Search ................ 353/8, 353/20, 31, 34, 94; 359/464, 465, 472; 348/54, 348/58; 349/5, 8, 9
See application file for complete search history.

(56) References Cited

U.S. PATENT DOCUMENTS

| | | | |
|---|---|---|---|
| 2,958,258 A | 11/1960 | Kelly | |
| 4,127,322 A | 11/1978 | Jacobson et al. | |
| 4,345,258 A | 8/1982 | Tsai et al. | |
| 4,647,966 A | 3/1987 | Phillips et al. | |
| 5,121,983 A | 6/1992 | Lee | |
| 5,517,340 A | 5/1996 | Doany et al. | |
| 5,982,541 A | 11/1999 | Li et al. | |
| 6,672,722 B2 | 1/2004 | O'Connor et al. | |
| 6,840,624 B2 | 1/2005 | Yoneyama et al. | |
| 6,919,990 B2 | 7/2005 | Anikitchev et al. | |
| 7,059,725 B2 * | 6/2006 | Hirata et al. | 353/81 |
| 7,059,728 B2 | 6/2006 | Alasaarela et al. | |
| 7,192,139 B2 | 3/2007 | Drazic et al. | |
| 7,204,592 B2 | 4/2007 | O'Donnell et al. | |
| 7,553,024 B2 * | 6/2009 | Ouchi et al. | 353/20 |
| 2002/0190922 A1 | 12/2002 | Tsao | |
| 2003/0020809 A1 * | 1/2003 | Gibbon et al. | 348/51 |
| 2003/0112507 A1 | 6/2003 | Divelbiss et al. | |
| 2005/0141076 A1 | 6/2005 | Bausenwein | |
| 2006/0290889 A1 | 12/2006 | Robinson et al. | |

FOREIGN PATENT DOCUMENTS

| | | |
|---|---|---|
| CA | 2183188 | 2/1998 |
| EP | 0 541 374 | 5/1993 |

* cited by examiner

*Primary Examiner*—Kevin Pyo
(74) *Attorney, Agent, or Firm*—Marks & Clerk; Richard J. Mitchell

(57) ABSTRACT

An image-combining device comprising of a polarizing beam-splitter, two waveplates and two reflective micro-electro-mechanical display panels is described. It combines images with orthogonally polarized light. Projection display apparatus having such image-combining device(s) are used to project two-dimensional or three-dimensional images with orthogonally polarized light.

30 Claims, 40 Drawing Sheets

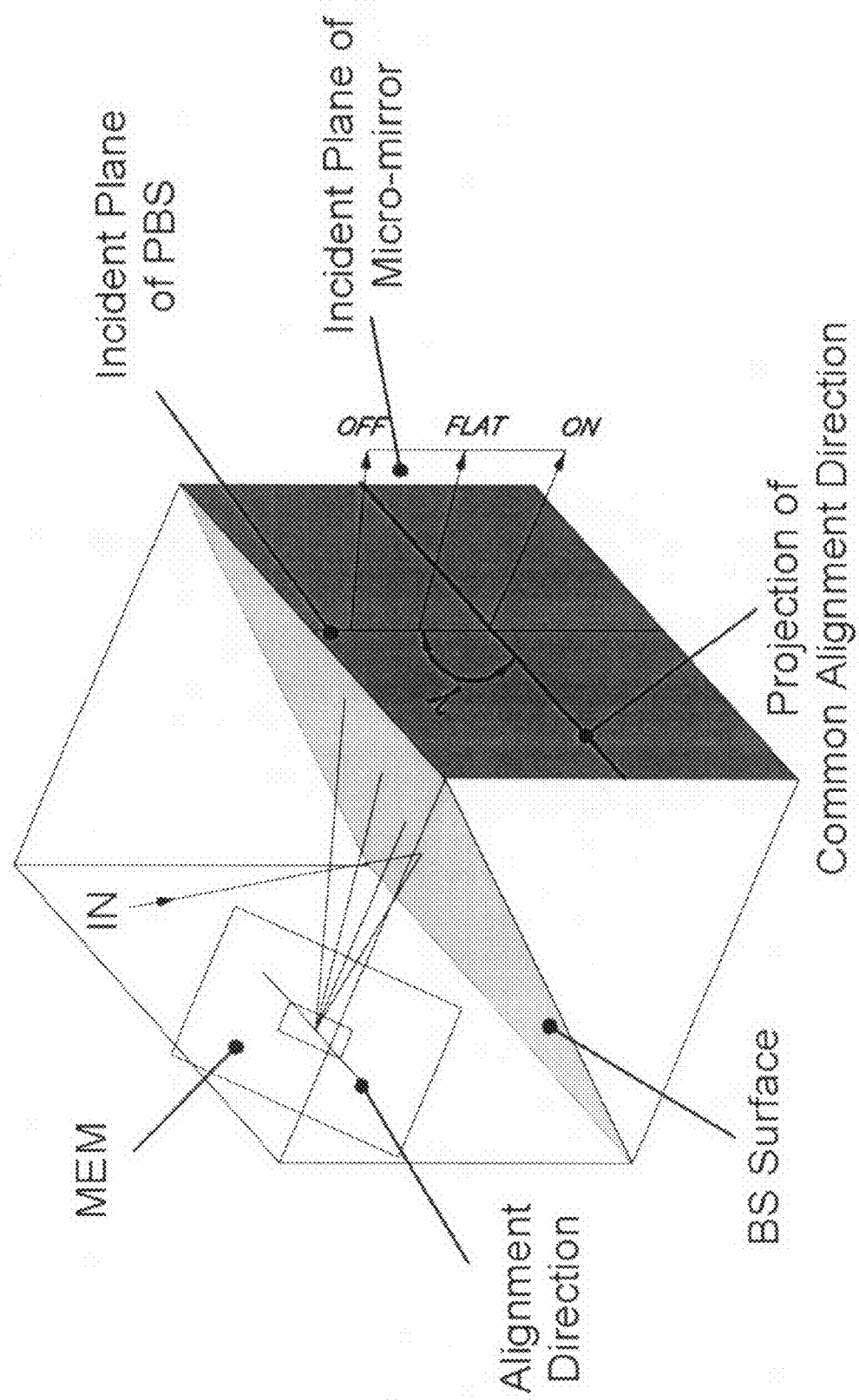

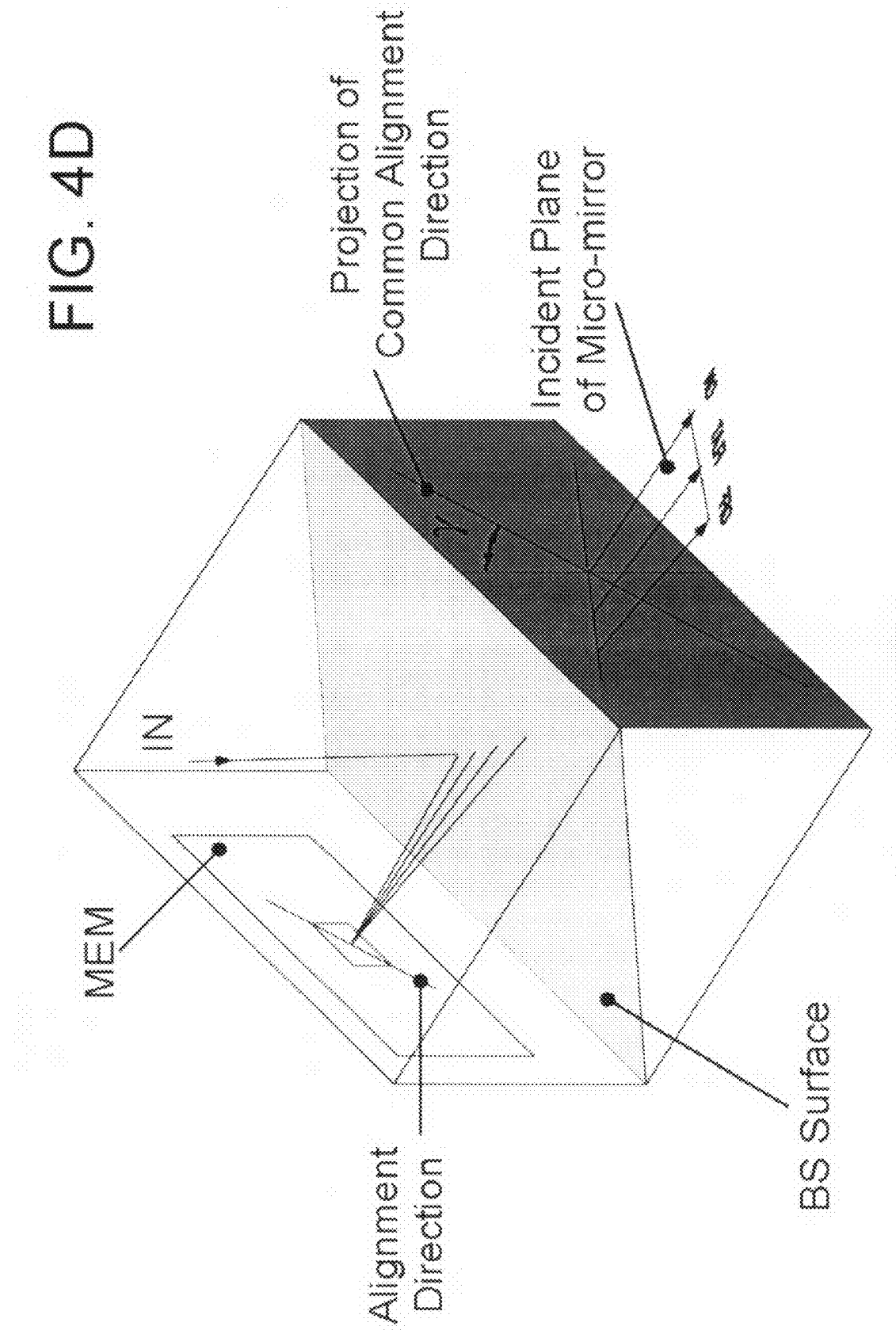

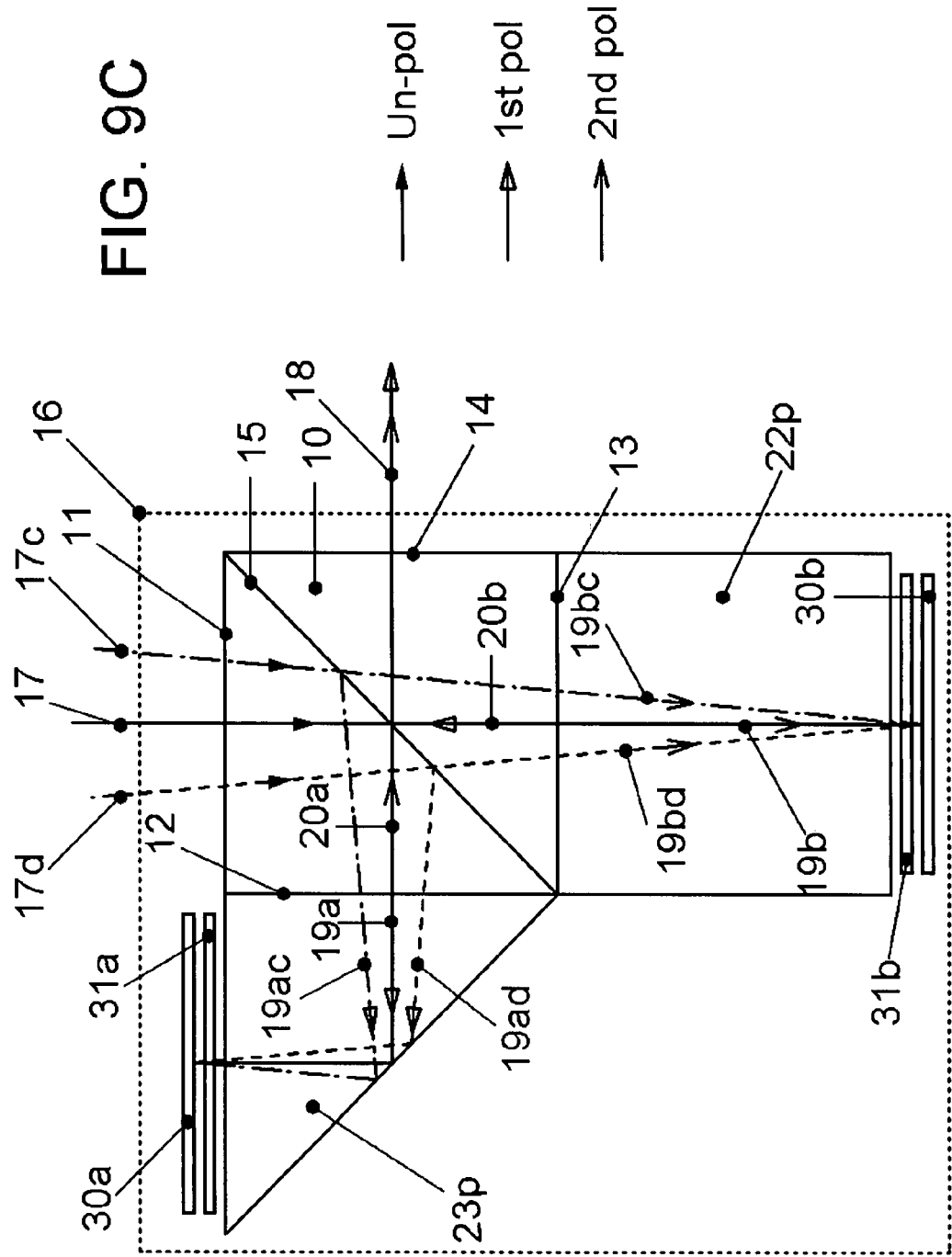

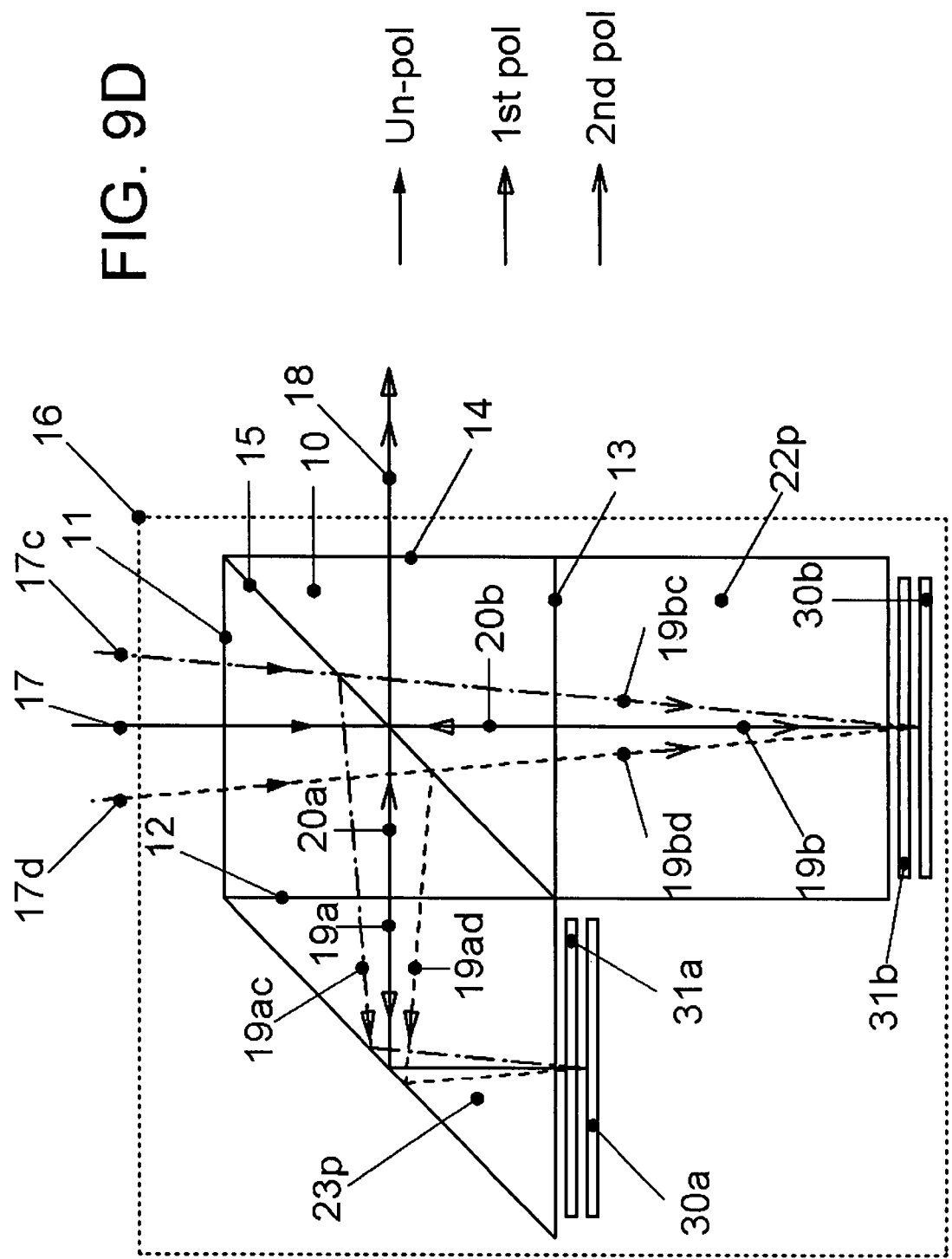

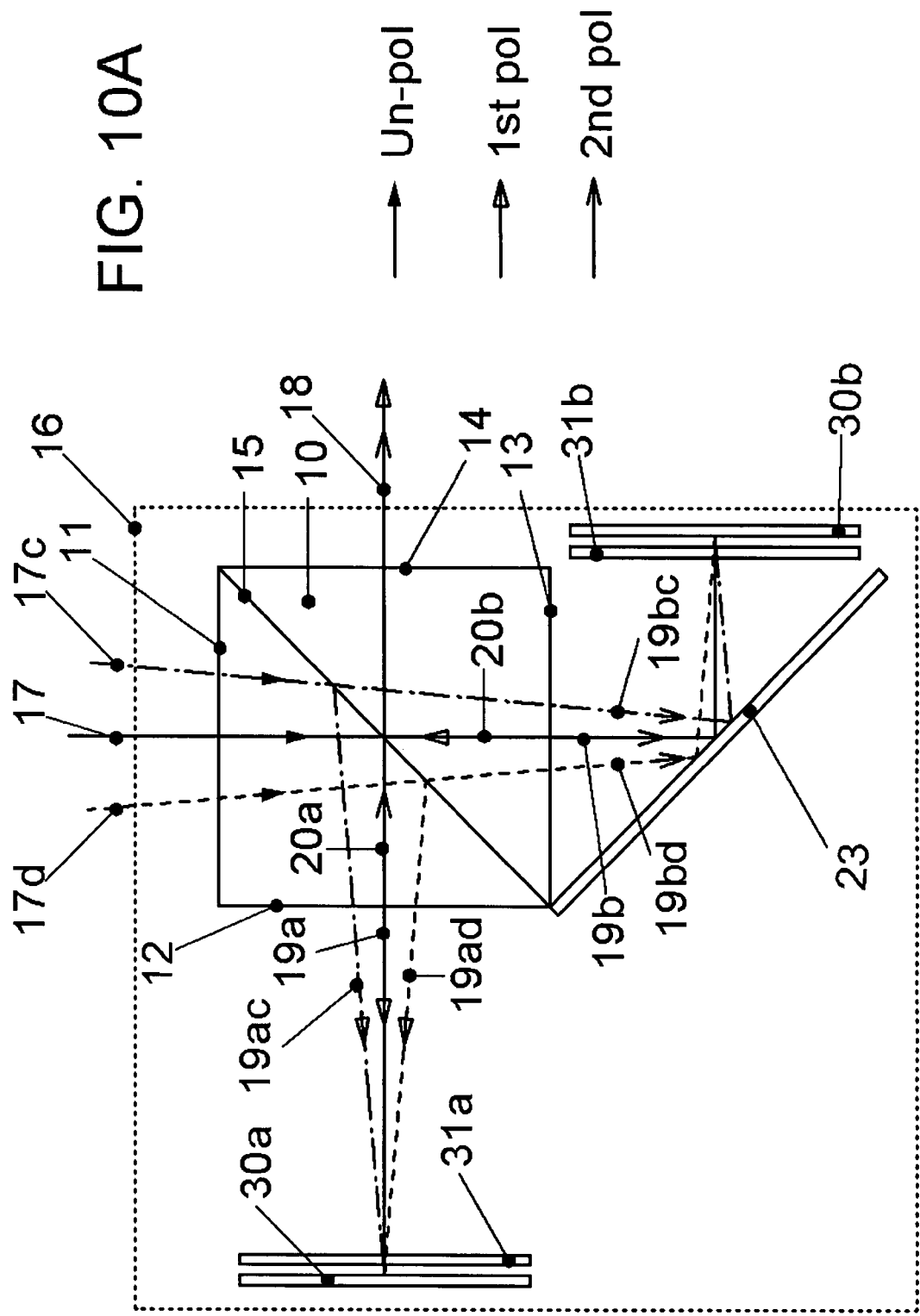

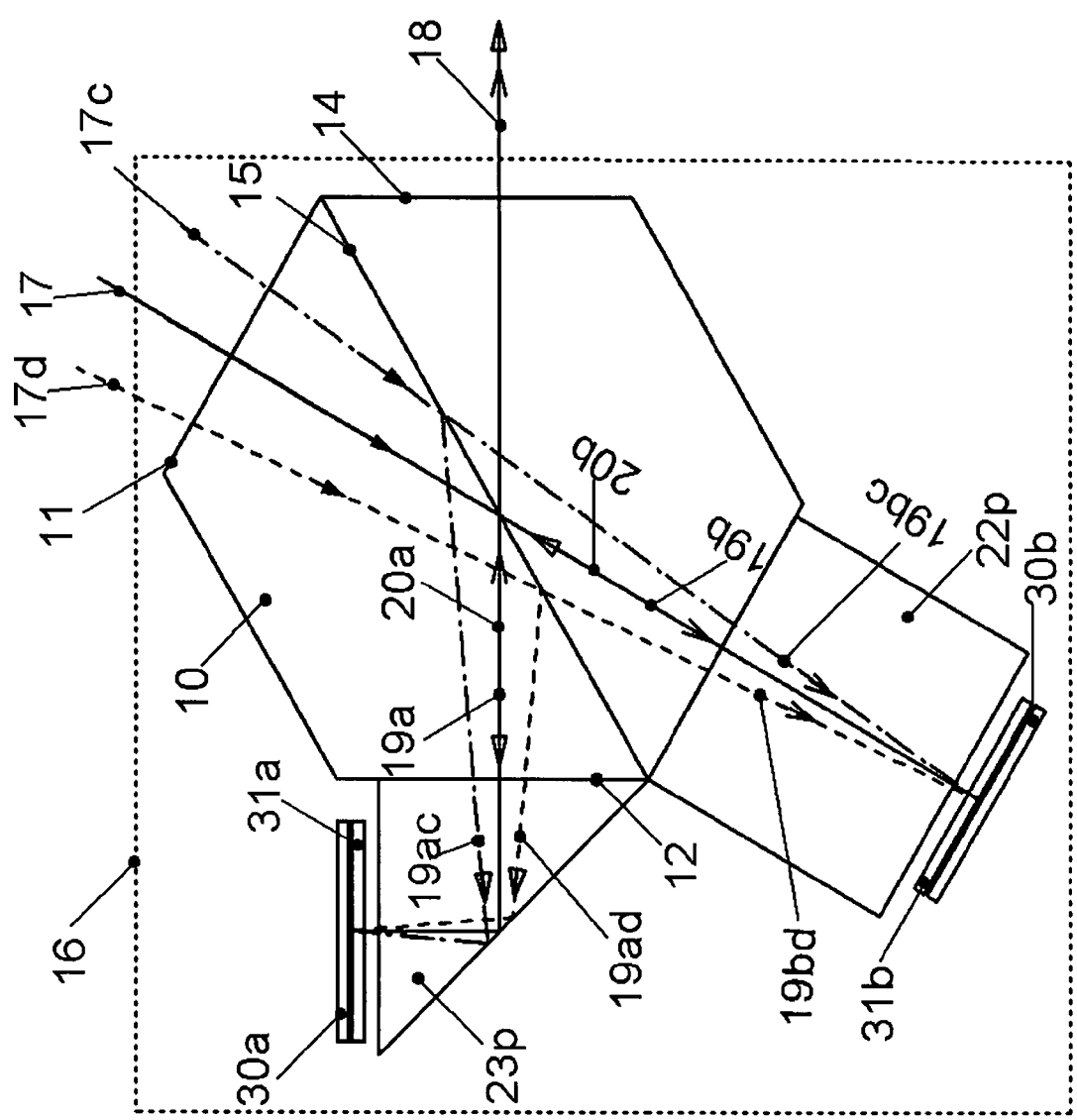

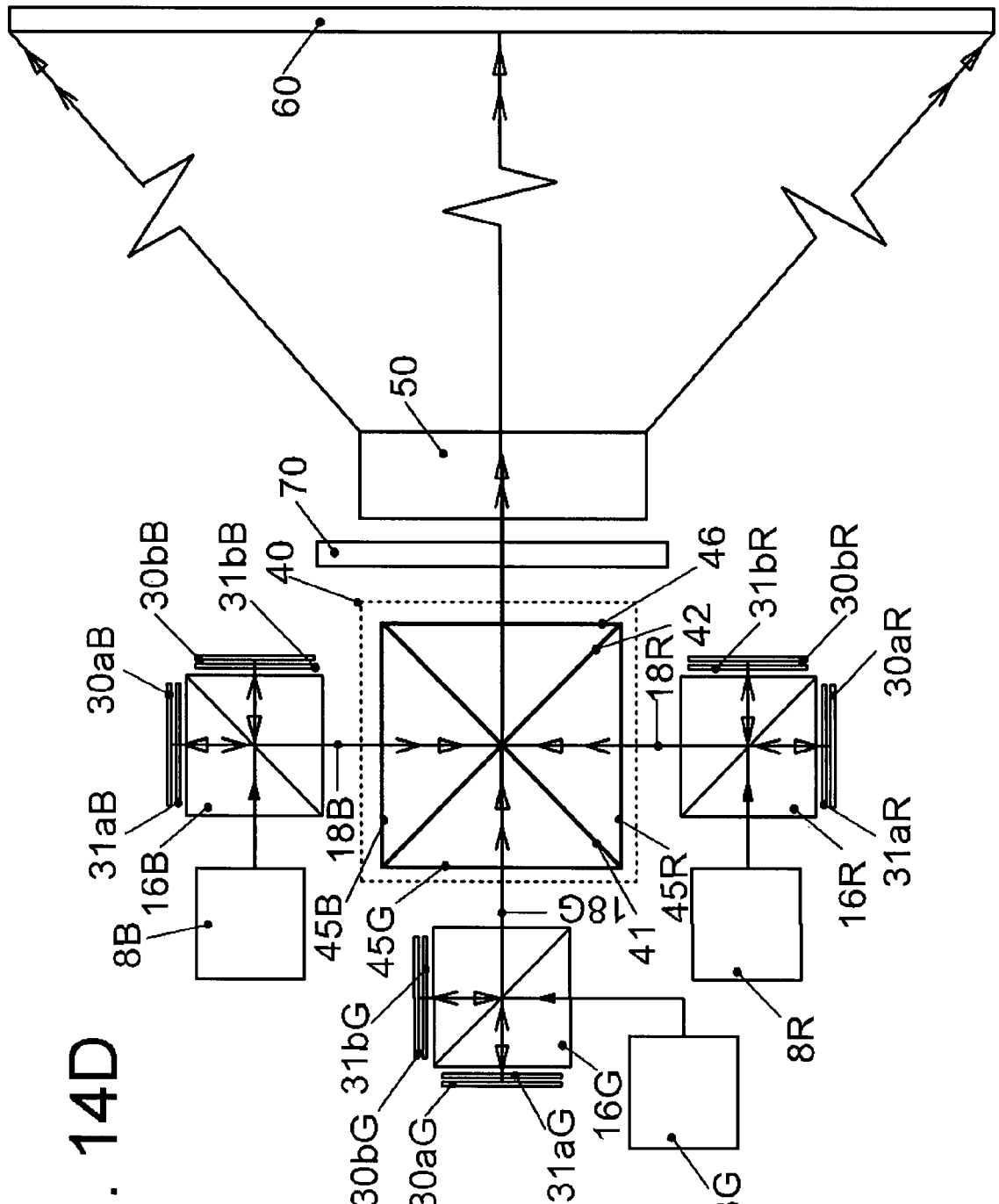

IMAGE-COMBINING DEVICE AND PROJECTION DISPLAY APPARATUS HAVING IMAGE-COMBINING DEVICES INCORPORATED THEREIN

CROSS REFERENCE TO RELATED APPLICATION

This application claims the benefit under 35 USC 119(e) of U.S. provisional application No. 60/806,474, filed Jul. 2, 2006, the contents of which are herein incorporated by reference.

FIELD OF THE INVENTION

This invention relates to image-combining devices and projection display apparatus having image-combining devices incorporated therein, and more particularly, to image-combining apparatus and projection display apparatus with micro-electro-mechanical (MEM) devices and polarizing beam-splitters (PBS).

BACKGROUND OF THE INVENTION

MEM devices, such as digital light processing (DLP™) devices disclosed in Texas Instruments' patents and technical publications, have been widely used in projection displays. The MEM devices, also called reflective light modulators or micro-display panels, are made of small electronically controlled micro-mirrors in rows and columns. (In the following sections, the terms "DLP" and "MEM" are used interchangeably to describe MEM display panels). FIG. 1A shows the principle of the MEM device and FIG. 1B shows a typical arrangement of a single DLP panel projection display. Each micro-mirror or pixel in a DLP panel can be titled electronically at two fixed positions $+\alpha$, or $-\alpha$, corresponding to "on" and "off" pixels, respectively. In FIG. 1A the light is incident from the side of the micro-display panel at an angle $2\alpha$ to the panel normal. For "on" pixels, the mirrors are tilted towards the incident beam. The incident beam is reflected along the normal of the panel surface and is directed through an optical arrangement that typically includes a projection lens as shown in FIG. 1B. For "off" pixels, the micro-mirrors will be tilted away from the incident beam, i.e. away from the projection lens direction and this unwanted beam will be absorbed by a light absorber. For "flat pixels" or any non-moving specular surfaces on the panel, the light will be reflected with an angle $2\alpha$ from the panel normal and will also be absorbed by a light absorber. By controlling the amount of time each micro-mirror is in the "on" and "off" positions an image can be encoded onto the "on" beam and projected onto a screen. In addition, full colour images can be displayed on screen by using a colour filter wheel to generate colour light beams time sequentially at a fast speed.

As shown in FIG. 1A, the incident beam and the image or "on" beam directions are separated from each other. However, in practice the incident light beam contains a cone of light over a range of angles and so therefore does the reflected beam. The two beams are very close to each other. In order to physically separate them in a projection arrangement, sometimes a total internal reflection (TIR) prism, or "light gate", device as shown in FIG. 1B is used. The light beam with a cone angle from an illumination system is incident upon the TIR surface at angles greater than the critical angle, thus the beam is totally reflected towards the DLP panel. For "on" pixels, the light reflected back from the panel to the TIR surface is incident at angles smaller than the critical angle and thus will pass through this surface. Because of the use of the TIR prism, the cone angle of the "on" pixels, or the aperture of the illumination system and the projection optical system can not exceed the cone angle determined by the mirror tilting angle to avoid overlap of the beams. For a DLP panel with 10° tilting angle, the f-number of the illumination and projection systems will be 2.9, thus limiting the amount of light that can be used from the illumination system and the light efficiency of the system. FIG. 1B also shows a typical illumination system arrangement of DLP projectors having a light source, a colour wheel, and a light pipe. DLP projection systems, such as the arrangement shown in FIG. 1B, are used for two dimensional (2D) image displays, such as in rear projection TVs or front projectors.

A three-dimensional (3D) stereoscopic image display needs to display 2D images that represent both the left- and right-eye perspective views for the viewer. This can be achieved, for example, by displaying a left-eye 2D image in one polarized light and a corresponding right-eye 2D image view in orthogonally polarized light so that a viewer wearing polarizing glasses receives correct 2D images in each eye and thus perceives a stereoscopic 3D image. There are a several approaches to use DLP projectors to project three-dimensional (3D) images. However, in these approaches, the DLP projectors have internal optical arrangements that are similar to 2D-only DLP projectors. They use un-polarized light and achieve 3D operation only in combination with other external components or devices. Because of this they are highly light inefficient for 3D use. In the first 3D approach, a single active DLP projector can alternatively display left- and right-eye 2D images time sequentially. A viewer, wearing active liquid crystal shutter (LC) glasses that are synchronized with the DLP projector, will be able to see 3D images because the left- and right-eye LC shutters open only when the correct eye image is displayed. The LC shutters typically transmit only about 35% of the incident light. In addition, because the left- and right-eye images are each displayed at most half of the time, this arrangement is very light inefficient for displaying 3D images. The 3D images appear very dim in comparison to the same projector displaying a single 2D image. Furthermore, LC shutter glasses are expensive and need electrical power to operate, making them bulky and inconvenient to wear.

In the second approach, two DLP projectors can be used to separately project the left- and right-eye images. Each projector has a sheet polarizer in front of it. One sheet polarizer allows light in one polarization to pass and the other one allows the orthogonal polarization to pass. Thus, the left- and right-eye 2D images are projected simultaneously with orthogonal polarizations onto a polarization-preserving screen. A viewer wearing polarizing glasses will be able to see 3D images because the polarizing glasses only allow the correct image to be seen by the correct eye. However, such an approach is bulky and expensive because it requires two projectors and it is also difficult to align the images from the two projectors. In addition, the light efficiency in 3D is low as well because of the use of external polarizers whose transmittance at most is 42%. Another approach to display 3D images with DLP projectors is to encode the left- and right-eye 2D images using different spectral regions of the illuminating light and to view a stereoscopic 3D image using appropriate colour filter glasses. This approach can be implemented with a colour filter wheel time sequential approach or with dual projectors. Similarly with the polarization encoding approach, this approach also results in expensive and light inefficient 3D displays.

Liquid crystal display (LCD) microdisplay technology represents an alternative to MEMs devices in projection systems. In contrast to MEMs micro-mirror panels that modulate the direction of an incident illuminating beam in order to form an image, LCD devices form an image by changing the polarization of the illuminating light. LCD micro-panels can operate in either transmission or reflection and polarizing beam splitters (PBS) are needed to separate the polarized image beam from the orthogonally polarized illuminating beam. The light sources used in projection systems typically emit un-polarized light and one advantage of MEMs devices is that they can operate with un-polarized incident light whereas LCD devices require polarized incident light. MEMs devices reflect light at different angles for "on" and "off" pixels and use a TIR prism to separate the encoded image beam from the illuminating light. LCD devices modulate the polarization of the illuminating beam and use a PBS to separate out the polarized encoded image beam.

SUMMARY OF THE INVENTION

The present invention provides an image-combining device that comprises of a polarizing beam-splitter, two MEM devices with plural micro-mirrors or pixels, two waveplates for changing the polarization state of light from a first polarization to a second polarization or vice-versa. The polarizing beam-splitter separates an un-polarized light into a reflected light of the first polarization and a transmitted light of the second polarization. The first and second polarizations are orthogonal to each other. The MEM devices form images by reflecting incident light at different angles according to the pixels states: "on" or "off". The two image lights from the MEM devices are orthogonally polarized. The polarizing beam-splitter is also used to combine the two image lights from the two MEM devices. Most of the un-polarized incident light in the image-combining device is used for imaging and very little light is lost, thus the image-combining device is very light efficient.

The present invention also provides a projection display apparatus comprising of at least one image-combining device as described above; at least one illumination system; a projection lens; an optional waveplate and an optional screen. The image light from the image-combining device consists of two images from the corresponding MEM devices. In the case the two images are identical, 2D images are projected onto the screen through the projection lens, thus the projection display apparatus operates in a 2D display mode. When the two images represent left- and right-eye images and the screen preserves the polarization state of the image light, viewers can see 3D images by wearing polarizing glasses which only allow the correct eye to see the correct images, thus the projection display apparatus operates in a 3D display mode. The 2D and 3D modes can be switched electronically by feeding 2D or 3D image signals to the MEM devices. In the case only one image-combining or forming device is used, full colour images are obtained by using time-sequential colour in which the illumination source outputs one primary colour at a time. This can be realized by using a rotating colour filter wheel or three pulsed red, green and blue light sources such as light emitting diode light sources or laser light sources. In the case three image-combining devices and three illumination systems are used, the three illumination systems provide three primary color lights to the corresponding three image-combining devices. The colour images from the three image-combining devices are then combined by a colour-combining device such as a Philips prism or x-cube to form full colour images. In this case, each illumination system can have its own colour light sources such as light emitting diode light sources or laser light sources. Alternatively, a white light source is used. The white light is separated by dichroic filters into three primary colour lights and the colour lights are then delivered to the corresponding image-combining devices.

Thus, in accordance with a first aspect of the invention there is provided a projection display apparatus comprising first and second reflective light modulators for receiving incident light beams and impressing first and second images on corresponding returned light beams, each of said first and second reflective light modulators having light reflective pixel elements pivotal about respective rotation axes that are aligned in an alignment direction; a polarizing beam splitter having a beam splitting surface reflecting incident light in a first polarization as a reflected beam and transmitting incident light in a second polarization as a transmitted beam, a first port for receiving an incident light beam having said first and second polarizations, second and third ports for directing said reflected and transmitted beams toward said respective first and second reflective light modulators, said second and third ports also receiving first and second returned beams reflected by said respective first and second light modulators carrying said respective first and second images, and a fourth port for outputting a combined image beam comprising said first and second returned beams for projection onto a display screen; a first waveplate, placed between said second port of said polarizing beam-splitter and said first reflective light modulator, for converting light of said first polarization to said second polarization, whereby said reflected beam from said first reflective light modulator has said second polarization after passing through said first waveplate; and a second waveplate placed between said third port of said polarizing beam-splitter and said second reflective light modulator for converting light of said second polarization to said first polarization, whereby said reflected beam from said second reflective light modulator has said first polarization after passing through said second waveplate; and wherein said polarizing beam splitter has an incident plane defined by the normal of said beam splitting surface and said returned light beams carrying said impressed first and second images at said beam splitting surface; wherein said first and second light modulators are aligned so that the corresponding alignment directions of said first and second said light modulators are projected on to said fourth port as a common alignment direction; wherein said incident plane and said common alignment direction form an angle γ; and wherein said polarizing beam-splitter and said first and second reflective light modulators are oriented such that the angle γ is 0°≦γ≦45°.

In accordance with a second aspect of the invention there is provided a projection display apparatus comprising a) at least two subsystems, each subsystem processing light of a different color and comprising (i) first and second reflective light modulators for receiving incident light beams and impressing first and second images on corresponding returned light beams; and (ii) a polarizing beam splitter having a beam splitting surface reflecting incident light in a first polarization as a reflected beam and transmitting incident light in a second polarization as a transmitted beam, a first port for receiving an incident light beam having said first and second polarizations, second and third ports for directing said reflected and transmitted beams toward said respective first and second reflective light modulators, said second and third ports also receiving first and second returned beams reflected by said respective first and second light modulators carrying said respective first and second images, and a fourth port for outputting a combined image beam comprising said first and second returned beams for projection onto a display screen;

(iii) a first waveplate, placed between said second port of said polarizing beam-splitter and said first reflective light modulator, for converting light of said first polarization to said second polarization, whereby said reflected beam from said first reflective light modulator has said second polarization after passing through said first waveplate; (iv) a second waveplate placed between said third port of said polarizing beam-splitter and said second reflective light modulator for converting light of said second polarization to said first polarization, whereby said reflected beam from said second reflective light modulator has said first polarization after passing through said second waveplate; and b) a color combiner for combining the output beams of the respective subsystems into a common output beam containing more than one color for projection onto a display screen.

In accordance with a third aspect of the invention there is provided a projection display apparatus comprising a) at least three subsystems, each subsystem processing light of a different color and comprising: (i) first and second reflective light modulators for receiving incident light beams and impressing first and second images on corresponding returned light beams, each of said first and second reflective light modulators having light reflective pixel elements pivotal about respective rotation axes that are aligned in an alignment direction; (ii) a polarizing beam splitter having a beam splitting surface reflecting incident light in a first polarization as a reflected beam and transmitting incident light in a second polarization as a transmitted beam, a first port for receiving an incident light beam having said first and second polarizations, second and third ports for directing said reflected and transmitted beams toward said respective first and second reflective light modulators, said second and third ports also receiving first and second returned beams reflected by said respective first and second light modulators carrying said respective first and second images, and a fourth port for outputting a combined image beam comprising said first and second returned beams for projection onto a display screen; (iii) a first waveplate, placed between said second port of said polarizing beam-splitter and said first reflective light modulator, for converting light of said first polarization to said second polarization, whereby said reflected beam from said first reflective light modulator has said second polarization after passing through said first waveplate; and (iv) a second waveplate placed between said third port of said polarizing beam-splitter and said second reflective light modulator for converting light of said second polarization to said first polarization, whereby said reflected beam from said second reflective light modulator has said first polarization after passing through said second waveplate; and (v) wherein said polarizing beam splitter has an incident plane defined by the normal of said beam splitting surface and said returned light beams having said impressed first and second images at said beam splitting surface; (vi) wherein said first and second light modulators are aligned so that the corresponding alignment directions of said first and second said light modulators are projected on to said fourth port as a common alignment direction; (vii) wherein said incident plane and said common alignment direction form an angle γ; and (vii) wherein said polarizing beam-splitter and said first and second reflective light modulators are oriented such that the angle γ is $0° \leq \gamma \leq 45°$; and a color combiner for combining the output beams of the respective subsystems into a common output beam containing said at least three colors for projection onto a display screen to provide a full color display.

Embodiments of the invention provide highly light efficient image-combining devices and projection display apparatus, having highly light efficient image-combining devices incorporated therein, for projecting 2D images;

Embodiments of the invention also provide highly light efficient image-combining devices and projection display apparatus, having highly light efficient image-combining devices incorporated therein, that can be switched between 2D and 3D display modes electronically.

BRIEF DESCRIPTION OF THE DRAWINGS

The present invention and exemplary embodiments of the invention will be described in accordance to the following drawings in which:

FIG. 4A is a schematic three-dimensional perspective view of a MEM device and a polarizing beam-splitter that shows the incident, "on", "flat" and "off" pixel light directions relative to the beam splitting surface and the micro-mirror array. In accordance with the present invention this arrangement is designated Type I alignment. The thin-film beam-splitting surface and beam-splitter exit face are shaded to aid visualization;

FIG. 4D is a schematic three-dimensional perspective view illustrating the light alignment between a MEM device and a polarizing beam-splitter. In accordance with the present invention, this arrangement is designated Type IV alignment;

FIG. 9C is a schematic view of an image-combining device having two MEM devices, a polarizing beam-splitter and a prism mirror in the reflected light path from the PBS in accordance with the present invention;

FIG. 9D is a schematic view of an image-combining device having two MEM devices, a polarizing beam-splitter and a prism mirror, positioned differently to FIG. 9C, in the reflected light path from the PBS in accordance with the present invention;

FIG. 10A is a schematic view of an image-combining device having two MEM devices, a polarizing beam-splitter and a plate mirror in the transmitted light path from the PBS in accordance with the present invention;

FIG. 11B is a schematic view of an image-combining device having two MEM devices, a polarizing beam-splitter with large angle of incidence and a prism mirror in the reflected light path from the PBS in accordance with the present invention;

FIG. 14D is a schematic view of a variation of the embodiment of the projection display apparatus in accordance with present invention having three image-combining devices for forming images with orthogonal polarized light, three sets of illumination systems for directing differently colored light to each image combining device, an X-cube for combing colour images, a projection lens and a screen.

DETAILED DESCRIPTION OF THE INVENTION

PBS Types

In accordance with the present invention of image-combining devices and projection display apparatus having image combining devices therein, polarizing beam-splitters are used to separate un-polarized and to combine polarized light. A PBS reflects a first polarization and transmits a second polarization. The first polarization and the second polarization are orthogonal to each other. Different types of PBSs can be used in the present invention. By way of examples, several PBS types are incorporated in the present invention and are described in the text below.

Figure 2A:
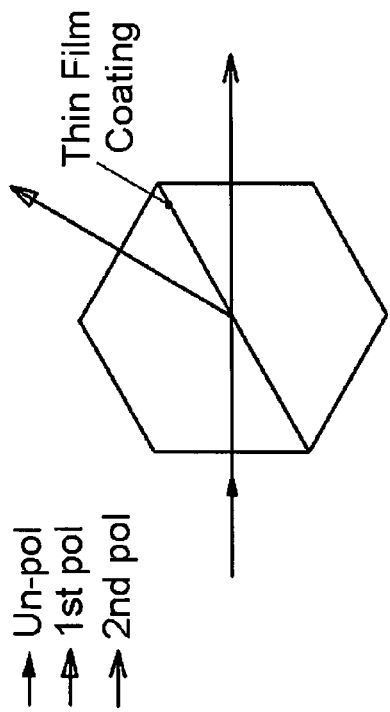
FIG. 2A is a schematic view of a Type A thin film polarizing beam-splitter which reflects s-polarized light and transmits p-polarized light.
Figure 2B:
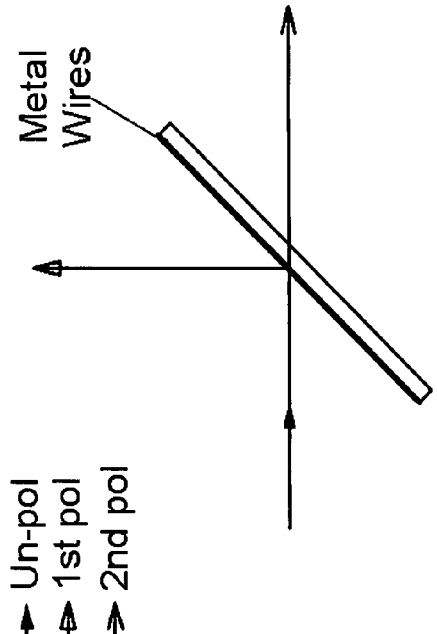
FIG. 2B is a schematic view of a Type B thin film polarizing beam-splitter with frustrated total internal reflection that reflects p-polarized light and transmits s-polarized light.
Figure 2C:
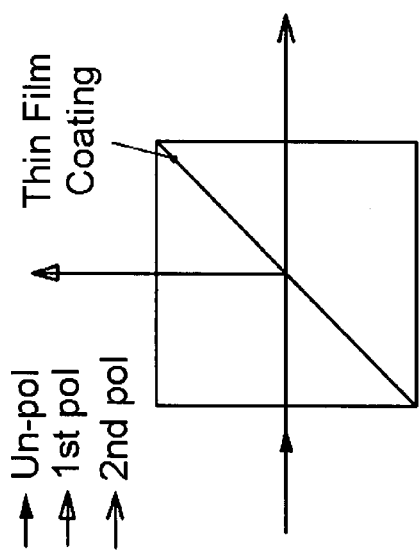
FIG. 2C is a schematic view of a Type C birefringent multilayer film polarizing beam-splitter that reflects s-polarized light and transmits p-polarized light, or vise versa.
Figure 2D:
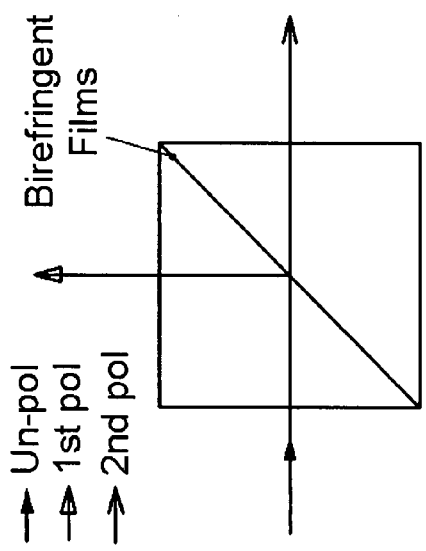
FIG. 2D is a schematic view of a Type D metal-wire grid polarizing beam-splitter that reflects s-polarized light and transmits p-polarized light, or vise versa.

Type A PBS, shown in FIG. 2A, is based on thin film interference coatings where the thin film beam-splitting (BS) coating is between two transparent prisms. Type A PBS reflects s-polarized light and transmits p-polarized light and operates at a central angle of incidence of 45°. Type B PBS, shown in FIG. 2B, is based on thin film interference as well as frustrated total internal reflection in thin film coatings, the thin film beam-splitting coating is also between two transparent prisms. Unlike Type A PBS, Type B PBS reflects p-polarized light and transmits s-polarized light, as disclosed in U.S. Pat. No. 5,912,762. Type C PBS, shown FIG. 2C, is based on birefringent multilayer thin plastic films, and the beam-splitting films are usually between two transparent prisms, such as the one disclosed in U.S. Pat. No. 6,690,795, the central angle of incidence is about 45°. Depending on the alignment of the birefringent films, Type C PBS can reflect s-polarized light and transmit p-polarized light, or vise versa. Type D PBS, shown in FIG. 2D, is based on metal-wire grids on a transparent plate, such as the one disclosed in U.S. Pat. No. 6,122,103, the beam-splitting metal-wire grids are on one side of the plate. Based on the alignment of the metal wires, Type D PBS can reflect s-polarized light and transmit p-polarized light, or vise versa. Type E PBS also reflects s-polarized light and transmits p-polarized light and operates at a central angle of incidence greater than 45° as described in the paper by Li Li and Dobrowolski, Applied Optics, Vol. 39, Issue 16, pp. 2754-2771. Type E is similar to type A that reflects s-polarized light and transmits p-polarized light except that the central angle of incidence is greater than 45°. Type E is also based on thin film interference coatings.

Without departing from the spirit of the invention, other beam-splitting angles rather than the ones shown in FIGS. 2A-2D and other types of PBSs can be used in the present invention as well.

MEM Devices

Figure 1A:
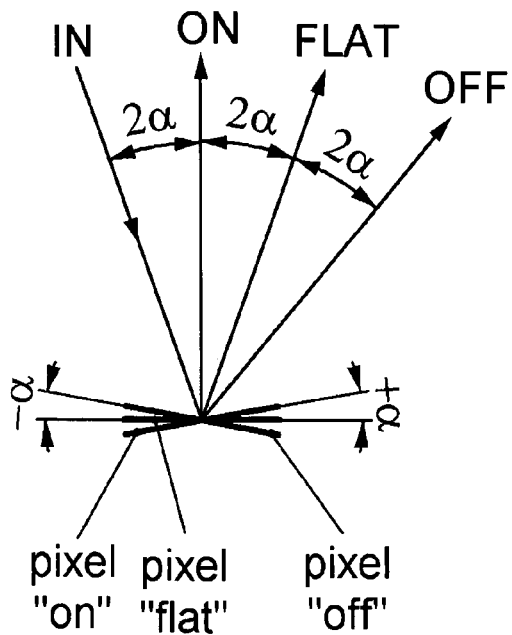
FIG. 1A is a schematic view of the working principle of micro-mirrors in a DLP device.
Figure 1B:
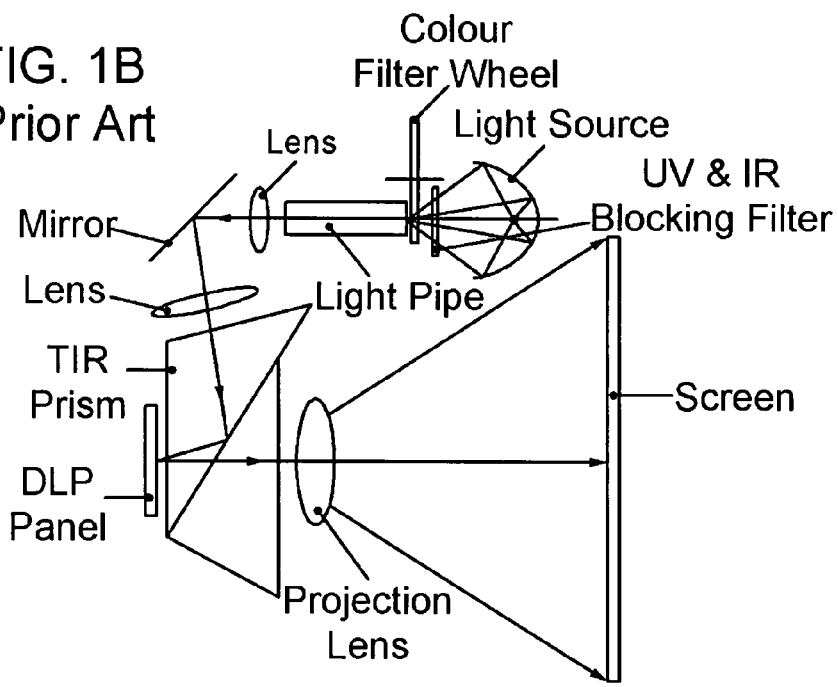
FIG. 1B is a schematic view of a prior art single panel DLP projector for projecting 2D images.

In accordance with the present invention of image combining devices and projection display apparatus having image combining devices therein, MEM devices with plural micro-mirrors or pixels arranged in rows and columns are used to form images. A typical MEM device for display applications is Texas Instruments' DLP™ panels. Each individual micro-mirror or pixel in a MEM device can be titled either $+\alpha$ angle or $-\alpha$ angle as shown in FIG. 1A. An incident beam comes usually from an angle of $2\alpha$ to the normal. When the pixel is "on", it rotates an angle $+\alpha$ towards the incident light thus the light is reflected normal to the surface of the device panel, and it is then projected onto a screen with a projection lens. When the pixel is "off", it rotates an angle $-\alpha$ away from the incident light thus the light is reflected $4\alpha$ away from the "on" beam. The "off" pixel light is outside of the projection lens and is then absorbed by light absorbers. If the pixel is in the "flat" state or for any specular surface on the MEM device, the light is reflected $2\alpha$ away from the "on" pixel light. The "flat" pixel light is also outside of the projection lens and is also absorbed by a light absorber. The incident beam, the "on" pixel beam, the "flat" pixel beam and the "off" pixel beam are all in one plane, this plane is defined as the incident plane of each individual micro-mirror or pixel. The tilting angle $\alpha$ of the micro-mirror or pixel is normally between 10°-12° which usually determines the apertures of the illumination system and the projection system in a MEM projection apparatus.

In the present invention of image combining devices and projection display apparatus having image combining devices therein, reflective MEM devices can be used. By way of examples, several types of MEM devices with different micro-mirror or pixel arrangements are incorporated in the present invention and are described below.

Figure 3B:
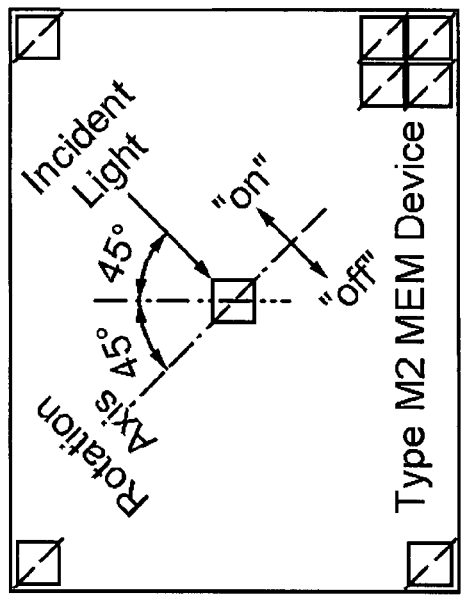
FIG. 3B is a top view of a MEM device, designated Type M2 in accordance with the present invention, showing the rotation axis of each individual micro-mirror or pixel and the direction of the incident plane of the incident beam.
Figure 3D:
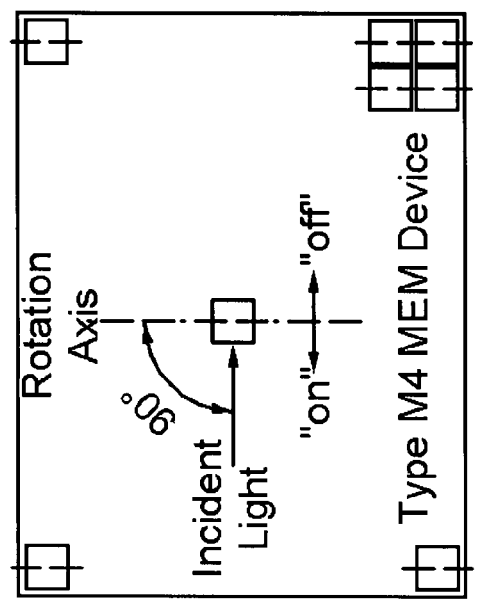
FIG. 3D is a top view of a MEM device, designated Type M4 in accordance with the present invention, showing the rotation axis of each individual micro-mirror or pixel and the direction of the incident plane of the incident beam.
Figure 3A:
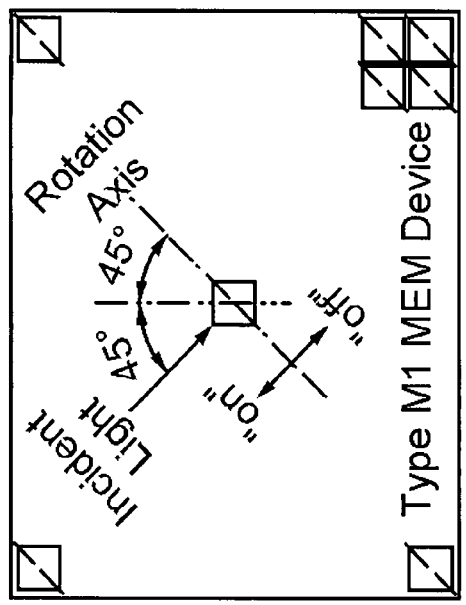
FIG. 3A is a top view of a MEM device, designated Type M1 in accordance with the present invention, showing the rotation axis of each individual micro-mirror or pixel and the direction of the incident plane of the incident beam.

The most commonly used MEM device, such as Texas Instruments DLPs, is shown in FIG. 3A, and is designated here as a Type M1 MEM device. Each micro-mirror or pixel is a square shape as shown in FIG. 3A. The rotation axis of each individual micro-mirror or pixel is along its diagonal and is aligned 45° with regard to the panel and is towards the top-right side of the panel. The incident beam is from the direction of top-left and the incident plane is perpendicular to the rotation axis and the surface of the device. A Type M2 MEM device, as shown in FIG. 3B, is similar to the Type M1 MEM device and they are mirror image of each other. The rotation axis of each individual micro-mirror or pixel is also along its diagonal and is aligned 45° with regard to the panel but towards the top-left side of the device. The incident beam is from the direction of top-right and the incident plane is perpendicular to the rotation axis and the surface of the device. Type M1 and M2 MEM devices are sometimes used in pairs in the present invention when two mirror-image MEM devices are needed to form combined images.

Figure 3C:
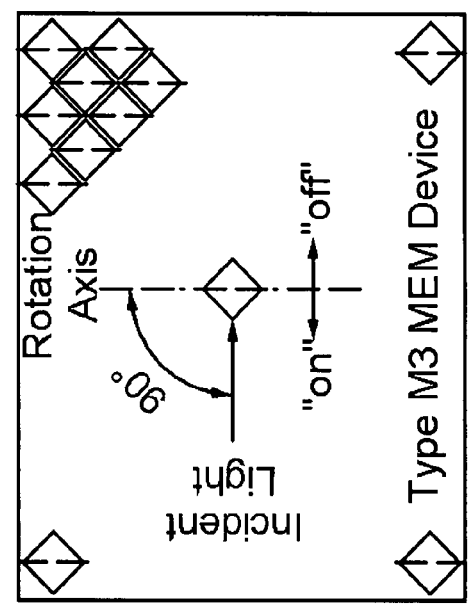
FIG. 3C is a top view of a MEM device, designated Type M3 in accordance with the present invention, showing the rotation axis of each individual micro-mirror or pixel and the direction of the incident plane of the incident beam.

A Type M3 MEM device has diamond-shape micro-mirrors as shown in FIG. 3C. The rotation axis of each pixel is also along its diagonal but is parallel to the centre vertical line of the device surface. Because of the diamond-shape pixels, the row and column definitions for Type M3 MEM devices are different from those of conventional MEM devices, M1 and M2. Thus, any row and column signal inputs need to be mapped to the present device. The incident beam is from the horizontal direction and the incident plane is perpendicular to the rotation axis and the surface of the device. Type M3 MEM device are preferred in some embodiments of the present invention when two MEM devices are needed to form combined images. Two identical Type M3 MEM devices can be used.

A Type M4 MEM device, as shown in FIG. 3D, is similar to the Type M3 MEM device except that each micro-mirror or pixel is a square instead of a diamonded shape. The rotation axis is along the centre vertical line of each individual micro-mirror or pixel. The definitions of rows and columns are the same as the conventional definitions. Thus no signal mapping is required. The incident beam is also from the horizontal direction and the incident plane is perpendicular to the rotation axis and the surface of the device. Type M4 MEM devices are also preferred in some embodiments of the present invention when two MEM devices are needed to form combined images.

Of the above types M1-M4 MEM devices, the type M1 MEM device is the only microdisplay panel commercially available today for use in projectors and Texas Instruments is the sole supplier. Although types M2-M4 are desired in some embodiments in the present invention, no commercial devices are currently available.

Without departing from the spirit of the invention, other arrangements of pixels or types of MEM devices can also be used in the present invention.

Light Alignment Approaches

In accordance with the present invention of image combining devices and projection display apparatus having image combining devices, polarizing beam-splitters and MEM devices are used together to combine separated image paths in a projection apparatus. Proper alignments of the MEM devices and PBSs are important in the present invention. The orientation of the MEM devices and the alignment of the incident light and the reflected beams with respect to the PBS and its beam-splitting surface determine the angular field over which the PBS must work. Ideally, the geometrical considerations allow the angular field at the beam-splitting surface to be minimized because it is more difficult to achieve good PBS performance over a large angular field. Furthermore, it is advantageous to minimize the size of the PBS needed to combine the image beams from two panels. By way of example, several light alignment approaches, designated here as Type I, II, III and IV, are incorporated in the present invention and are described below.

Each polarizing beam-splitter is used to combine images from a pair of first and second MEM devices. Each MEM device has an alignment direction which is parallel to the rotation axes of the micro-mirrors. The first and second MEM devices are aligned such that the projections of their alignment directions through, or reflected from, the polarizing beam splitter forms a common alignment direction as indicated on the figures associated with Type I, II, III, IV alignments. For simplicity, only the first MEM device in the reflected arm is shown in the figures.

In the following descriptions, the incident plane of the micro-mirror is defined by the incident light on the micro-mirror and the reflected light for the "on", "flat" and "off" pixels. The incident plane of the PBS is defined by the reflected "on" pixel light incident upon the beam-splitting surface, and the normal of the beam splitting surface. The common alignment direction of the MEM device, as projected through the PBS, forms an angle γ with the incident plane of the PBS.

FIG. 4A shows a three-dimensional perspective view of Type I alignment, in which the alignment direction and the rotation axes of the micro-mirrors or pixels on the MEM device are arranged horizontally, as shown, and the incident plane of the PBS is vertical, thus the angle γ between the incident plane of the polarizing beam-splitter and the common alignment direction is 90° as shown. The beam-splitting surface of the polarizing beam-splitter is perpendicular to the incident plane of the micro-mirror and intersects the incident plane as shown. In Type I alignment, the angular field including the incident and "on" pixel beams at the beam-splitter surface is maximized. In the present invention, it is least desirable to have such alignment because the PBS has to operate over a large angular field.

Figure 4B:
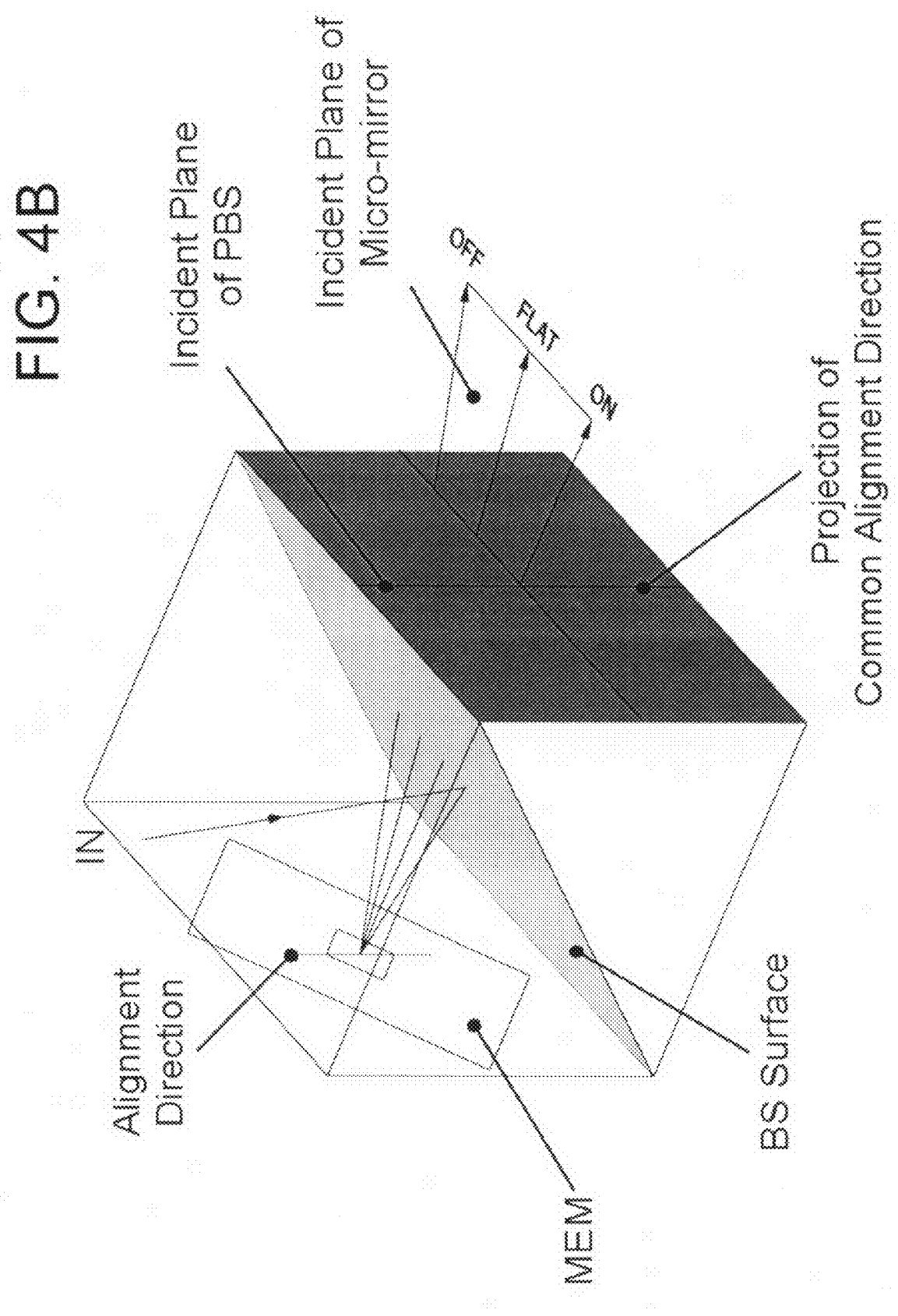
FIG. 4B is a schematic three-dimensional perspective view illustrating the light alignment between a MEM device and a polarizing beam-splitter. In accordance with the present invention, this arrangement is designated Type II alignment.

FIG. 4B shows a three-dimensional perspective view of Type II alignment, in which the alignment direction and the rotation axis of micro-mirrors or pixels on the MEM device is arranged vertically, as shown, the incident plane of the micro-mirror is horizontal and the beam-splitting surface of the polarizing beam-splitter is not perpendicular to the incident plane of the micro-mirror. The incident plane of the PBS and the common alignment direction are parallel with each other, thus the angle γ between them is 0°. In Type II alignment, the angular field including the incident beam and the "on" pixel beam at the beam-splitter surface is minimized. Type II alignment is a preferred approach in the present invention because the PBS operates over a relatively small angular field. However, the use of the available type M1 MEM device in such an alignment leads to the requirement of a large PBS size which is not desirable.

Figure 4C:
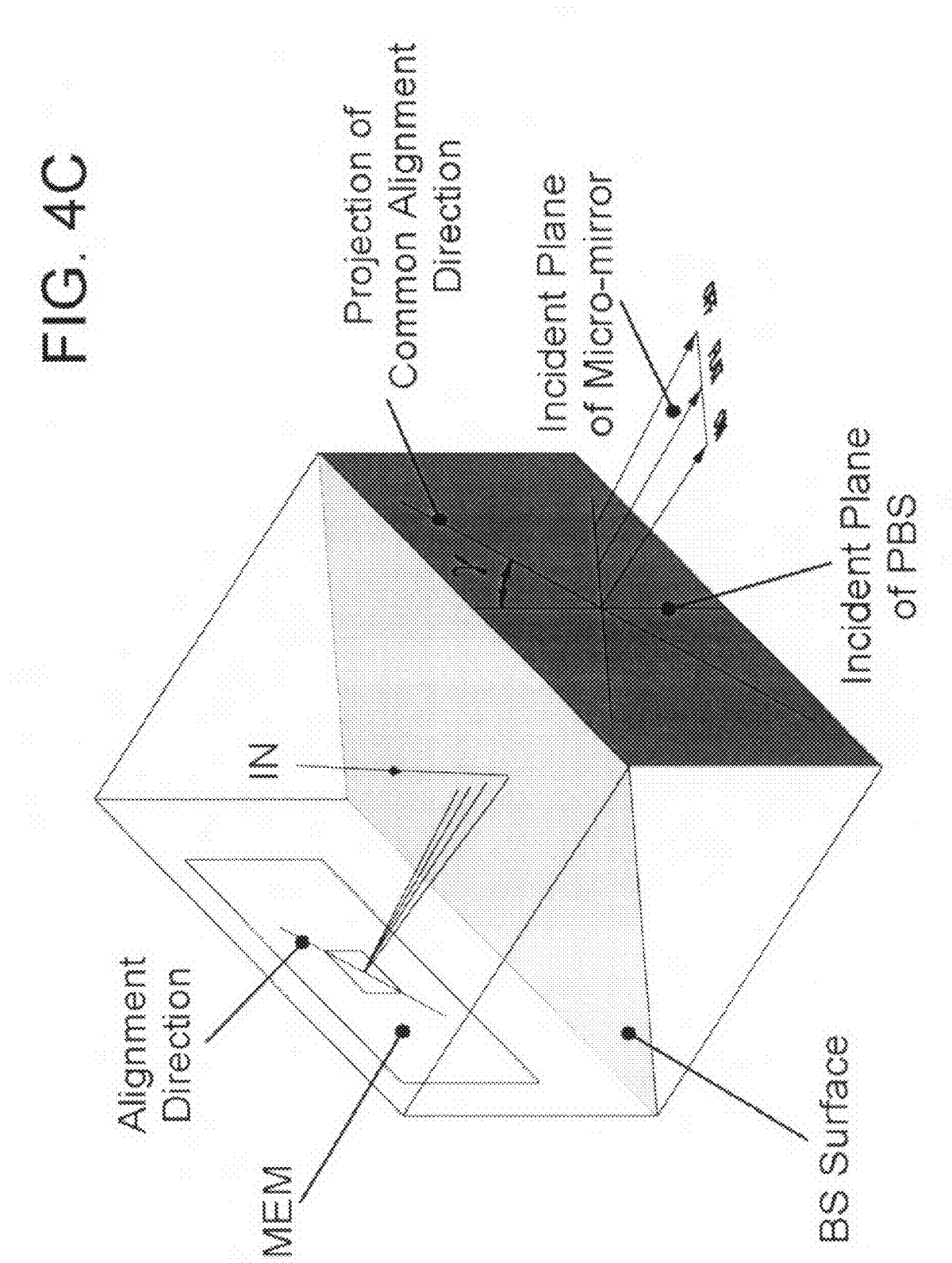
FIG. 4C is a schematic three-dimensional perspective view illustrating the light alignment between a MEM device and a polarizing beam-splitter. In accordance with the present invention, this arrangement is designated Type III alignment.
Figure 4E:
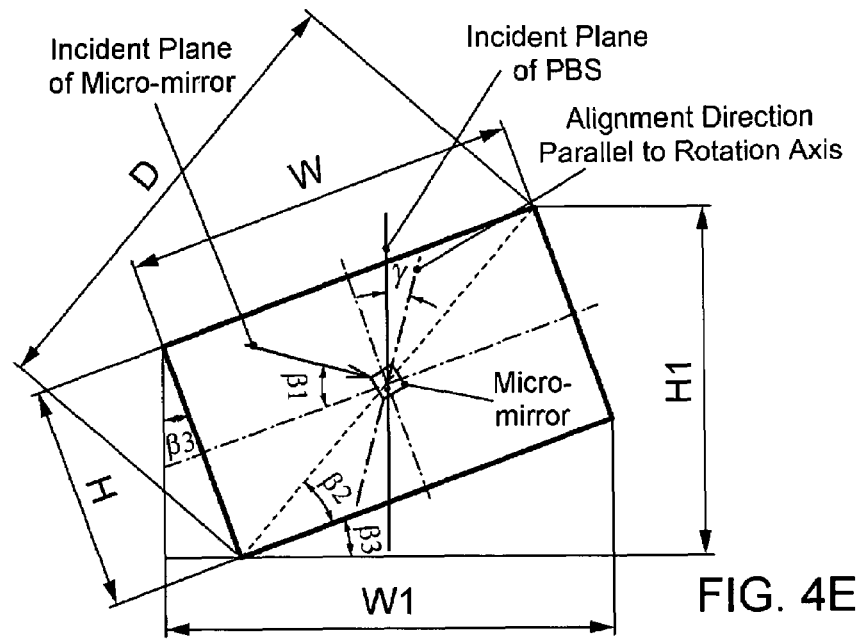
FIG. 4E shows the relationship between the effective height $H_1$ and width $W_1$ of a MEM device with respect to its actual height H and width W.

FIG. 4C shows a three-dimensional perspective view of Type III alignment, in which the incident plane of the PBS and the common alignment axis forms the angle γ. In Type III alignment, the angular field including the incident beam and the "on" pixel beam at the beam-splitter surface is determined by the angle γ. The closer γ is to 0° the smaller the angular field at the BS surface. The PBS size needed is minimized when γ=45° for types M1 and M2 MEM devices. In the present invention, it is preferred to have 0°≦γ≦45° when using Type M1 or Type M2 MEM devices. In the Type III alignment approach, the incident beam has a smaller incident angle with the BS surface than the "on" pixel beam.

FIG. 4D shows a three-dimensional perspective view of Type IV alignment that is similar to Type III alignment. The incident plane of the PBS and the common alignment direction form an angle γ. In Type IV alignment, the angular field including the incident beam and the "on" pixel beam at the beam-splitter surface is determined by the rotation angle γ. The closer γ is to 0°, the smaller the angular field at the BS surface. In the present invention, it is desirable to have γ=45° when using Type M1 or M2 MEM devices because in this case, the MEM devices are aligned with the edges of the polarizing beam-splitter minimizing the size of the PBS needed. In Type IV alignment, the incident beam has a larger incident angle on the BS surface than that of the "on" pixel beam.

As mentioned in the previous section, the only commercially available MEM devices are type M1 from Texas Instruments. As shown in FIG. 4A-4E, the effective height of the MEM device $H_1$ determines the PBS size which in turn determines the optical path through the PBS and the required back focal length for the projection lens. Thus, it is advantageous to minimize PBS size and thus reduce the cost of the optics. FIG.

4E shows the relationship between effective height $H_1$ and width $W_1$ of the MEM device and the actual height H and width W of the MEM device with respect to the angle γ and the equations for $H_1$ and $W_1$ are as follows:

$$\begin{cases} D = \sqrt{H^2 + W^2} \\ \beta_2 = \tan^{-1}\frac{H}{W} \\ \beta_3 = \beta_1 - \gamma \\ H_1 = D\sin(\beta_2 + \beta_3) \\ W_1 = H\sin\beta_3 + W\cos\beta_3 \end{cases}$$

Figure 4F:
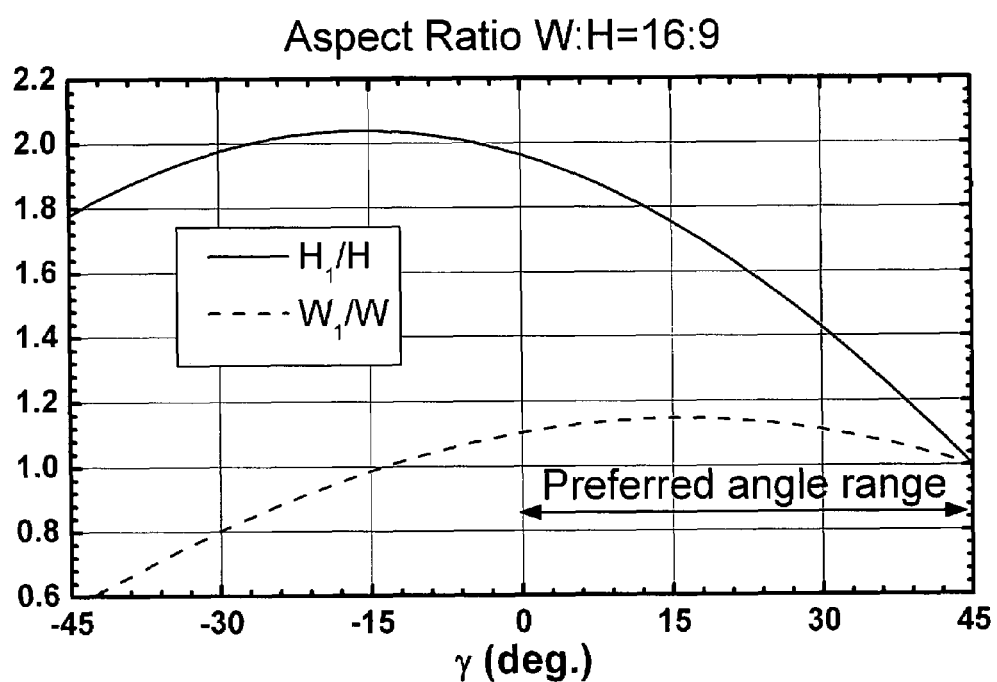
FIG. 4F shows the ratios of $H_1/H$ and $W_1/W$ for a MEM device with aspect ratio of 16:9 (W:H) with the angle γ.

FIG. 4F shows the ratios of $H_1/H$ and $W_1/W$ with respect to the angle γ for a MEM device with an aspect ratio 16:9 (W:H). Clearly, for the alignment Type II arrangement where γ=0°, the effective height is almost doubled the actual panel height. This is not a desirable situation as the PBS must be made much larger in order to illuminate the panel and collect the reflected image light through the PBS. When γ=45', the PBS size is minimized and the MEM panel and the PBS are straight forward to align relative to each other as shown in FIGS. 4C and 4D, however the angular field requirement placed on the PBS is larger than in the γ=0° case. In order to achieve a good combination of minimizing the size of the PBS and the angular field over which the beam splitting surface of the PBS must work, it is therefore advantageous to have the angle γ between 0° and 45°.

For the purposes of illustration, in all drawings of the specification of the present invention, changes in direction of the beam paths due to light refraction at air/prism interfaces are not shown.

First Embodiment

Figure 5A:
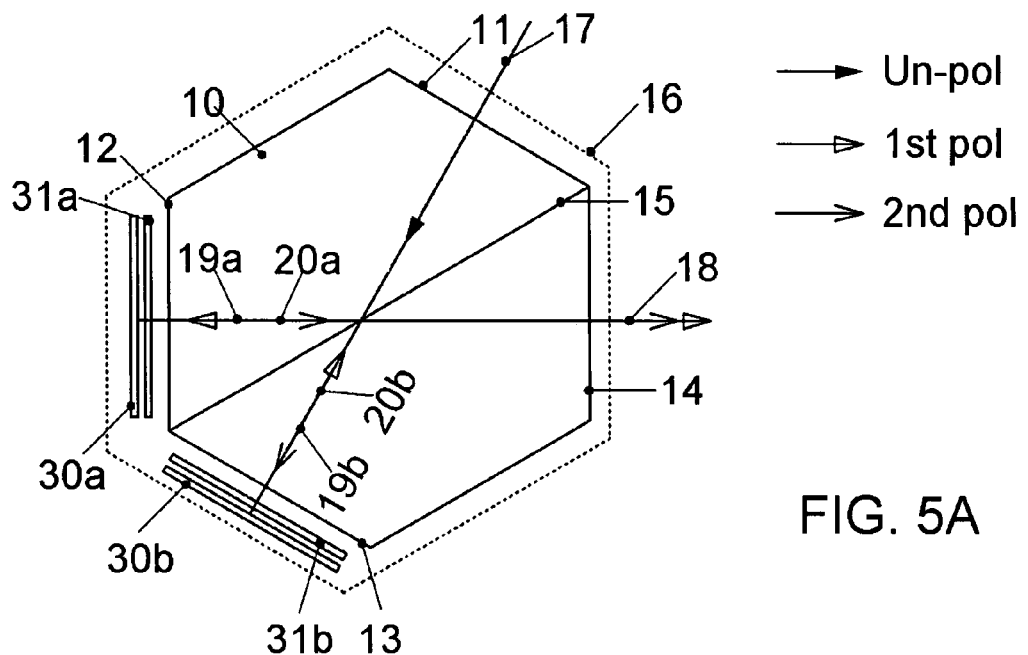
FIG. 5A is a schematic view of an image-combining device having two MEM devices and a polarizing beam-splitter in Type II alignment in accordance with the present invention.
Figure 6A:
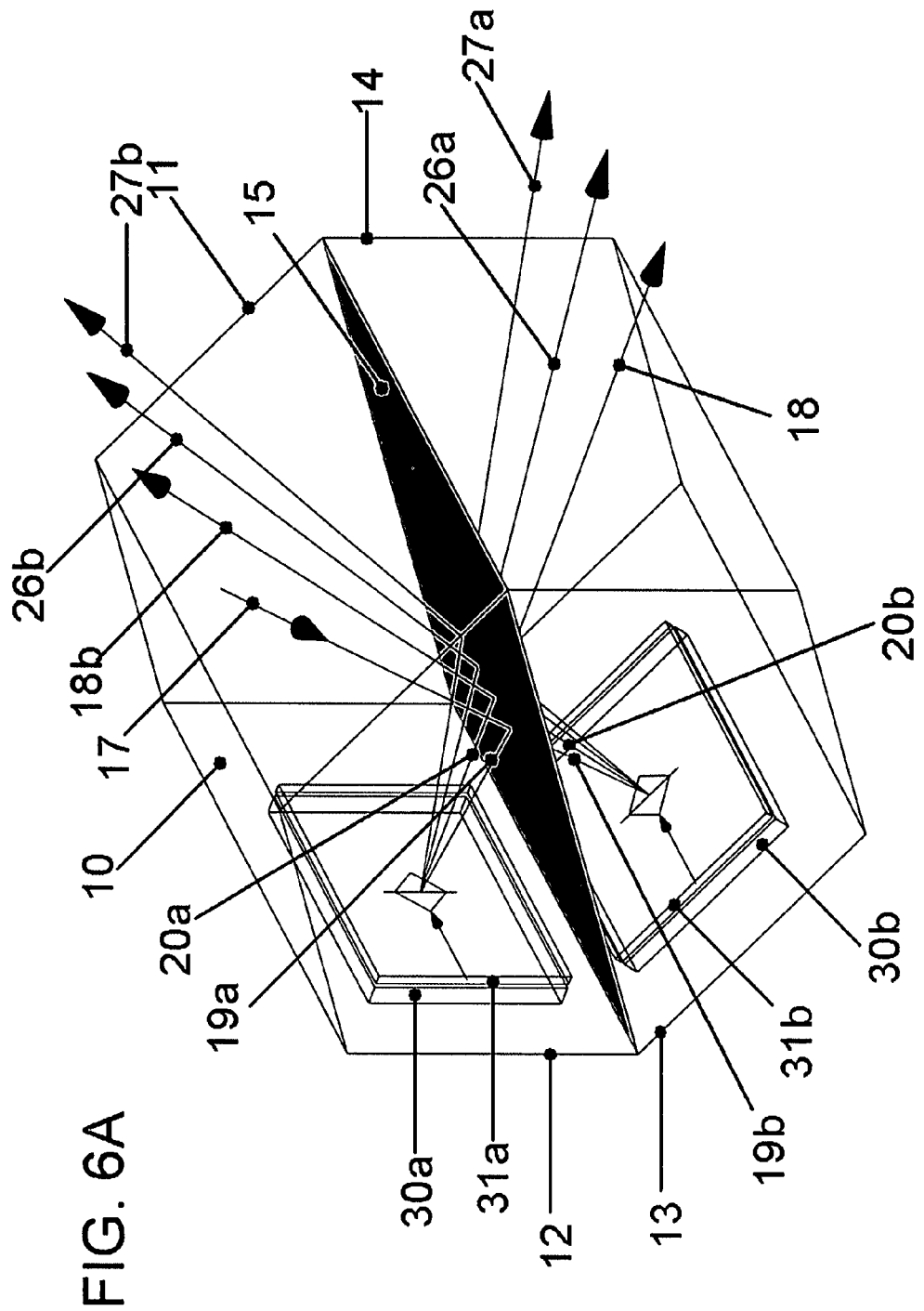
FIG. 6A is a schematic three-dimensional perspective view of an image-combining device having two MEM devices and a polarizing beam-splitter in Type II alignment as shown in FIG. 5A in accordance with the present invention.

The first embodiment of an image-combining device 16 in accordance with the present invention is shown in FIG. 5A in a two-dimensional schematic view and in FIG. 6A in a schematic three-dimensional perspective view. It comprises of a polarizing beam-splitter 10 having a beam-splitting surface 15, an incident port 11, reflecting port 12, a transmitting port 13 and an output port 14; a set of a waveplate 31a and a MEM device 30a adjacent to the reflecting port 12; another set of a waveplate 31b and a MEM device 30b, adjacent to the transmitting port 13. The operation of the first embodiment is explained below.

An un-polarized incident beam 17 from the incident port 11, is incident upon the polarizing beam-splitter 10, the beam-splitting surface 15 separates the incident beam 17 into a reflected light beam 19a of a first polarization and a transmitted light beam 19b of a second polarization as shown in FIGS. 5A and 6A. The first polarization and the second polarization are orthogonal to each other. In FIG. 5A the light beams are marked with different arrows according to their polarization states of un-polarized, first polarization and second polarization, respectively.

For the reflected first polarization beam 19a, it exits the reflecting port 12 and then passes through the waveplate 31a which changes the polarization state of the light and is then incident onto the MEM device 30a. The incident light will be reflected back by individual micro-mirrors or pixels of the MEM device at different angles according to the pixels' states: "on" or "off". Images are encoded onto the MEM device by reflecting the incident light at different angles for "on" and "off" pixels. The reflected "on" pixel light beam 20a, also called the first image light beam, is along the normal of the MEM device surface. It passes through the waveplate 31a and enters the PBS at port 12. The waveplate 31a change the polarization state of the image light into the second polarization. Preferably, the waveplate 31a is a quarter-wave plate, or combinations of waveplates that rotate the polarization state from the first polarization to the second polarization, and vise versa. The image light 20a, thus, passes through the beam-splitting surface 15 and exits the PBS from the output port 14 as beam 18 shown in FIGS. 5A and 6A. For the light reflected from the "off" pixels as shown in FIG. 6A, depending on the polarization state of this light and the transmittance and reflectance of the polarizing beam splitter, some or all of the light may pass through the beam-splitting surface 15 as shown as beam 27a; or, some or all of the light may be reflected by the beam-splitter surface 15 as shown as beam 27b. Beams 27a and 27b travel in different directions than those of the image light 18 and incident light 17, and will be absorbed by light absorbers not shown in the figure. Light reflected from "flat" pixels or any flat surfaces under or near the pixels, will travel in the direction 26a or 26b or both, similar to the "off" pixel light. Again, the "flat" light travels in different optical paths that those of the image light and the incident beam, and thus will be absorbed by light absorbers not shown in the figure. If the waveplate is not perfect, there will be some residual light in the first polarization for the image light, this light will be reflected in the direction of 18b, which is different from the image light 18 and the incident light 17, and will be absorbed by light absorbers. It will have very little impact on the contrast of the image-combining device 16.

For the transmitted second polarization beam 19b, it exits the transmitting port 13 and then passes through the waveplate 31b which changes the polarization state of the light and is then incident onto the MEM device 30b. The incident light will be reflected back by individual micro-mirrors or pixels of the MEM device at different angles according to the pixels' states: "on" or "off". Images are encoded onto the MEM device by reflecting the incident light at different angles for "on" and "off" pixels. The reflected "on" pixel light beam 20b, also called the second image light beam, is along the normal of the MEM device surface. This light passes through the waveplate 31b again. The waveplate 31b is similar to waveplate 31a and changes the polarization state of the image light into the first polarization. Preferably, the waveplate 31b is a quarter-wave plate, or combinations of waveplates that rotate the polarization state from the first polarization to the second polarization, and vise versa. The image light 20b, is thus reflected by the beam-splitting surface 15 and exits the PBS from the output port 14 as beam 18 shown in FIGS. 5A and 6A. For the light reflected from the "off" pixels as shown in FIG. 6A, depending on the polarization state of this light and the transmittance and reflectance of the polarizing beam splitter, some or all of the light may pass through the beam-splitting surface 15 as shown as beam 27b; or, some or all of the light may be reflected by the beam-splitter surface 15 as shown as beam 27a. Beams 27a and 27b travel in different directions than those of the image light 18 and incident light 17, and will be absorbed by light absorbers not shown in the figure. For the light reflected from "flat" pixels, or any flat surfaces under or near the pixels, it will travel in the direction 26a or 26b or both. Again, this light travels in different optical paths than those of the image light and the incident beam, and thus will be absorbed by light absorbers not shown in the figure. If the waveplate is not perfect, there will be some residual light in the second polarization in the image light, this light will travel in the direction of 18b, which is different from the image light 18 and the incident light 17, and will be absorbed by light absorbers. It will have very little impact on the contrast of the image-combining device 16.

In the first embodiment, as explained above, the polarizing beam-splitter combines the first image light, having the second polarization state, with the second image light, having the first polarization state. The two images can be identical 2D images, or represent left-eye and right-eye images for forming 3D stereoscopic images. The polarizing beam-splitter acts like two polarizers in series for both the image light beams. This is advantageous because any unwanted leakage from the polarizing beam-splitter will be filtered out in the direction of 18b by the polarizing beam-splitter. As a result, very little cross-talk will exist between the two images with orthogonal polarizations and high quality 3D stereo images can be obtained. Furthermore, the requirement for the contrast ratio of the polarizing beam-splitter can be less strict. Most importantly, all the un-polarized light is used for imaging, no light is lost due to polarization. Thus, the image-combining device is very light efficient.

Figure 5B:
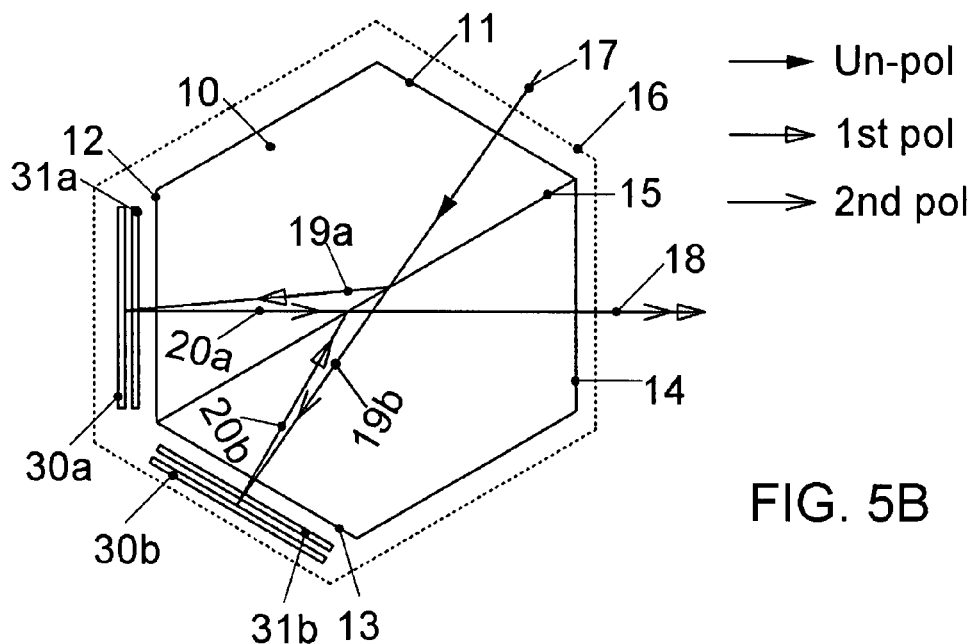
FIG. 5B is a schematic view of an image-combining device having two MEM devices and a polarizing beam-splitter in Type III alignment in accordance with the present invention.

A variation of the first embodiment in accordance with the present invention is shown in FIG. 5B. This variation is similar to the first embodiment as shown in FIG. 5A. The only difference between this variation and the embodiment shown in FIG. 5A is that the MEM devices and the polarizing beam-splitter are arranged according to Type III alignment. All of the above description about the first embodiment as shown in FIG. 5A also applies to this variation. The exceptions are that in this variation shown in FIG. 5B the incident beam 17 and the reflected beam 19a, and transmitted beam 19b, as well as the light from "flat" and "off" pixels of the MEM devices 30a and 30b travel in directions different to those of the first embodiment shown in FIG. 5A. In this variation, the incident light has a larger angle of incidence than that of the "on" pixel light at the beam-splitter surface.

Figure 5C:
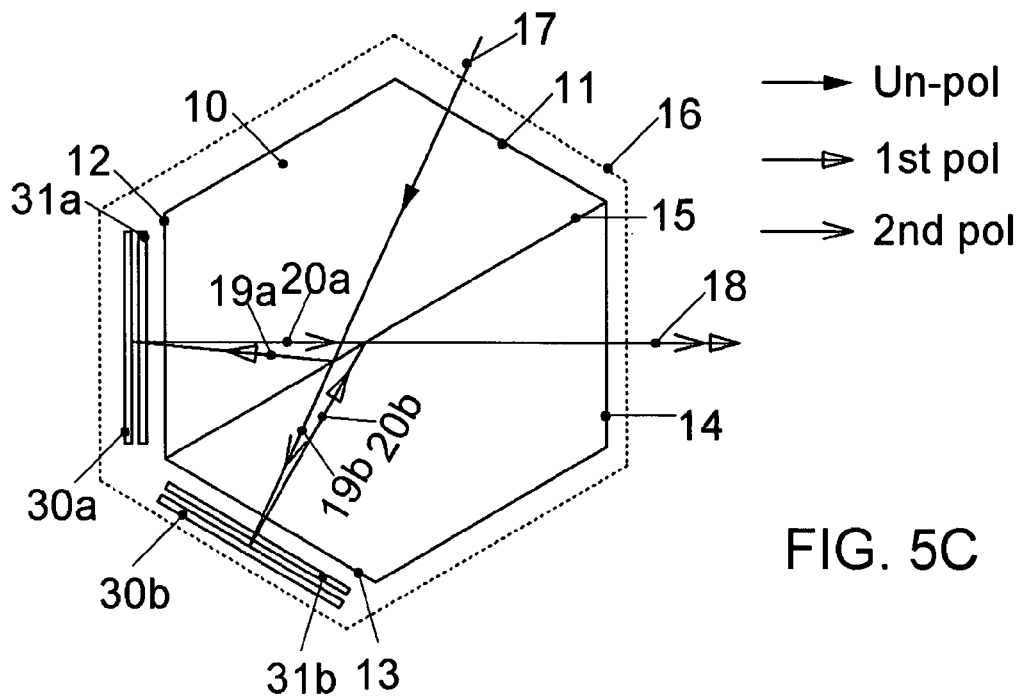
FIG. 5C is a schematic view of an image-combining device having two MEM devices and a polarizing beam-splitter in Type IV alignment in accordance with the present invention.

Yet another variation of the first embodiment in accordance with the present invention is shown in FIG. 5C. This variation is also similar to the first embodiment as shown in FIG. 5A. The only difference between this variation and the embodiment shown in FIG. 5A is that the MEM devices and the polarizing beam-splitter are arranged according to Type IV alignment. All the above description about the first embodiment as shown in FIG. 5A also applies to this variation. The exceptions are that in this variation shown in FIG. 5C the incident beam 17 and the reflected beam 19a, and transmitted beam 19b, as well as the light from "flat" and "off" pixels of the MEM devices 30a and 30b travel in directions different than those of the first embodiment shown in FIG. 5A. In this variation, the incident light has a smaller angle of incidence than that of the "on" pixel light at the beam-splitter surface.

In the first embodiment and its variations, the polarizing beam-splitter operates at angles of incidence larger than 45°. It is preferable to use a type B or type E PBS due to their better performance over PBS's operating at a central angle of incidence of 45°. In a type B PBS, the first and second polarizations are p- and s-polarized, respectively. In a Type E PBS, the first and second polarizations are s- and p-polarized, respectively. E and B type PBSs consist of thin film interference coatings between glass prisms.

For stereoscopic 3D display applications of the present invention an important performance measure is the signal-to-noise ratio or cross-talk between the two images when they are combined using a PBS. The image cross-talk between the two images from the MEM devices is defined as the ratio of the image light intensity in the desired polarization from the desired panel to the image light intensity in desired polarization but from the different MEM device.

Table 1 shows the image light intensities and cross-talk between the combined images from the two MEM devices. The reflectance and transmittance of the polarizing beam-splitter is $R_1$ and $R_2$, $T_1$ and $T_2$, for the first and second polarizations, respectively. $R_m$ is the micro-mirror reflectance. The efficiency of the waveplate converting light from the first polarization to the second polarization or from the second polarization to the first polarization is $\omega$. The intensity of the incident light is taken to be unity. The equations in Table 1 apply to all image combining devices in the present invention.

TABLE 1

Image light intensities and cross-talk

| | MEM1 (30a left-or right image) | | MEM2 (30b right or left-image) | |
| --- | --- | --- | --- | --- |
| | | Polarization states | | |
| | 1$^{st}$ polarization | 2nd polarization | 1st polarization | 2nd polarization |
| Light intensity after transmission through PBS | $R_1$ | $R_2$ | $T_1$ | $T_2$ |
| Light intensity after double transmission though the waveplate and reflection from MEM panel | $R_2 R_m \omega + R_1 R_m (1 - \omega)$ | $R_1 R_m \omega + R_2 R_m (1 - \omega)$ | $T_2 R_m \omega + T_1 R_m (1 - \omega)$ | $T_1 R_m \omega + T_2 R_m (1 - \omega)$ |
| Light intensity on transmission through the PBS a 2$^{nd}$ time | $I_{11} = (R_2 \omega + R_1 (1 - \omega)) R_m T_1$ Undesired | $I_{12} = (R_1 \omega + R_2 (1 - \omega)) R_m T_2$ Desired image light | $I_{21} = (T_2 \omega + T_1 (1 - \omega)) R_m R_1$ Desired image light | $I_{22} = (T_1 \omega + T_2 (1 - \omega)) R_m R_2$ Undesired |
| Cross-talk | $I_{12}:I_{22}$ | | $I_{21}:I_{11}$ | |

Table 2 shows the calculated image light intensities using three polarizing beam-splitters: Example 1 is a type A PBS, a typical broadband MacNeille polarizer operating at 45° central angle of incidence, the data is taken from the paper by Blackenhagen, Applied Optics, Vol. 45, pp. 1539-1543; Example 2 is a type E PBS, a broadband PBS operating at 54° central angle of incidence, the data is taken from the paper by Li Li and Dobrowolski, Appl. Opt. 35, pp. 2221-2225; Example 3 is a type B PBS, a wide-angle and broadband PBS operating at 69° central angle of incidence, the data is taken from the paper by Li Li and Dobrowolski, Applied Optics, Vol. 39, pp. 2754-2771. Assuming $\omega$ is 0.8 which takes into account of depolarization effects and $R_m$ is unity for convenience although the actual value of reflection is about 90%. Clearly, example 1 has very high cross-talk 21:1 in one of the images which makes it not suitable for displaying stereo images, in addition, it has the lowest image light intensity. Example 2 has improved cross-talk 83:1, Example 3 has very low and highly desirable cross-talk of 3990:1 and 7690:1 and provides the highest image light intensity.

TABLE 2

Image light intensities and cross-talk

| | $I_{11}$ (undesired) | $I_{12}$ (desired) | $I_{21}$ (desired) | $I_{22}$ (undesired) |
|---|---|---|---|---|
| Example 1 - 45° MacNeille Polarizer $R_1 = 0.999, R_2 = 0.20, T_1 = 0.001, T_2 = 0.8, \omega = 0.8, R_m = 1.0$ | | | | |
| Light intensity | 0.0004 | 0.6714 | 0.6396 | 0.0322 |
| Image cross-talk | $I_{12}:I_{22} = 21:1$ | | $I_{21}:I_{11} = 1780:1$ | |
| Example 2 - 52° Broadband polarizing beam-splitter $R_1 = 0.96, R_2 = 0.04, T_1 = 0.04, T_2 = 0.96, \omega = 0.8, R_m = 1.0$ | | | | |
| Light intensity | 0.0090 | 0.7450 | 0.7450 | 0.0090 |
| Image cross-talk | $I_{12}:I_{22} = 83:1$ | | $I_{21}:I_{11} = 83:1$ | |
| Example 3 - 69° Li Li PBS $R_1 = 0.9995, R_2 = 0.001, T_1 = 0.0005, T_2 = 0.999, \omega = 0.8, R_m = 1.0$ | | | | |
| Light intensity | 0.0002 | 0.7986 | 0.7986 | 0.0002 |
| Image cross-talk | $I_{12}:I_{22} = 3990:1$ | | $I_{21}:I_{11} = 7960:1$ | |

Figure 6B:
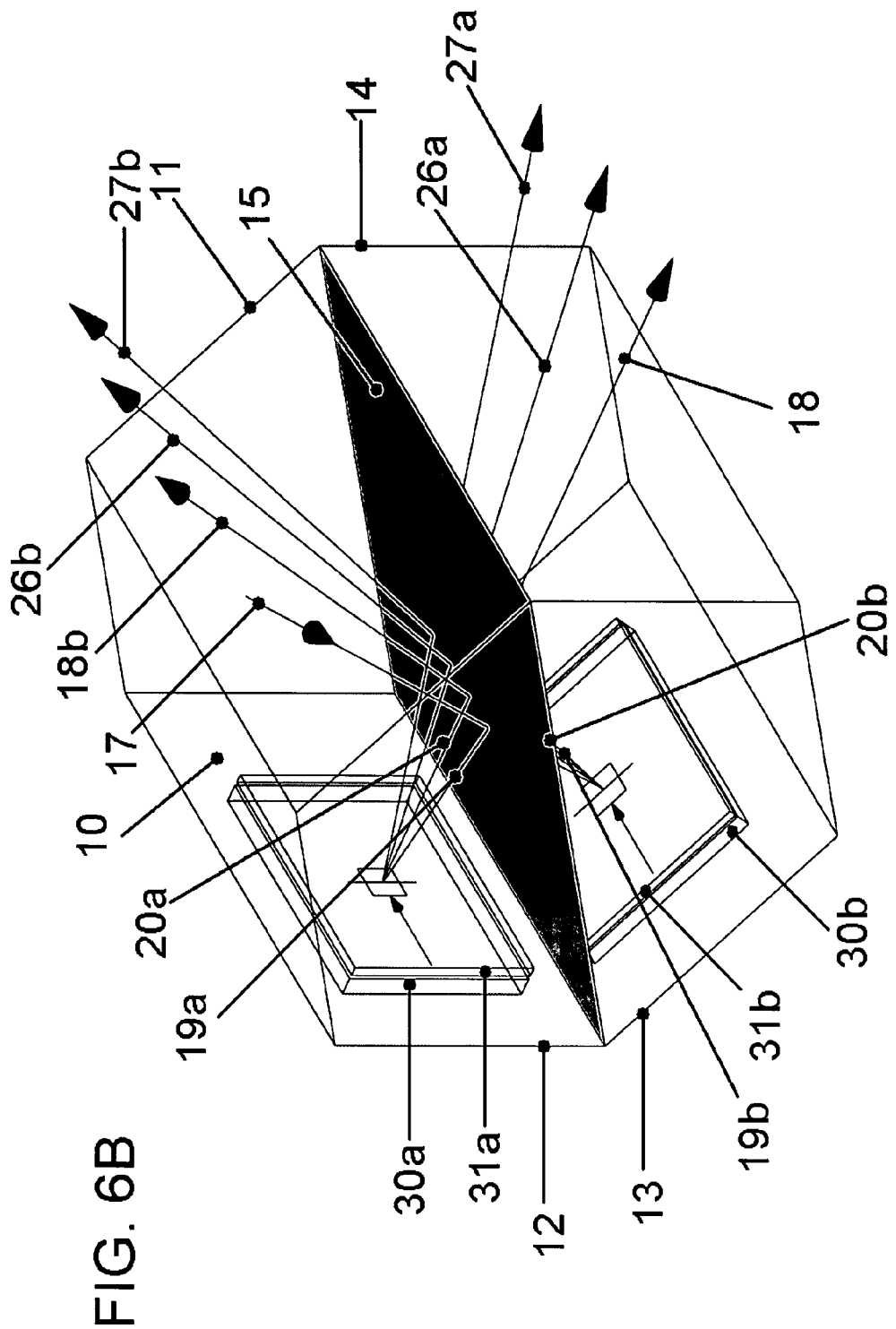
FIG. 6B is a schematic three-dimensional perspective view of an image-combining device having two type M4 MEM devices and a polarizing beam-splitter in Type II alignment in accordance with the present invention.
Figure 6C:
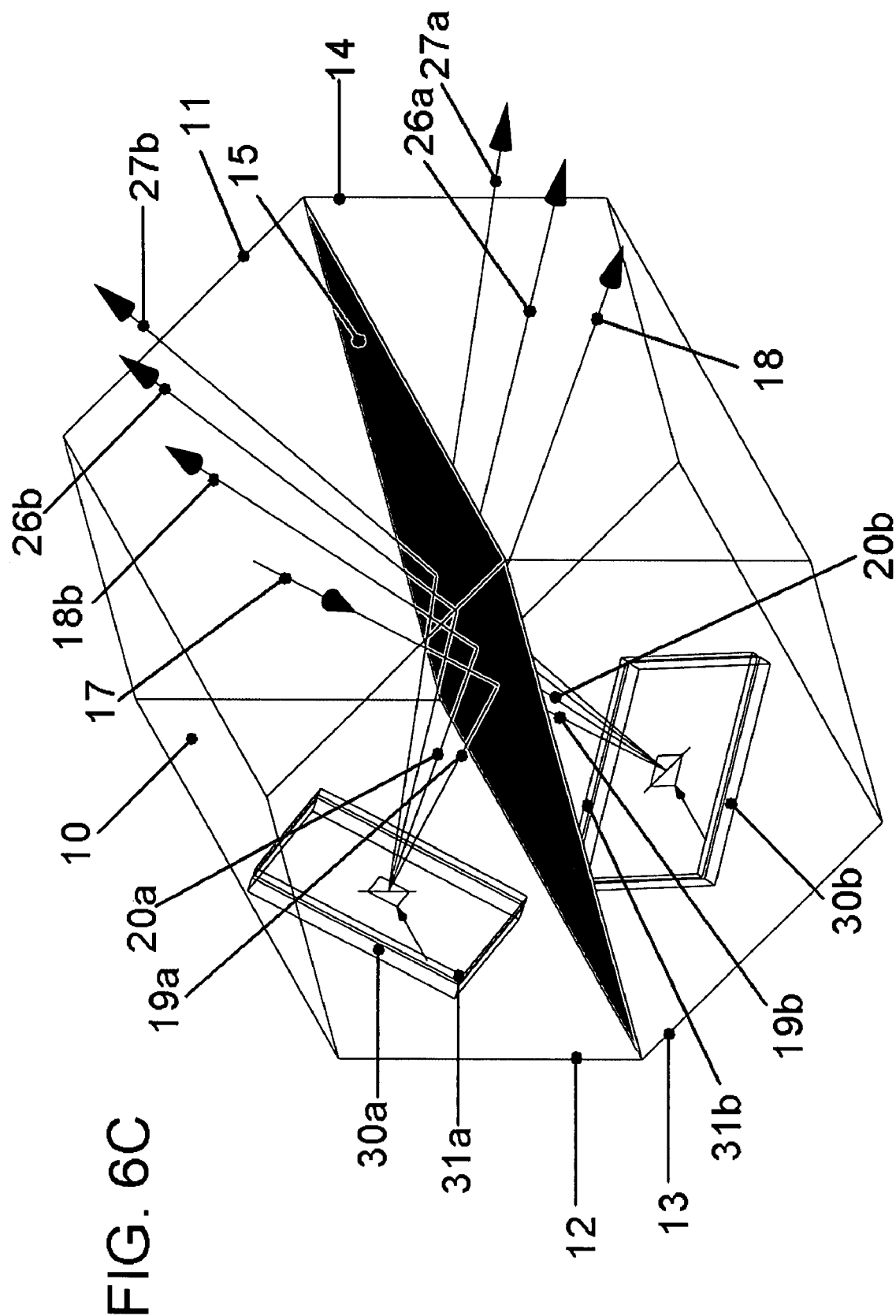
FIG. 6C is a schematic three-dimensional perspective view of an image-combining device having a pair of Type M1 and M2 MEM devices and a polarizing beam-splitter in Type II alignment in accordance with the present invention.
Figure 6D:
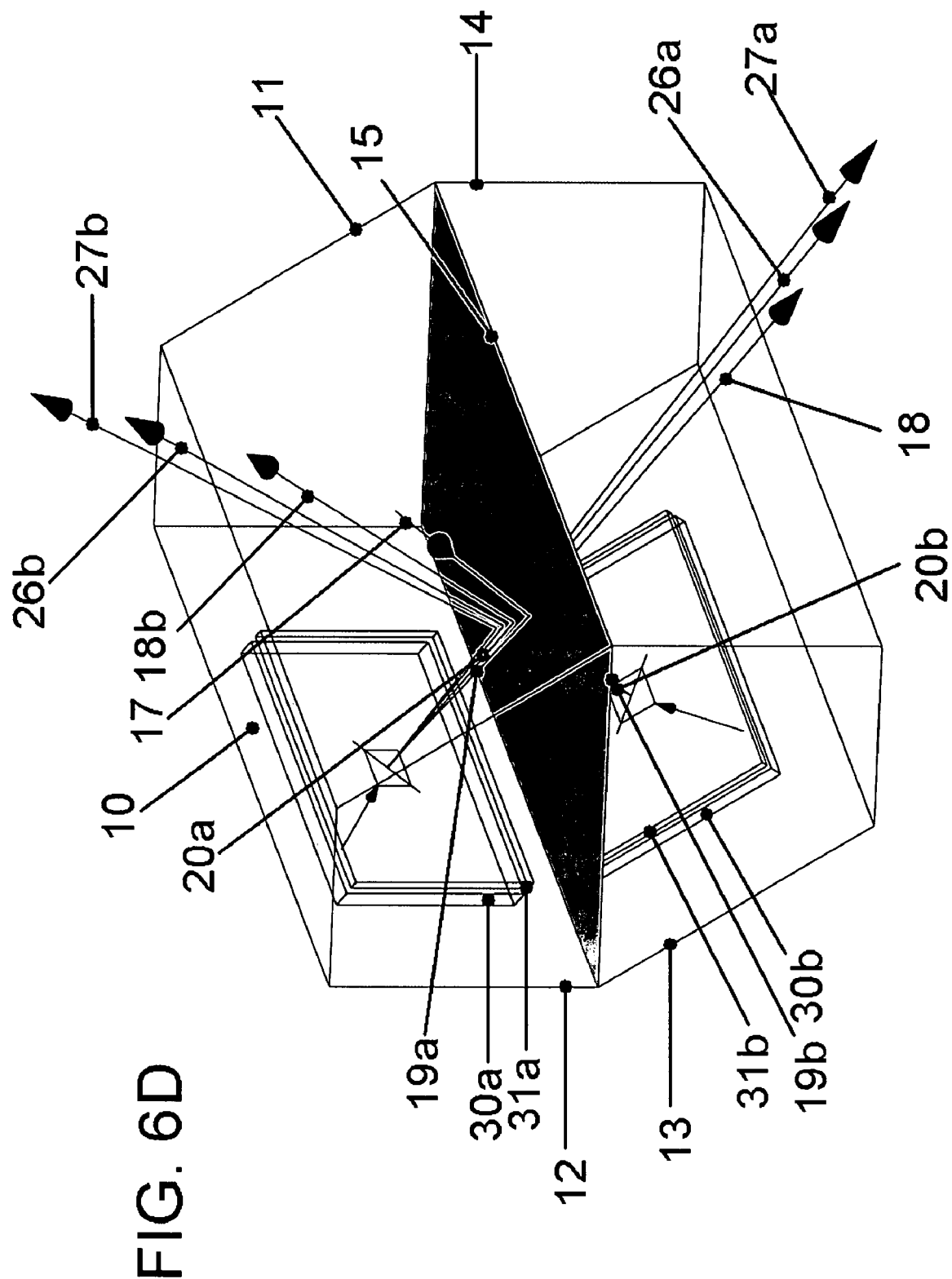
FIG. 6D is a schematic three-dimensional perspective view of an image-combining device having a pair of Type M1 and M2 MEM devices and a polarizing beam-splitter in Type III alignment in accordance with the present invention.
Figure 6E:
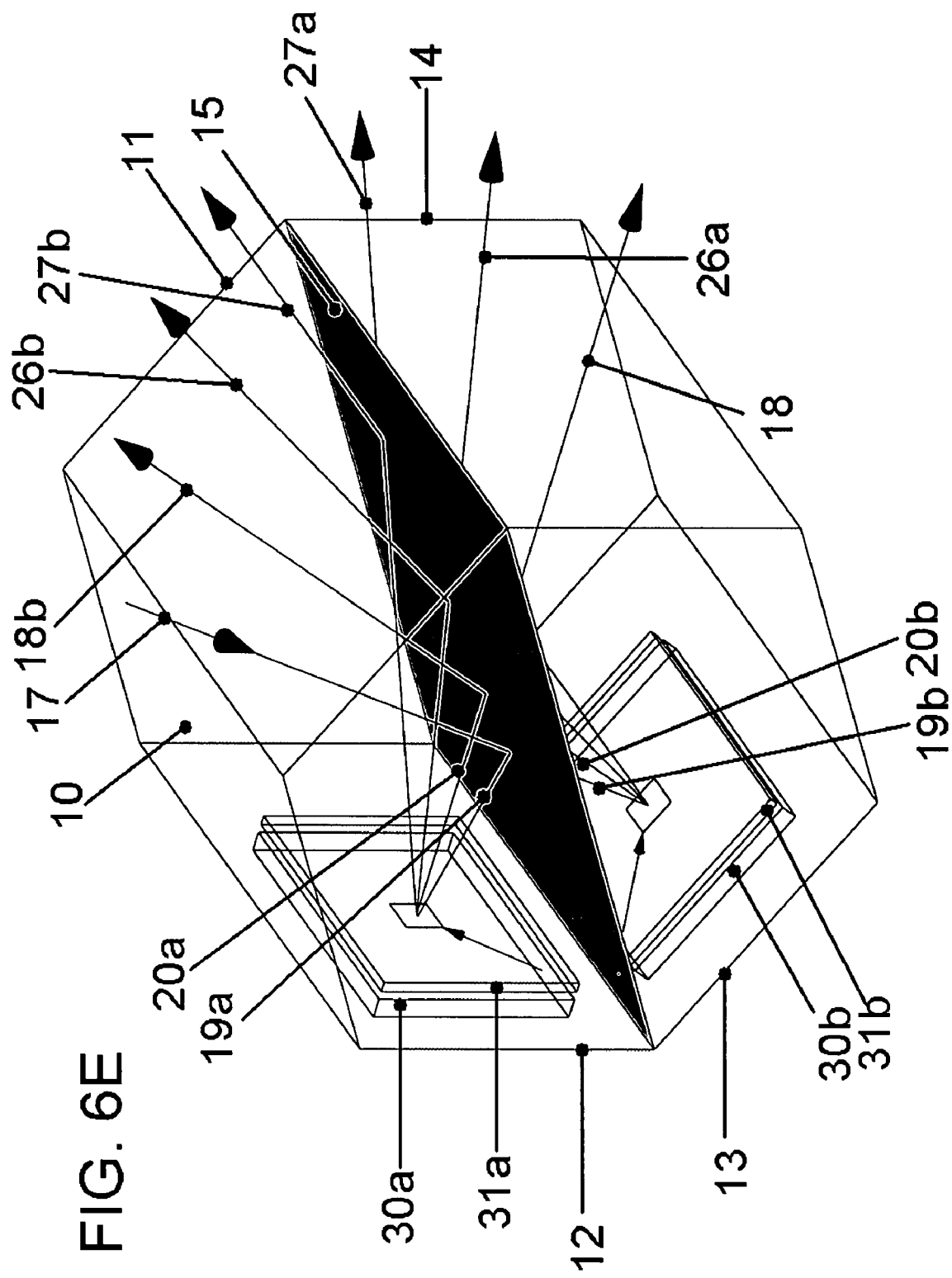
FIG. 6E is a schematic three-dimensional perspective view of an image-combining device having a pair of Type M1 and M2 MEM devices and a polarizing beam-splitter in Type IV alignment in accordance with the present invention.

In the first embodiment and its variations, different types of MEM devices as well as different light alignment approaches can be used. By way of example, FIG. 6B shows a schematic three-dimensional perspective view of an image-combining device in accordance with the present invention, comprising of two M4 MEM devices and a polarizing beam-splitter in the Type II alignment. FIG. 6C shows a schematic three-dimensional perspective view of an image-combining device in accordance with the present invention, comprising of one each of M1 and M2 MEM devices and a polarizing beam-splitter in Type II alignment. FIG. 6D shows a schematic three-dimensional perspective view of an image-combining device in accordance with the present invention, comprising of one each of M1 and M2 MEM devices and a polarizing beam-splitter in the type III alignment. FIG. 6E shows a schematic three-dimensional perspective view of an image-combining device in accordance with the present invention, comprising of one each of M1 and M2 MEM devices and a polarizing beam-splitter in the type IV alignment.

Without departing from the present invention, other types of MEM devices, polarization beam-splitters and light alignment approaches can be used as well in the first embodiment and its variations.

Second Embodiment

Figure 7C:
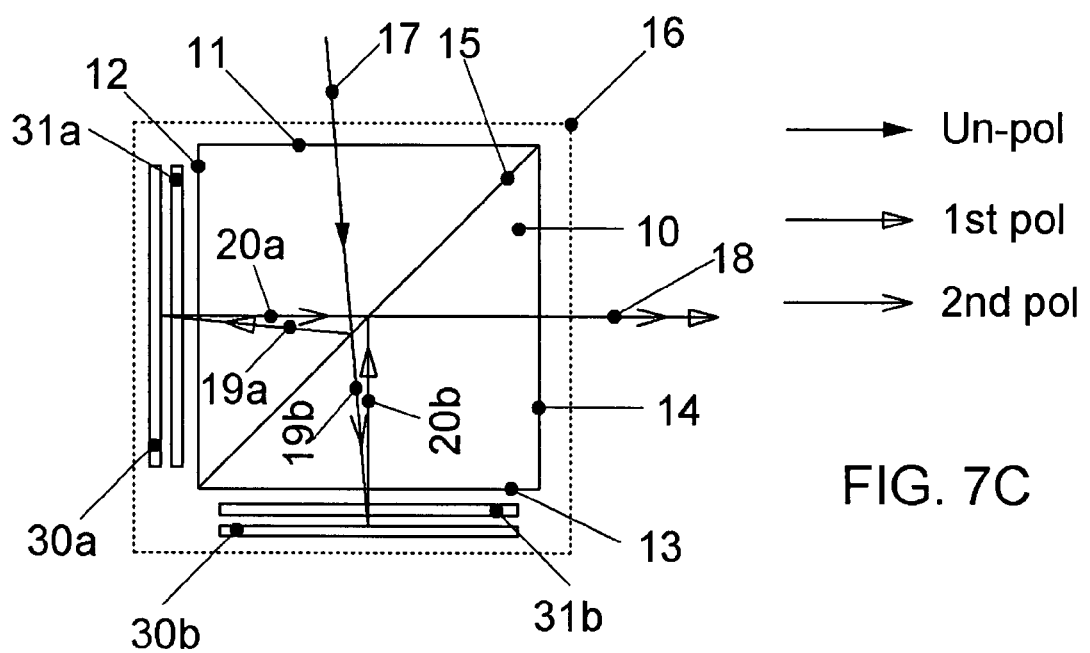
FIG. 7C is a schematic view of an image-combining device having two MEM devices and a polarizing beam-splitter in Type IV alignment in accordance with the present invention.
Figure 7A:
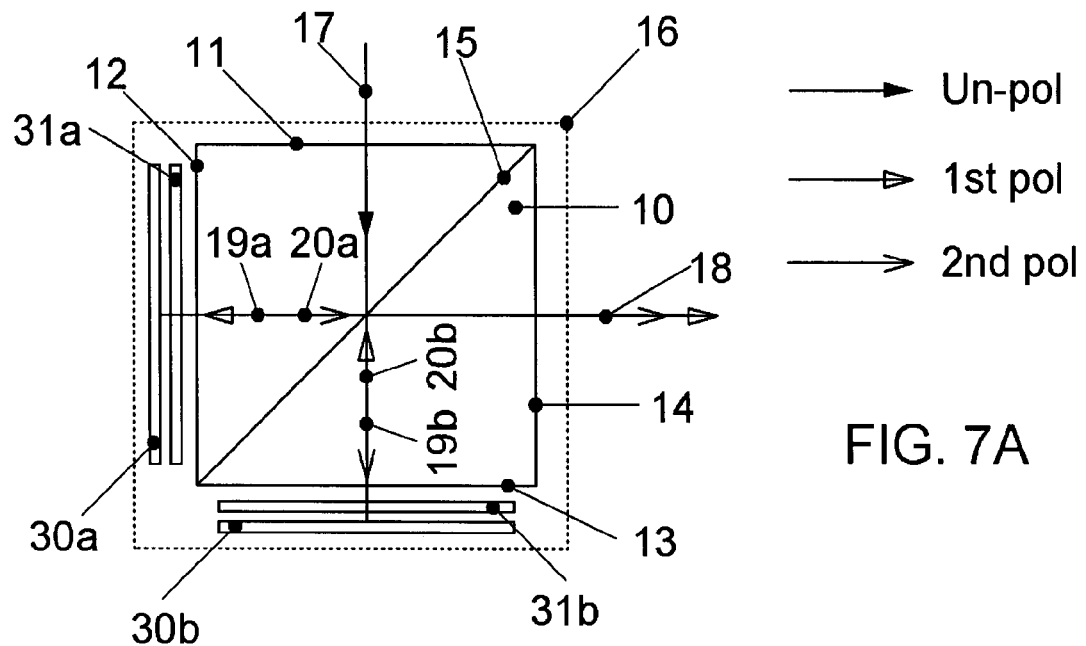
FIG. 7A is a schematic view of an image-combining device having two MEM devices and a polarizing beam-splitter in Type II alignment in accordance with the present invention.
Figure 8A:
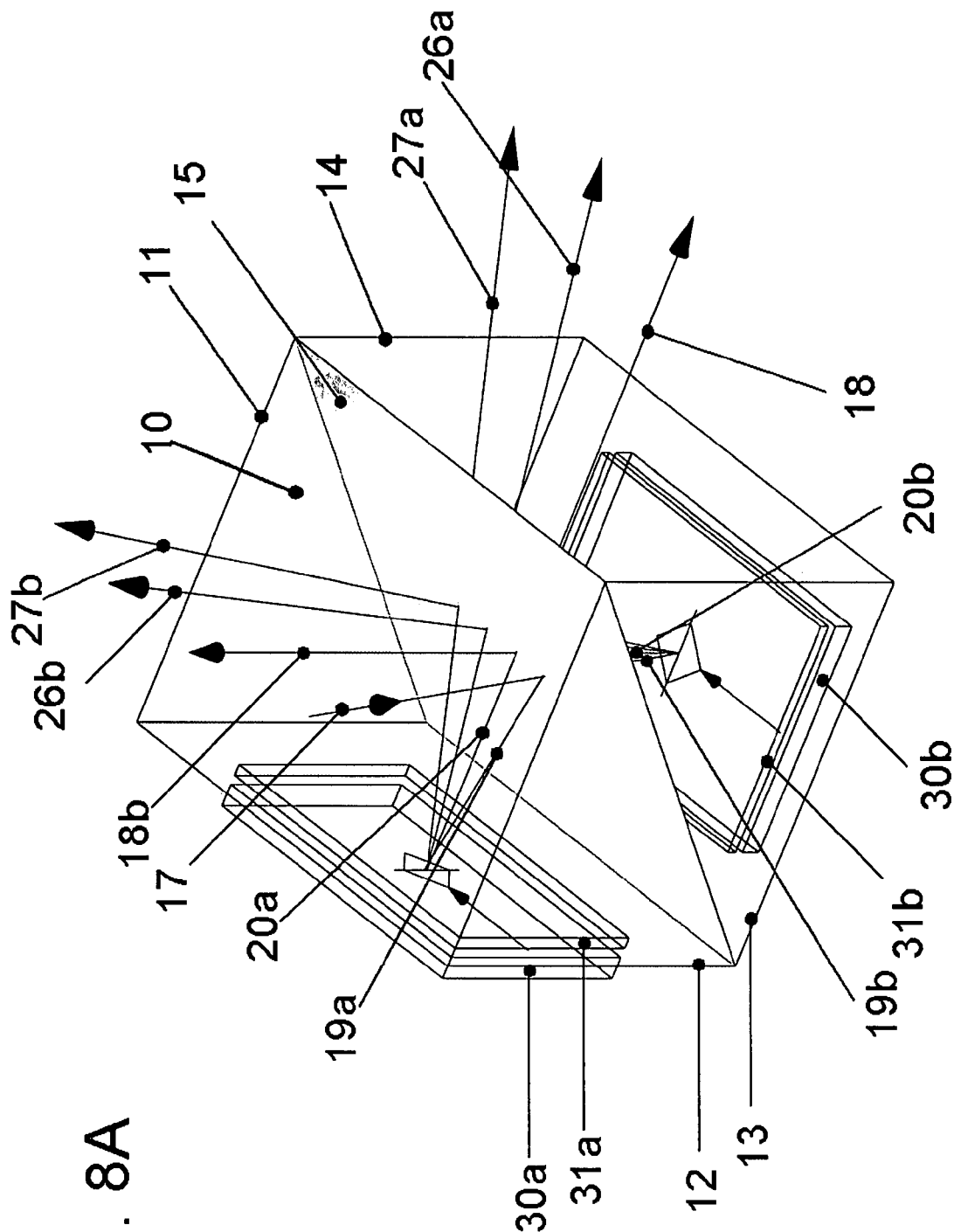
FIG. 8A is a schematic three-dimensional perspective view of an image-combining device having two MEM devices and a polarizing beam-splitter in Type II alignment as shown in FIG. 7A in accordance with the present invention.

The second embodiment of an image-combining device 16 in accordance with the present invention is shown in FIG. 7A in a two-dimensional schematic view and in FIG. 8A in a schematic three-dimensional perspective view. It comprises of a polarizing beam-splitter 10 having a beam-splitting surface 15, an incident port 11, reflecting port 12, a transmitting port 13 and an output port 14; a set of a waveplate 31a and a MEM device 30a adjacent to the reflecting port 12; another set of a waveplate 31b and a MEM device 30b, adjacent to the transmitting port 13. The operation of the second embodiment is explained below.

An un-polarized incident beam 17 from the incident port 11, is incident upon the polarizing beam-splitter 10, the beam-splitting surface 15 separates the incident beam 17 into a reflected light beam 19a of a first polarization and a transmitted light beam 19b of a second polarization as shown in FIGS. 7A and 8A. The first polarization and the second polarization are orthogonal to each other. In FIG. 7A the light beams are marked with different arrows according to their polarization states of un-polarized, first polarization and second polarization, respectively.

For the reflected first polarization beam 19a, it exits the reflecting port 12 and then passes through the waveplate 31a which changes the polarization state of the light and is then incident onto the MEM device 30a. The incident light will be reflected back by individual micro-mirrors or pixels of the MEM device at different angles according to the pixels' states: "on" or "off". Images are encoded onto the MEM device by reflecting the incident light at different angles for "on" and "off" pixels. The reflected "on" pixel light beam 20a, also called the first image light beam, is along the normal of the MEM device surface. It passes through the waveplate 31a and enters the PBS at port 12. The waveplate 31a change the polarization state of the image light into the second polarization. Preferably, the waveplate 31a is a quarter-wave plate, or combinations of waveplates that rotate the polarization state from the first polarization to the second polarization, and vise versa. The image light 20a, thus, passes through the beam-splitting surface 15 and exits the PBS from the output port 14 as beam 18 shown in FIGS. 7A and 8A. For the light reflected from the "off" pixels as shown in FIG. 8A, depending on the polarization state of this light and the transmittance and reflectance of the polarizing beam splitter, some or all of the light may pass through the beam-splitting surface 15 as shown as beam 27a; or, some or all of the light may be reflected by the beam-splitter surface 15 as shown as beam 27b. Beams 27a and 27b travel in different directions than those of the image light 18 and incident light 17, and will be absorbed by light absorbers not shown in the figure. Light reflected from "flat" pixels or any flat surfaces under or near the pixels, will travel in the direction 26a or 26b or both, similar to the "off" pixel light. Again, the "flat" light travels in different optical paths that those of the image light and the incident beam, and thus will be absorbed by light absorbers not shown in the figure. If the waveplate is not perfect, there will be some residual light in the first polarization for the image light, this light will be reflected in the direction of 18b, which is different from the image light 18 and the incident light 17, and will be absorbed by light absorbers. It will have very little impact on the contrast of the image-combining device 16.

For the transmitted second polarization beam 19b, it exits the transmitting port 13 and then passes through the waveplate 31b that changes the polarization state of the light and is then incident onto the MEM device 30b. The incident light will be reflected back by individual micro-mirrors or pixels of the MEM device at different angles according to the pixels' states: "on" or "off". Images are encoded onto the MEM device by reflecting the incident light at different angles for "on" and "off" pixels. The reflected "on" pixel light beam 20b, also called the second image light beam, is along the normal of the MEM device surface. This light passes through the waveplate 31b again. The waveplate 31b is similar to waveplate 31a and changes the polarization state of the image light into the first polarization. Preferably, the waveplate 31b is a quarter-wave plate, or combinations of waveplates that rotate the polarization state from the first polarization to the second polarization, and vise versa. The image light 20b, is thus reflected by the beam-splitting surface 15 and exits the PBS from the output port 14 as beam 18 shown in FIGS. 7A and 8A. For the light reflected from the "off" pixels as shown in FIG. 8A, depending on the polarization state of this light and the transmittance and reflectance of the polarizing beam splitter, some or all of the light may pass through the beam-splitting surface 15 as shown as beam 27b; or, some or all of the light may be reflected by the beam-splitter surface 15 as shown as beam 27a. Beams 27a and 27b travel in different directions than those of the image light 18 and incident light 17, and will be absorbed by light absorbers not shown in the figure. For the light reflected from "flat" pixels, or any flat surfaces under or near the pixels, it will travel in the direction 26a or 26b or both. Again, this light travels in different optical paths than those of the image light and the incident beam, and thus will be absorbed by light absorbers not shown in the figure. If the waveplate is not perfect, there will be some residual light in the second polarization in the image light, this light will travel in the direction of 18b, which is different from the image light 18 and the incident light 17, and will be absorbed by light absorbers. It will have very little impact on the contrast of the image-combining device 16.

In the second embodiment, as explained above, the polarizing beam-splitter combines the first image light, having the second polarization state, with the second image light, having the first polarization state. The two images can be identical 2D images, or represent left-eye and right-eye images for forming 3D stereoscopic images. The polarizing beam-splitter acts like two polarizers in series for both the image light beams. This is advantageous because any unwanted leakage from the polarizing beam-splitter will be filtered out in direction 18b by the polarizing beam-splitter. As a result, very little cross-talk will exist between the two images with orthogonal polarizations and high quality 3D stereo images can be obtained. Furthermore, the requirement for the contrast ratio of the polarizing beam-splitter can be less strict. Most importantly, all the un-polarized light is used for imaging, no light is lost due to polarization. Thus, the image-combining device is very light efficient.

Figure 7B:
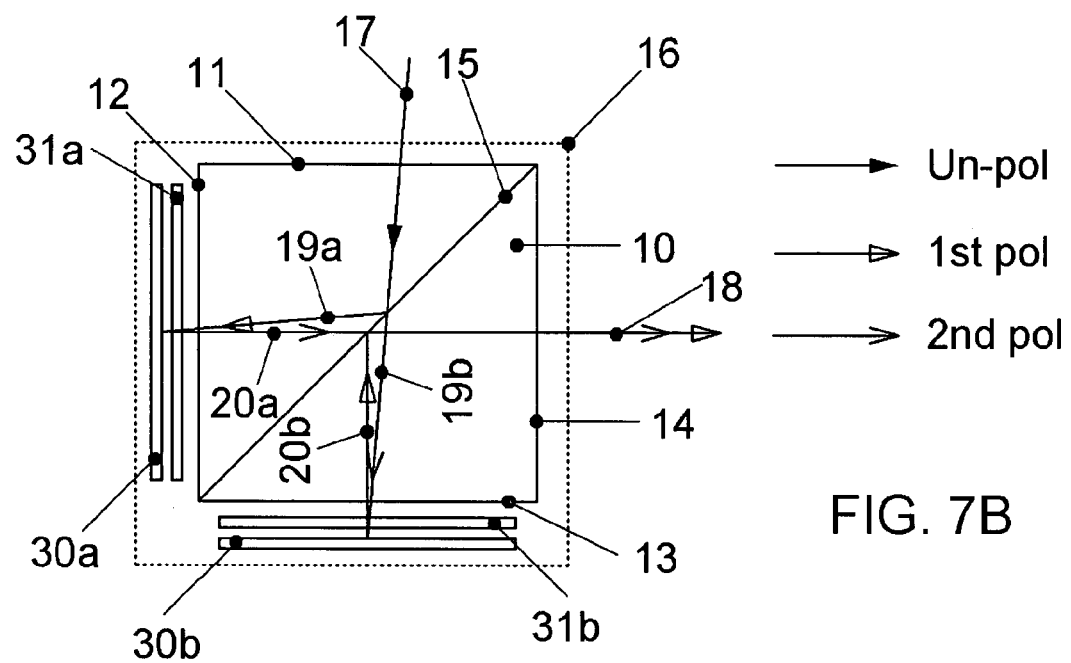
FIG. 7B is a schematic view of an image-combining device having two MEM devices and a polarizing beam-splitter in Type III alignment in accordance with the present invention.

A variation of the second embodiment in accordance with the present invention is shown in FIG. 7B. This variation is similar to the second embodiment as shown in FIG. 7A. The only difference between this variation and the embodiment shown in FIG. 7A is that the MEM devices and the polarizing beam-splitter are arranged according to Type III alignment. All of the above description about the second embodiment as shown in FIG. 7A also applies to this variation. The exceptions are that in this variation shown in FIG. 7B the incident beam 17 and the reflected beam 19a, and transmitted beam 19b, as well as the light from "flat" and "off" pixels of the MEM devices 30a and 30b travel in directions different to those of the second embodiment shown in FIG. 7A. In this variation, the incident light has a larger angle of incidence than that of the "on" pixel light at the beam-splitter surface.

Yet another variation of the second embodiment in accordance with the present invention is shown in FIG. 7C. This variation is also similar to the second embodiment as shown in FIG. 7A. The only difference between this variation and the embodiment shown in FIG. 7A is that the MEM devices and the polarizing beam-splitter are arranged according to Type IV alignment. All the above description about the second embodiment as shown in FIG. 7A also applies to this variation. The exceptions are that in this variation shown in FIG. 7C the incident beam 17 and the reflected beam 19a, and transmitted beam 19b, as well as the light from "flat" and "off" pixels of the MEM devices 30a and 30b travel in directions different than those of the second embodiment shown in FIG. 7A. In this variation, the incident light has a smaller angle of incidence than that of the "on" pixel light at the beam-splitter surface.

In the second embodiment and its variations, the polarizing beam-splitter operates at angles of incidence around 45° for the central ray. It can be selected from the A, C or D PBS types as described in the preamble. In a Type A PBS, the first and second polarizations are s- and p-polarized, respectively. Type A PBS consists of thin film interference coatings between glass prisms. In a type C or D PBS, the first polarization can be s- or p-polarized, thus the second polarization can be p-polarized or s-polarized, respectively.

Figure 8B:
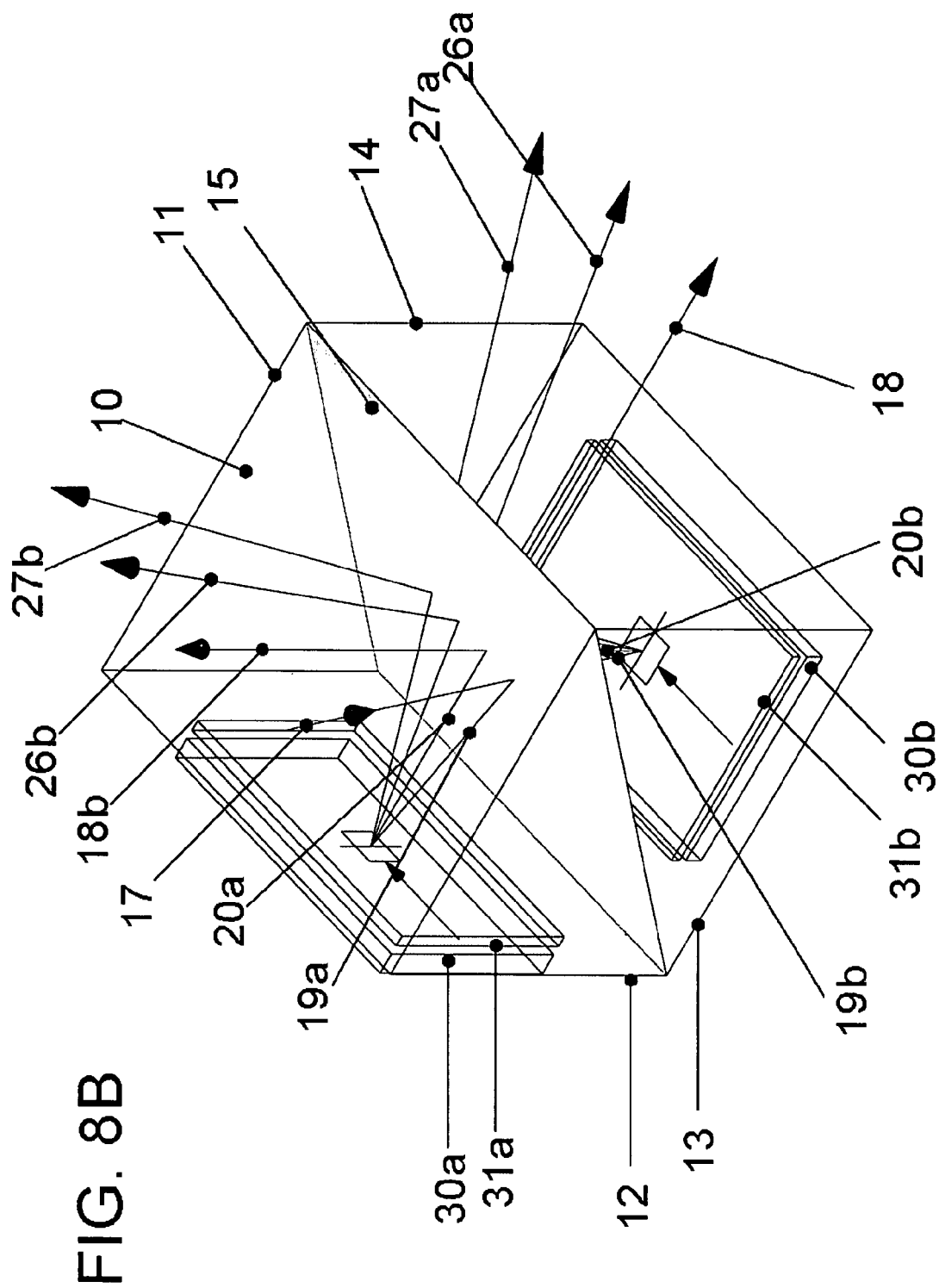
FIG. 8B is a schematic three-dimensional perspective view of an image-combining device having two Type M4 MEM devices and a polarizing beam-splitter in Type II alignment in accordance with the present invention.
Figure 8C:
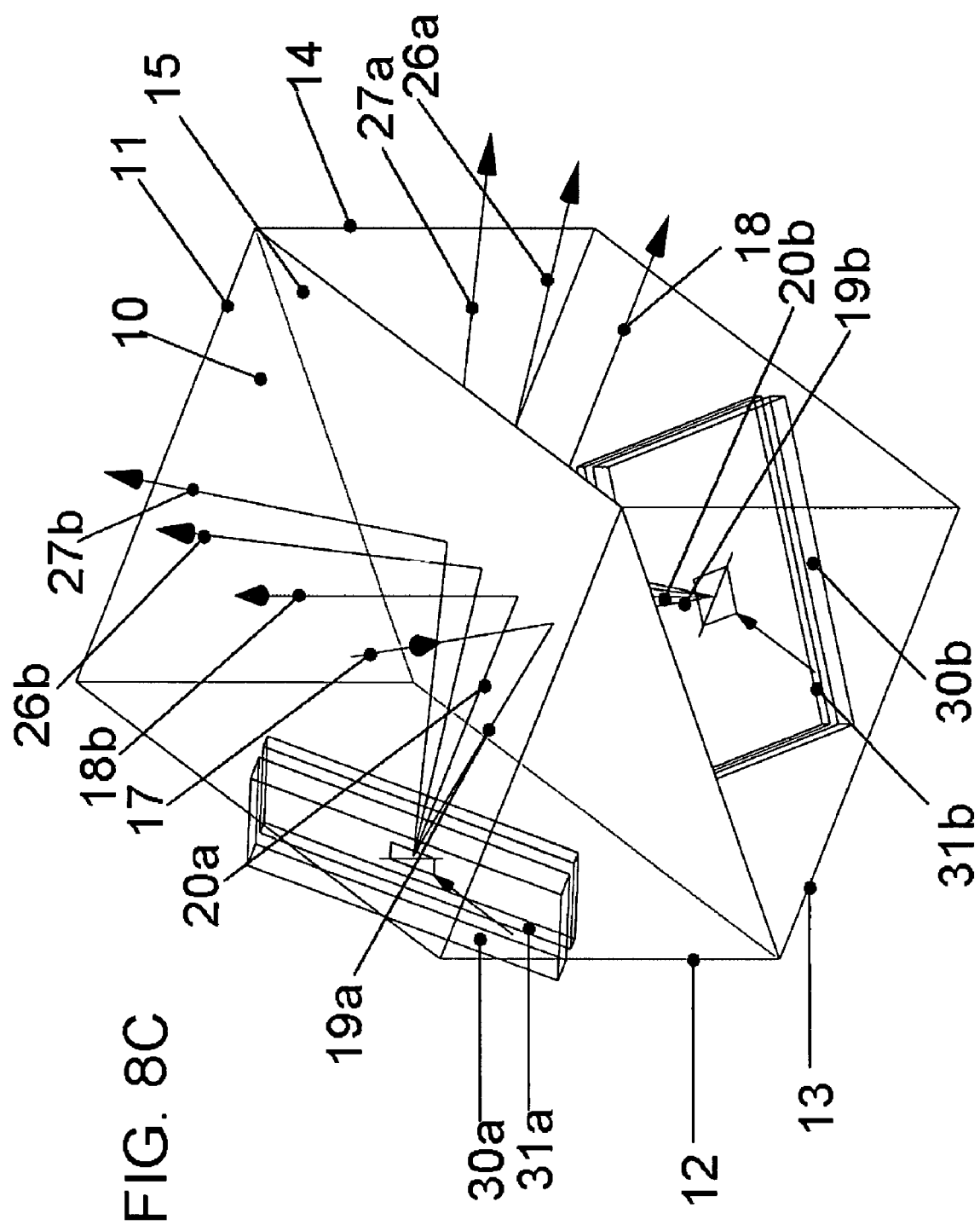
FIG. 8C is a schematic three-dimensional perspective view of an image-combining device having a pair of Type M1 and M2 MEM devices and a polarizing beam-splitter in Type II alignment in accordance with the present invention.
Figure 8D:
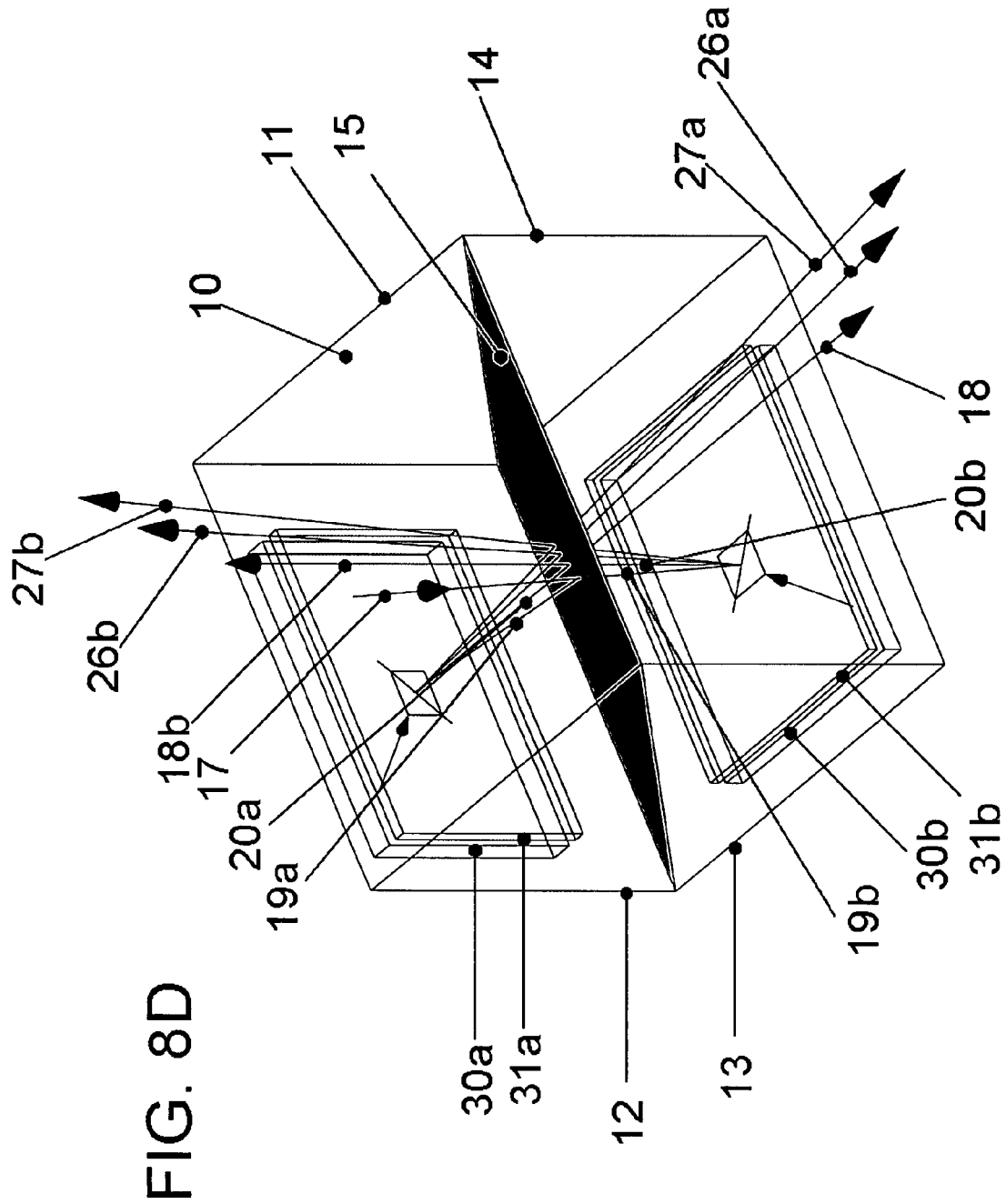
FIG. 8D is a schematic three-dimensional perspective view of an image-combining device having a pair of Type M1 and M2 MEM devices and a polarizing beam-splitter in Type III alignment in accordance with the present invention.
Figure 8E:
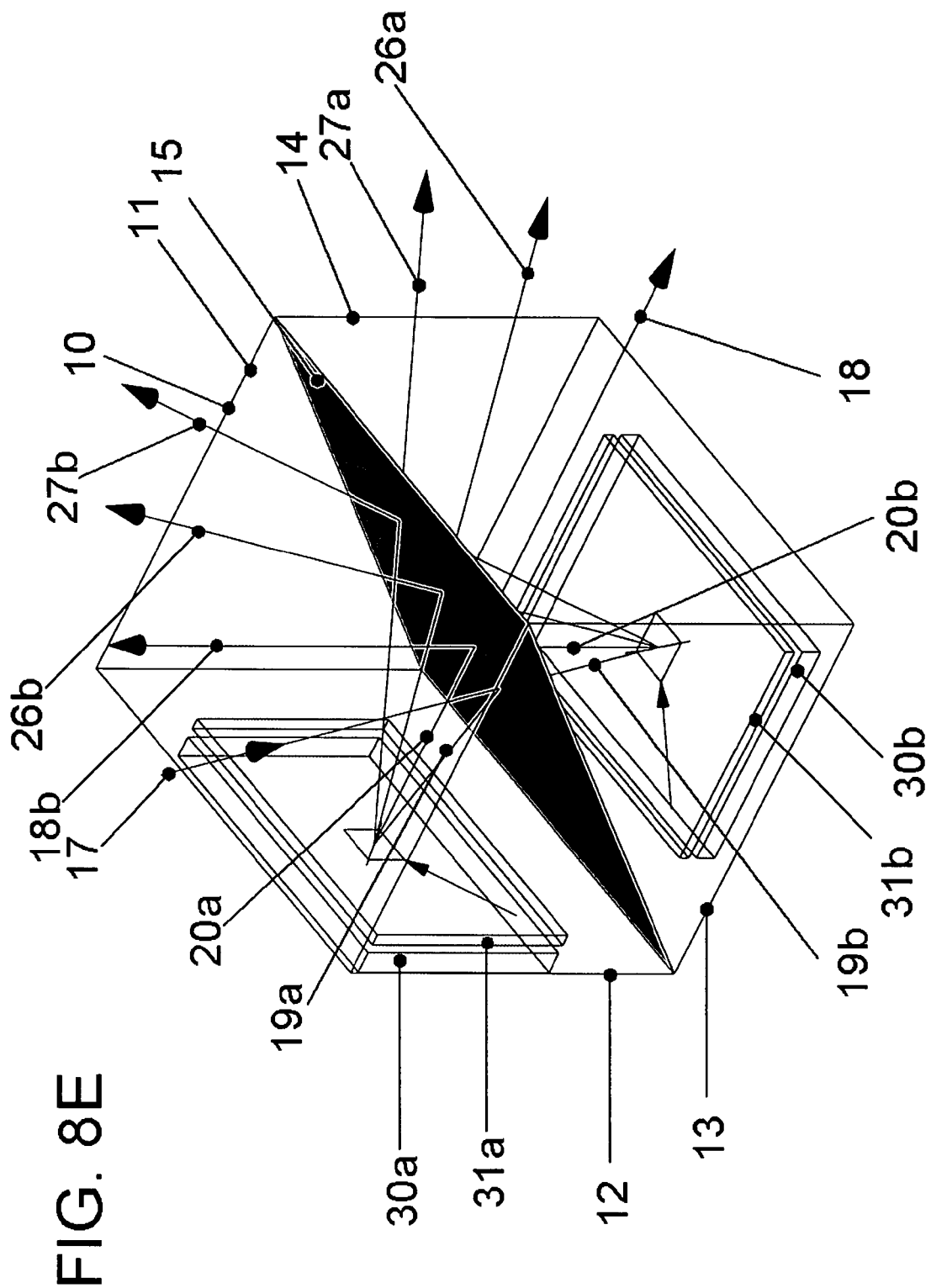
FIG. 8E is a schematic three-dimensional perspective view of an image-combining device having a pair of Type M1 and M2 MEM devices and a polarizing beam-splitter in Type IV alignment in accordance with the present invention.

In the second embodiment and its variations, different types of the MEM devices as well as different light alignment approaches can be used. By way of example, FIG. 8B shows a schematic three-dimensional perspective view of an image-combining device in accordance with the present invention, comprising of two M4 MEM devices and a polarizing beam-splitter in the Type II alignment. FIG. 8C shows a schematic three-dimensional perspective view of an image-combining device in accordance with the present invention, comprising of one each of M1 and M2 MEM devices and a polarizing beam-splitter in Type II alignment. FIG. 8D shows a schematic three-dimensional perspective view of an image-combining device in accordance with the present invention, comprising of one each of M1 and M2 MEM devices and a polarizing beam-splitter in the type III alignment. FIG. 8E shows a schematic three-dimensional perspective view of an image-combining device in accordance with the present invention, comprising of one each of M1 and M2 MEM devices and a polarizing beam-splitter in the type IV alignment.

Without departing from the present invention, other types of MEM devices, polarization beam-splitters and light alignment approaches can be used as well in the second embodiment and its variations.

Third Embodiment

Figure 9A:
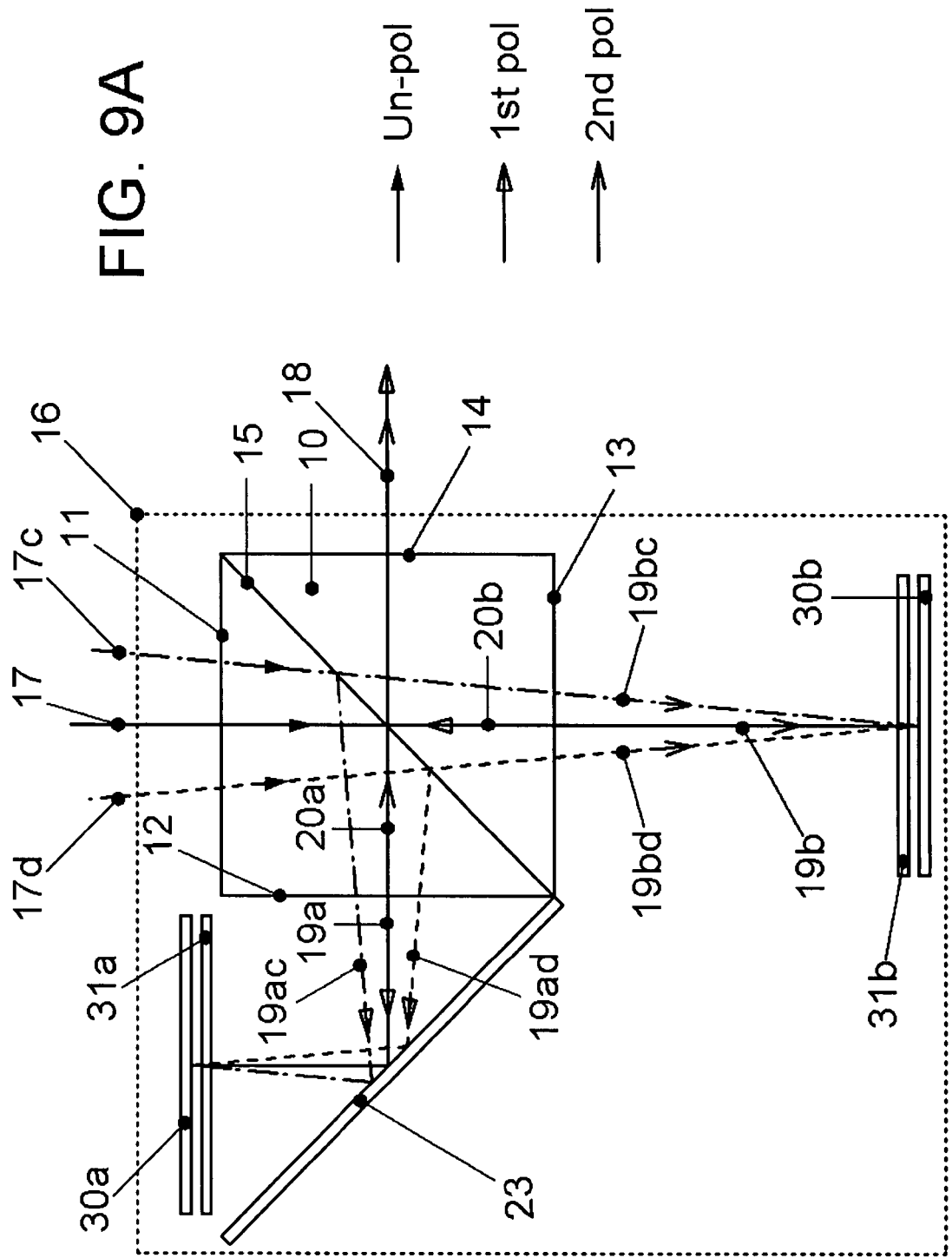
FIG. 9A is a schematic view of an image-combining device having two MEM devices, a polarizing beam-splitter and a plate mirror in the reflected light path from the PBS in accordance with the present invention.

The third embodiment of an image-combining device 16 in accordance with the present invention is shown in FIG. 9A in a two-dimensional schematic view. It comprises of a polarizing beam-splitter 10 having a beam-splitting surface 15, an incident port 11, reflecting port 12, a transmitting port 13 and an output port 14; a mirror 23 adjacent to the reflecting port 12; a set of a waveplate 31a and a MEM device 30a adjacent to the mirror 23; another set of a waveplate 31b and a MEM device 30*b*, adjacent to the transmitting port 13. The operation of the second embodiment is explained below.

An un-polarized incident beam 17 from the incident port 11, is incident upon the polarizing beam-splitter 10, the beam-splitting surface 15 separates the incident beam 17 into a reflected light beam 19*a* of a first polarization and a transmitted light beam 19*b* of a second polarization as shown in FIG. 9A. The first polarization and the second polarization are orthogonal to each other. In FIG. 9A, the light beams are marked with different arrows according to their polarization states of un-polarized, first polarization and second polarization, respectively.

For the reflected first polarization beam 19*a*, it exits the reflecting port 12 and then is reflected by the mirror 23 towards to the waveplate 31*a* and the MEM device 30*a*. The incident light will be reflected back by individual micro-mirrors or pixels of the MEM device at different angles according to the pixels' states: "on" or "off". Images are encoded onto the MEM device by reflecting the incident light at different angles for "on" and "off" pixels. The reflected "on" pixel light beam 20*a*, also called the first image light beam, is along the normal of the MEM device surface. It passes through the waveplate 31*a*, is reflected by the mirror 23 again and enters the PBS at port 12. The waveplate 31*a* change the polarization state of the image light into the second polarization. Preferably, the waveplate 31*a* is a quarter-wave plate, or combinations of waveplates that rotate the polarization state from the first polarization to the second polarization, and vise versa. The image light 20*a*, thus, passes through the beam-splitting surface 15 and exits the PBS from the output port 14 as beam 18 shown in FIG. 9A. For the light reflected from the "off" pixels not shown in the figure, depending on the polarization state of this light and the transmittance and reflectance of the polarizing beam splitter, some or all of the light may pass through the beam-splitting surface; or, some or all of the light may be reflected by the beam-splitter surface 15. The "off" pixel beams travel in different directions than those of the image light 18 and incident light 17, and will be absorbed by light absorbers not shown in the figure. Light reflected from "flat" pixels, or any flat surfaces under or near the pixels, will travel in different optical paths that those of the image light and the incident beam, and thus will be absorbed by light absorbers not shown in the figure. If the waveplate is not perfect, there will be some residual light in the first polarization for the image light, this light will be in a different path than those of the image light 18 and the incident light 17, and will be absorbed by light absorbers. It will have very little impact on the contrast of the image-combining device 16.

For the transmitted second polarization beam 19*b*, it exits the transmitting port 13 and then passes through the waveplate 31*b* that changes the polarization state of the light and is then incident onto the MEM device 30*b*. The incident light will be reflected back by individual micro-mirrors or pixels of the MEM device at different angles according to the pixels' states: "on" or "off". Images are encoded onto the MEM device by reflecting the incident light at different angles for "on" and "off" pixels. The reflected "on" pixel light beam 20*b*, also called the second image light beam, is along the normal of the MEM device surface. This light passes through the waveplate 31*b* again. The waveplate 31*b* is similar to waveplate 31*a* and changes the polarization state of the image light into the first polarization. Preferably, the waveplate 31*b* is a quarter-wave plate, or combinations of waveplates that rotate the polarization state from the first polarization to the second polarization, and vise versa. The image light 20*b*, is thus reflected by the beam-splitting surface 15 and exits the PBS from the output port 14 as beam 18 shown in FIG. 9A. For the light reflected from the "off" pixels as shown in FIG. 8A, depending on the polarization state of this light and the transmittance and reflectance of the polarizing beam splitter, some or all of the light may pass through the beam-splitting surface 15; or, some or all of the light may be reflected by the beam-splitter surface 15. The "off" pixel beams travel in different directions than those of the image light 18 and incident light 17, and will be absorbed by light absorbers not shown in the figure. For the light reflected from "flat" pixels, or any flat surfaces under or near the pixels, it will travel in different optical paths that those of the image light and the incident beam, and thus will be absorbed by light absorbers not shown in the figure. If the waveplate is not perfect, there will be some residual light in the second polarization in the image light, this light will travel in the direction of 18*b*, which is different from the image light 18 and the incident light 17, and will be absorbed by light absorbers. It will have very little impact on the contrast of the image-combining device 16.

In the third embodiment, as explained above, the polarizing beam-splitter combines the first image light, having the second polarization state, with the second image light, having the first polarization state. The two images can be identical 2D images, or represent left-eye and right-eye images for forming 3D stereoscopic images. The polarizing beam-splitter acts like two polarizers in series for both the image light beams. This is advantageous because any unwanted leakage from the polarizing beam-splitter will be filtered out by the polarizing beam-splitter in a different direction than those of the incident light 17 and the image light 18. As a result, very little crosstalk will exist between the two images with orthogonal polarizations and high quality 3D stereo images can be obtained. Furthermore, the requirement for the contrast ratio of the polarizing beam-splitter can be less strict. Most importantly, all the un-polarized light is used for imaging, no light is lost due to polarization. Thus, the image-combining device is very light efficient.

Figure 9B:
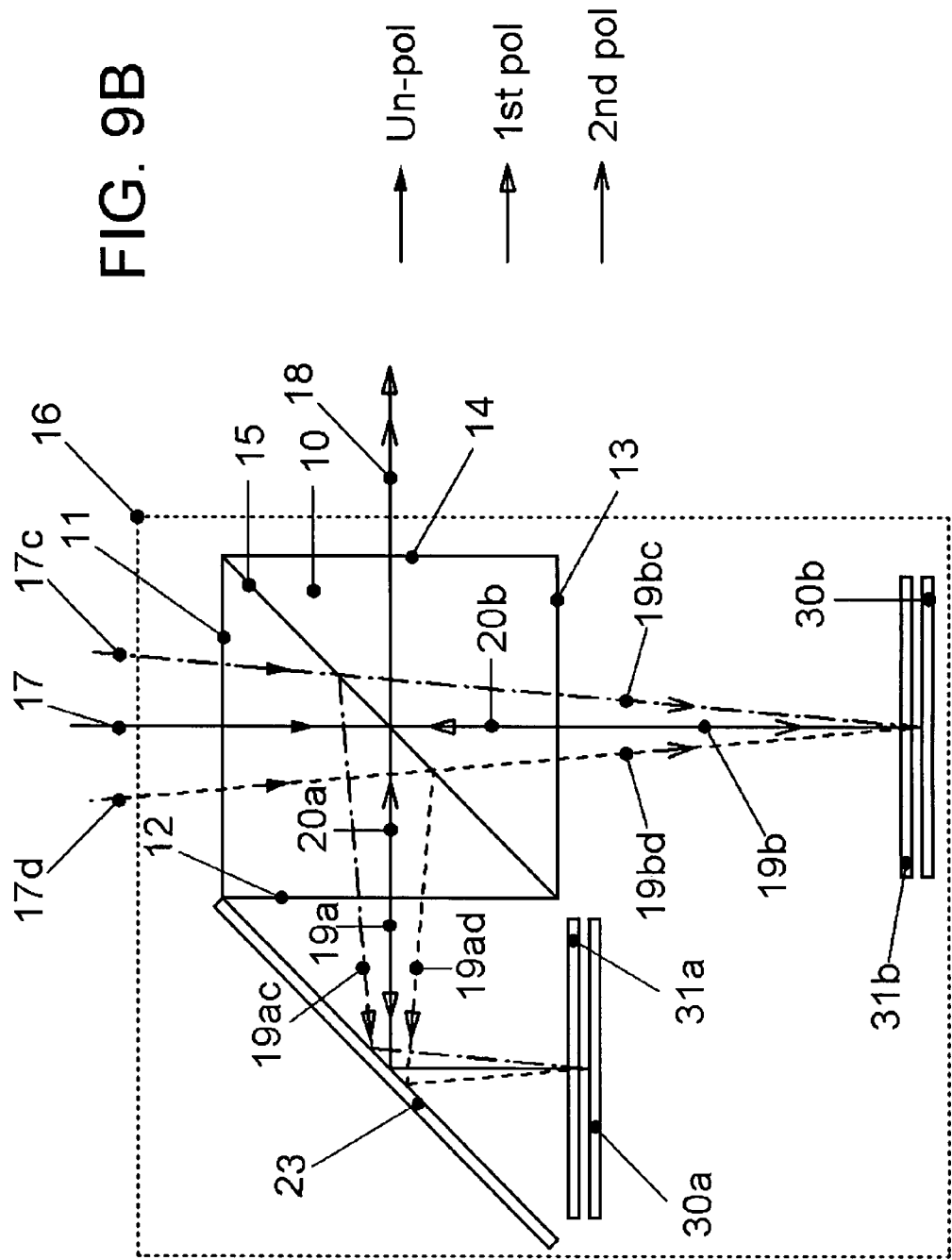
FIG. 9B is a schematic view of an image-combining device having two MEM devices, a polarizing beam-splitter and a plate mirror, positioned differently to FIG. 9A, in the reflected light path from the PBS in accordance with the present invention.

A variation of the third embodiment in accordance with the present invention is shown in FIG. 9B. This variation is similar to the third embodiment as shown in FIG. 9A. The only difference between this variation and the embodiment shown in FIG. 9A is that the plate mirror reflects the light downwards rather upwards. All the description about the third embodiment as shown in FIG. 9A also applies to this variation.

Yet another variation of the third embodiment in accordance with the present invention is shown in FIG. 9C. This variation is similar to the third embodiment as shown in FIG. 9A. The only difference between this variation and the embodiment shown in FIG. 9A is that the mirror 23*p* is in the form a prism, rather than a plate. To have identical optical path, the transmitted light also has added prism 22*p*.

Further variation of the third embodiment in accordance with the present invention is shown in FIG. 9D. This variation is similar to the variation of the third embodiment as shown in FIG. 9C, the only difference is that the prism mirror reflects light downwards rather upwards.

In the third embodiment and its variations, the polarizing beam-splitter operates at angle of incidence around 45° for the central ray. It can be selected from the A, C or D PBS types as described in the preamble. In a Type A PBS, the first and second polarizations are s- and p-polarized, respectively. Type A PBS consists of thin film interference coatings between glass prisms. In a type C or D PBS, the first polarization can be s- or p-polarized, thus the second polarization can be p-polarized or s-polarized, respectively.

In the third embodiment and its variations, the different MEM devices and light alignment approaches can be used.

Because of the use of mirror 23 or 23p, both the first and second image light beams are reflected once in the optical paths, thus identical MEM devices can be used for MEM devices 30a and 30b in the present invention. By way of example, the type III alignment approach is shown in dash-dotted lines in FIGS. 9A-9D for the incident beam 17c, the reflected beam 19ac of the first polarization and the transmitted beam 19bc of the second polarization. The type IV alignment approach is shown in dashed lines in FIGS. 9A-9D for the incident beam 17d, the reflected beam 19ad of the first polarization and the transmitted beam 19bd of the second polarization.

Without departing from the present invention, other types of MEM devices, polarization beam-splitters and light alignment approaches can be used as well in the second embodiment and its variations.

Fourth Embodiment

The fourth embodiment of an image-combining device 16 in accordance with the present invention is shown in FIG. 10A in a two-dimensional schematic view. It comprises of a polarizing beam-splitter 10 having a beam-splitting surface 15, an incident port 11, reflecting port 12, a transmitting port 13 and an output port 14; a set of a waveplate 31b and a MEM device 30b adjacent to the mirror 23; another set of a waveplate 31a and a MEM device 30a, adjacent to the reflecting port 12; and a mirror 23 adjacent to the transmitting port 13. The operation of the second embodiment is explained below.

An un-polarized incident beam 17 from the incident port 11, is incident upon the polarizing beam-splitter 10, the beam-splitting surface 15 separates the incident beam 17 into a reflected light beam 19a of a first polarization and a transmitted light beam 19b of a second polarization as shown in FIG. 10A. The first polarization and the second polarization are orthogonal to each other. In FIG. 10A, the light beams are marked with different arrows according to their polarization states of un-polarized, first polarization and second polarization, respectively.

For the reflected first polarization beam 19a, it exits the reflecting port 12 towards the waveplate 31a and the MEM device 30a. The incident light will be reflected back by individual micro-mirrors or pixels of the MEM device at different angles according to the pixels' states: "on" or "off". Images are encoded onto the MEM device by reflecting the incident light at different angles for "on" and "off" pixels. The reflected "on" pixel light beam 20a, also called the first image light beam, is along the normal of the MEM device surface. It passes through the waveplate 31a and enters the PBS at port 12. The waveplate 31a change the polarization state of the image light into the second polarization. Preferably, the waveplate 31a is a quarter-wave plate, or combinations of waveplates that rotate the polarization state from the first polarization to the second polarization, and vise versa. The image light 20a, thus, passes through the beam-splitting surface 15 and exits the PBS from the output port 14 as beam 18 shown in FIG. 10A. For the light reflected from the "off" pixels not shown in the figure, depending on the polarization state of this light and the transmittance and reflectance of the polarizing beam splitter, some or all of the light may pass through the beam-splitting surface; or, some or all of the light may be reflected by the beam-splitter surface 15. The "off" pixel beams travel in different directions than those of the image light 18 and incident light 17, and will be absorbed by light absorbers not shown in the figure. Light reflected from "flat" pixels, or any flat surfaces under or near the pixels, will travel in different optical paths that those of the image light and the incident beam, and thus will be absorbed by light absorbers not shown in the figure. If the waveplate is not perfect, there will be some residual light of the first polarization in the image light, this light will be in a different path than those of the image light 18 and the incident light 17, and will be absorbed by light absorbers. It will have very little impact on the contrast of the image-combining device 16.

For the transmitted second polarization beam 19b, it exits the transmitting port 13 and is reflected by the mirror 23 towards to the waveplate 31b and the MEM device 30b. It passes through the waveplate 31b which changes the polarization state of the light and is then incident onto the MEM device 30b. The incident light will be reflected back by individual micro-mirrors or pixels of the MEM device at different angles according to the pixels' states: "on" or "off". Images are encoded onto the MEM device by reflecting the incident light at different angles for "on" and "off" pixels. The reflected "on" pixel light beam 20b, also called the second image light beam, is along the normal of the MEM device surface. This light passes through the waveplate 31b again. The waveplate 31b is similar to waveplate 31a and changes the polarization state of the image light into the first polarization. Preferably, the waveplate 31b is a quarter-wave plate, or combinations of waveplates that rotate the polarization state from the first polarization to the second polarization, and vise versa. The image light 20b, is thus reflected by the beam-splitting surface 15 and exits the PBS from the output port 14 as beam 18 shown in FIG. 10A. For the light reflected from the "off" pixels as shown in FIG. 8A, depending on the polarization state of this light and the transmittance and reflectance of the polarizing beam splitter, some or all of the light may pass through the beam-splitting surface 15; or, some or all of the light may be reflected by the beam-splitter surface 15. The "off" pixel beams travel in different directions than those of the image light 18 and incident light 17, and will be absorbed by light absorbers not shown in the figure. For the light reflected from "flat" pixels, or any flat surfaces under or near the pixels, it will travel in different optical paths that those of the image light and the incident beam, and thus will be absorbed by light absorbers not shown in the figure. If the waveplate is not perfect, there will be some residual light in the second polarization in the image light, this light will travel in the direction of 18b, which is different from the image light 18 and the incident light 17, and will be absorbed by light absorbers. It will have very little impact on the contrast of the image-combining device 16.

In the fourth embodiment, as explained above, the polarizing beam-splitter combines the first image light, having the second polarization state, with the second image light, having the first polarization state. The two images can be identical 2D images, or represent left-eye and right-eye images for forming 3D stereoscopic images. The polarizing beam-splitter acts like two polarizers in series for both the image light beams. This is advantageous because any unwanted leakage from the polarizing beam-splitter will be filtered out by the polarizing beam-splitter in the different direction than those of the incident light 17 and the image light 18. As a result, very little cross-talk will exist between the two images with orthogonal polarizations and high quality 3D stereo images can be obtained. Furthermore, the requirement for the contrast ratio of the polarizing beam-splitter can be less strict. Most importantly, all the un-polarized light is used for imaging, no light is lost due to polarization. Thus, the image-combining device is very light efficient.

Figure 10B:
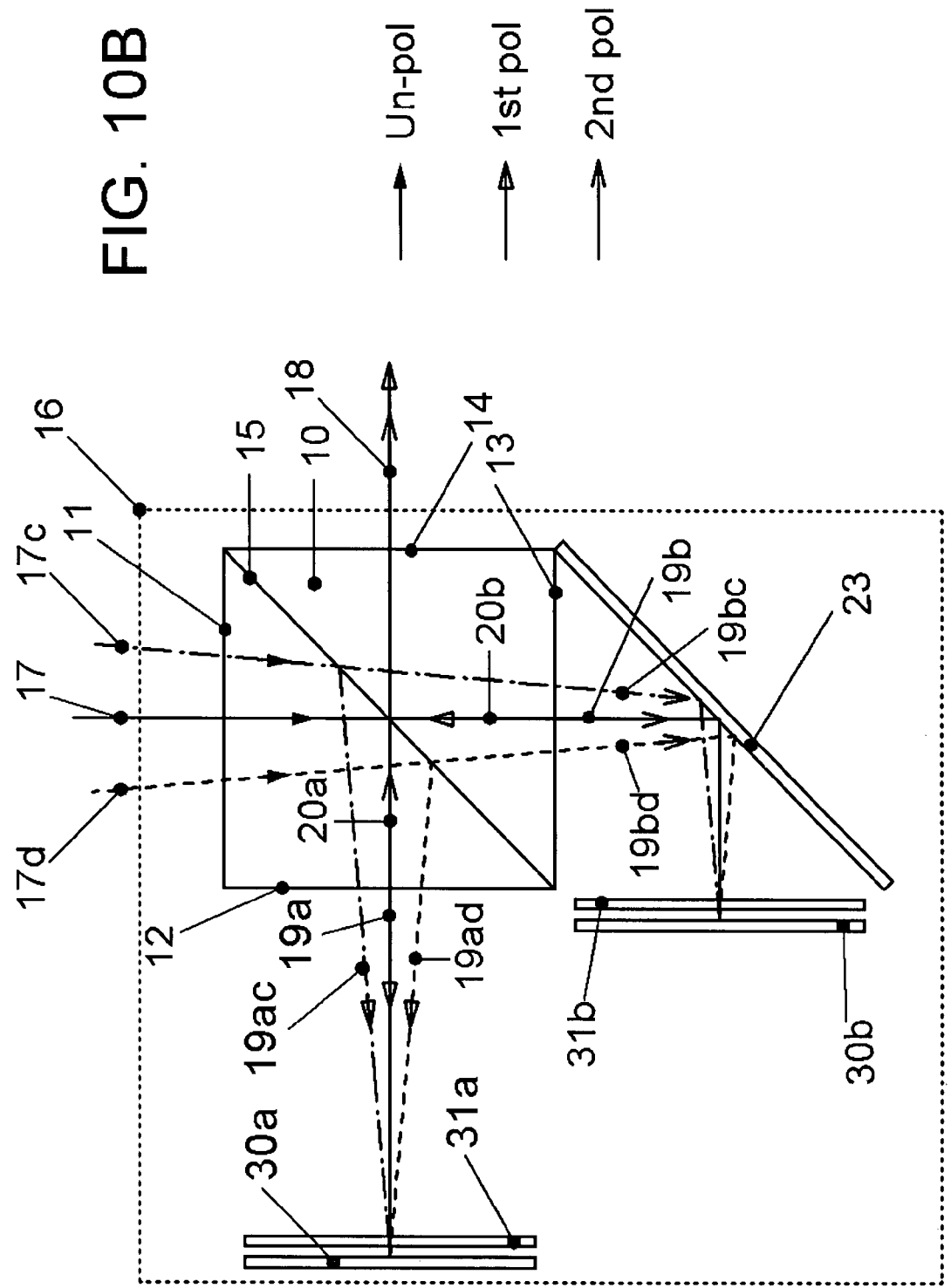
FIG. 10B is a schematic view of an image-combining device having two MEM devices, a polarizing beam-splitter and a plate mirror, positioned differently to FIG. 10A, in the transmitted light path from the PBS in accordance with the present invention.

A variation of the fourth embodiment in accordance with the present invention is shown in FIG. 10B. This variation is similar to the fourth embodiment as shown in FIG. 10A. The only difference between this variation and the embodiment shown in FIG. 10A is that the plate mirror reflects the light to the left of the figure rather than to the right as in FIG. 10A. All the description about the fourth embodiment as shown in FIG. 10A also applies to this variation.

Figure 10C:
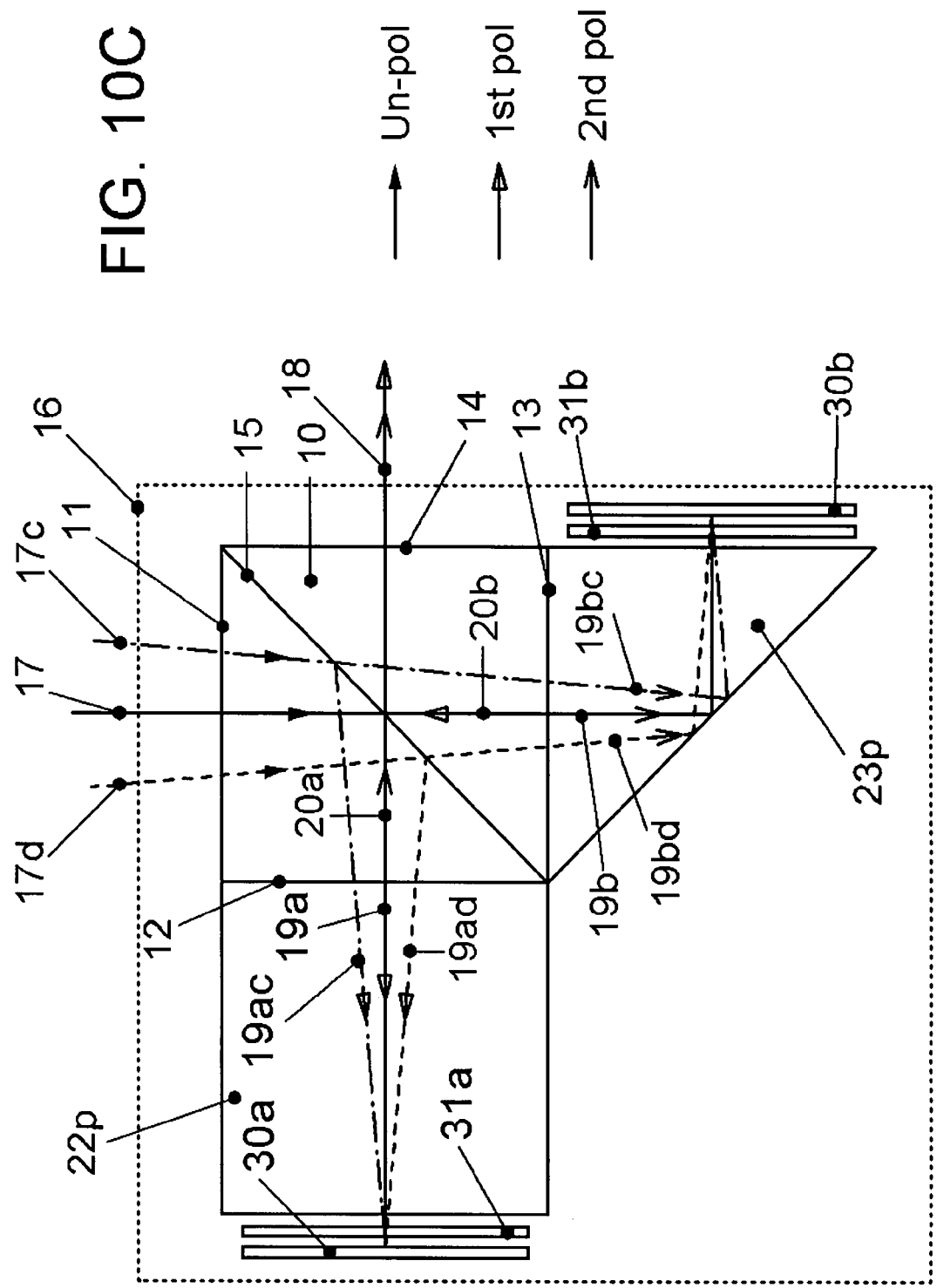
FIG. 10C is a schematic view of an image-combining device having two MEM devices, a polarizing beam-splitter and a prism mirror in the transmitted light path from the PBS in accordance with the present invention.
Figure 10D:
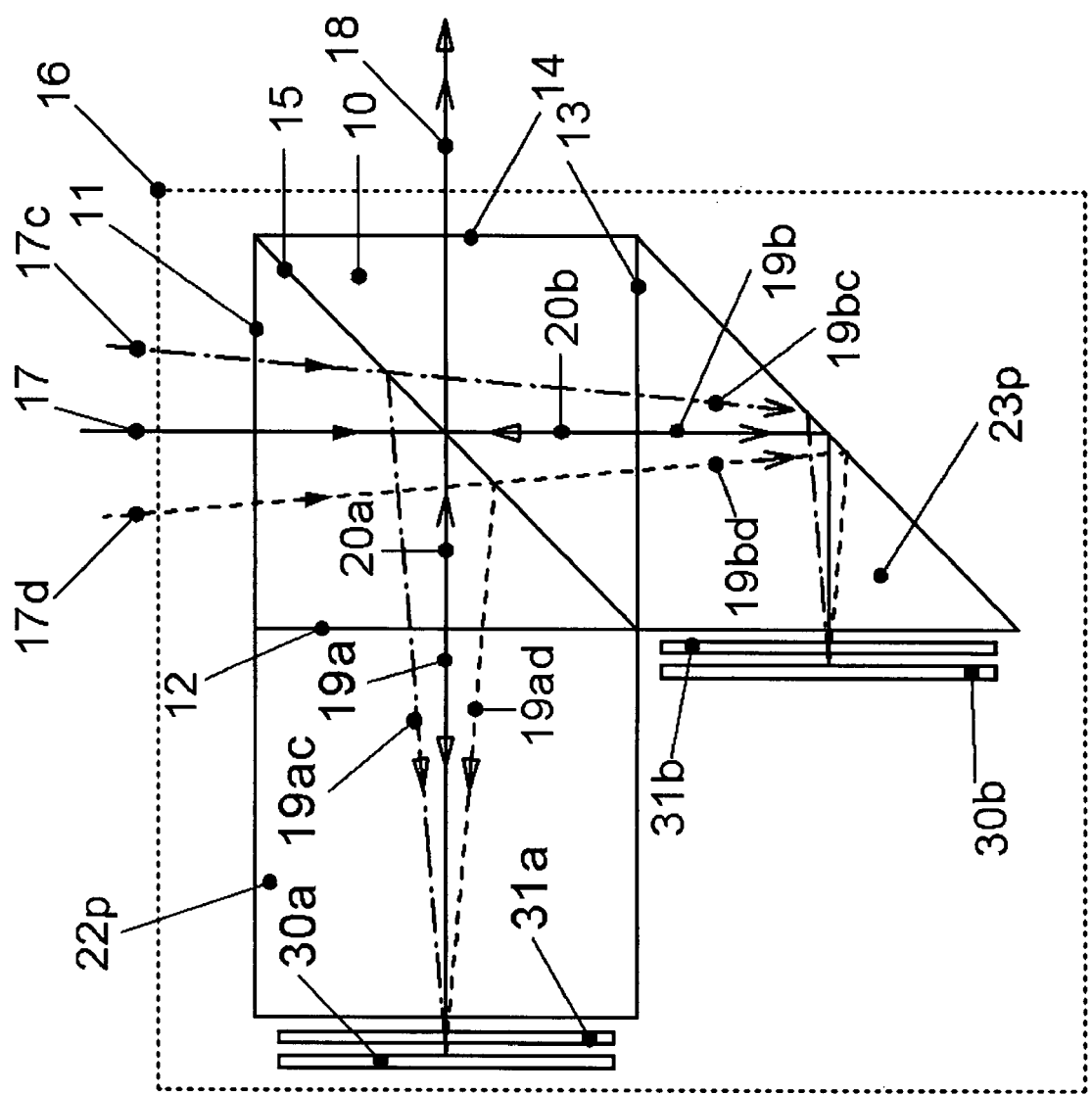
FIG. 10D is a schematic view of an image-combining device having two MEM devices, a polarizing beam-splitter and a prism mirror, positioned differently to FIG. 10C, in the transmitted light path from the PBS in accordance with the present invention.

Yet another variation of the fourth embodiment in accordance with the present invention is shown in FIG. 10C. This variation is similar to the fourth embodiment as shown in FIG. 10A. The only difference between this variation and the embodiment shown in FIG. 10A is that the mirror 23p is in the form of a prism, rather than a plate. To have identical optical path, the transmitted light also has added prism 22p. Further variation of the fourth embodiment in accordance with the present invention is shown in FIG. 10D. This variation is similar to the variation of the fourth embodiment as shown in FIG. 10C, the only difference is that the prism mirror reflects light to the left in the figure rather than to the right as in FIG. 10C.

In the fourth embodiment and its variations, the polarizing beam-splitter operates for angles of incidence around 45° for the central ray. It can be selected from the A, C or D PBS types as described in the preamble. In a Type A PBS, the first and second polarizations are s- and p-polarized, respectively. Type A PBS consists of thin film interference coatings between glass prisms. In a type C or D PBS, the first polarization can be s- or p-polarized, thus the second polarization can be p-polarized or s-polarized, respectively.

In the fourth embodiment and its variations, the different MEM devices and light alignment approaches can be used. Because of the use of mirror 23 or 23p, both the first and second image light beams are reflected once in the optical paths, allowing identical MEM devices of all types can be used for MEM devices 30a and 30b in the present invention. By way of example, the type III alignment approach is shown in dash-dotted lines in FIGS. 10A-10D for the incident beam 17c, the reflected beam 19ac of the first polarization and the transmitted beam 19bc of the second polarization. The type IV alignment approach is shown in dashed lines in FIGS. 10A-10D for the incident beam 17d, the reflected beam 19ad of the first polarization and the transmitted beam 19bd of the second polarization.

Without departing from the present invention, other types of MEM devices, polarization beam-splitters and light alignment approaches can be used as well in the second embodiment and its variations.

Fifth Embodiment

Figure 11A:
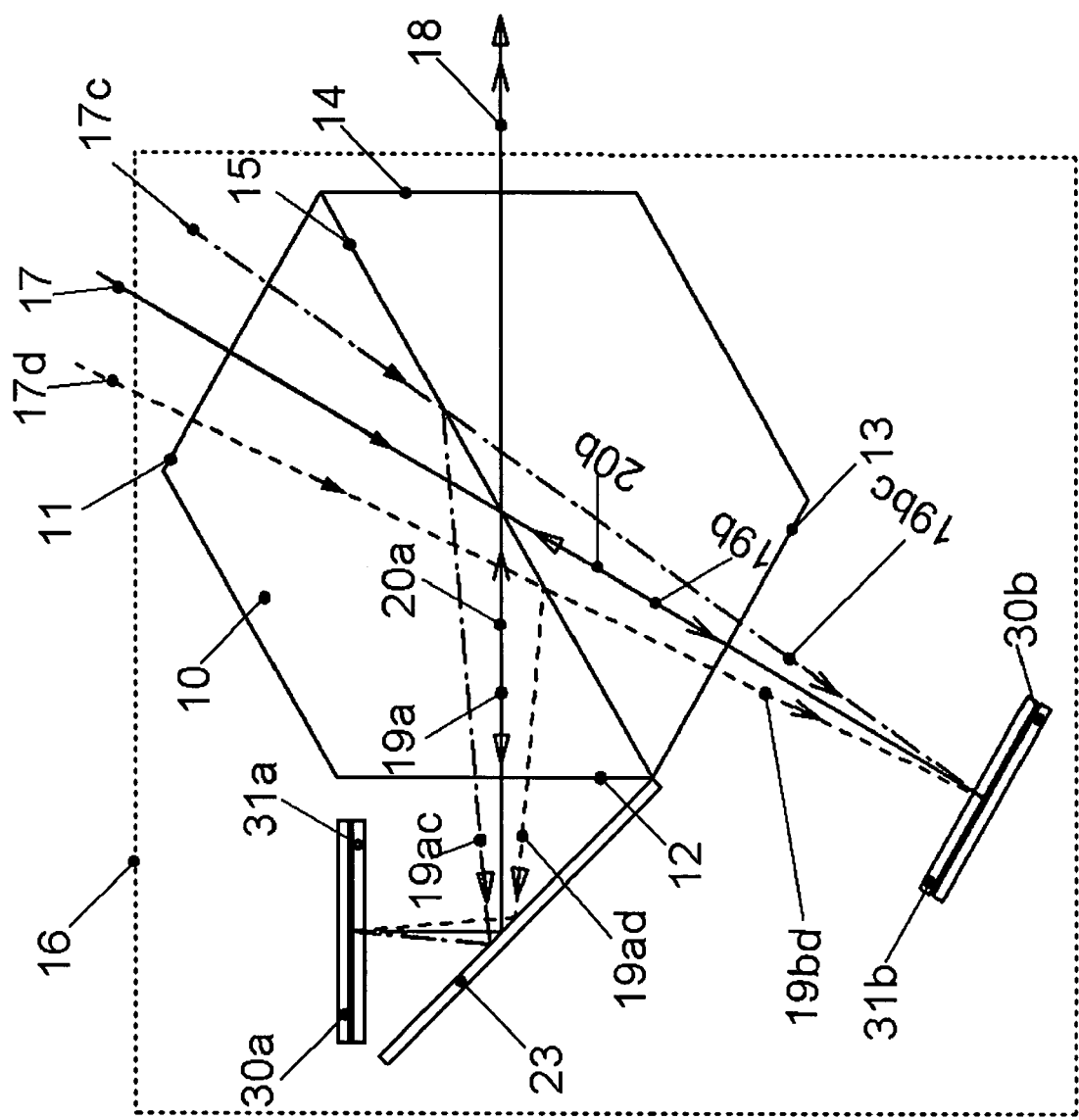
FIG. 11A is a schematic view of an image-combining device having two MEM devices, a polarizing beam-splitter with large angle of incidence and a plate mirror in the reflected light path from the PBS in accordance with the present invention.

The fifth embodiment of an image-combining device 16 in accordance with the present invention is shown in FIG. 11A in a two-dimensional schematic view. It comprises of a polarizing beam-splitter 10 having a beam-splitting surface 15, an incident port 11, reflecting port 12, a transmitting port 13 and an output port 14; a mirror 23 adjacent to the reflecting port 12; a set of a waveplate 31a and a MEM device 30a adjacent to the mirror 23; another set of a waveplate 31b and a MEM device 30b, adjacent to the transmitting port 13. The operation of the second embodiment is explained below.

An un-polarized incident beam 17 from the incident port 11, is incident upon the polarizing beam-splitter 10, the beam-splitting surface 15 separates the incident beam 17 into a reflected light beam 19a of a first polarization and a transmitted light beam 19b of a second polarization as shown in FIG. 11A. The first polarization and the second polarization are orthogonal to each other. In FIG. 11A, the light beams are marked with different arrows according to their polarization states of un-polarized, first polarization and second polarization, respectively.

For the reflected first polarization beam 19a, it exits the reflecting port 12 and then is reflected by the mirror 23 towards the waveplate 31a and the MEM device 30a. The incident light will be reflected back by individual micromirrors or pixels of the MEM device at different angles according to the pixels' states: "on" or "off". Images are encoded onto the MEM device by reflecting the incident light at different angles for "on" and "off" pixels. The reflected "on" pixel light beam 20a, also called the first image light beam, is along the normal of the MEM device surface. It passes through the waveplate 31a, is reflected by the mirror 23 again and enters the PBS at port 12. The waveplate 31a change the polarization state of the image light into the second polarization. Preferably, the waveplate 31a is a quarter-wave plate, or combinations of waveplates that rotate the polarization state from the first polarization to the second polarization, and vise versa. The image light 20a, thus, passes through the beam-splitting surface 15 and exits the PBS from the output port 14 as beam 18 shown in FIG. 11A. For the light reflected from the "off" pixels not shown in the figure, depending on the polarization state of this light and the transmittance and reflectance of the polarizing beam splitter, some or all of the light may pass through the beam-splitting surface; or, some or all of the light may be reflected by the beam-splitter surface 15. The "off" pixel beams travel in different directions than those of the image light 18 and incident light 17, and will be absorbed by light absorbers not shown in the figure. Light reflected from "flat" pixels, or any flat surfaces under or near the pixels, will travel in different optical paths that those of the image light and the incident beam, and thus will be absorbed by light absorbers not shown in the figure. If the waveplate is not perfect, there will be some residual light in the first polarization for the image light, this light will be in a different path than those of the image light 18 and the incident light 17, and will be absorbed by light absorbers. It will have very little impact on the contrast of the image-combining device 16.

For the transmitted second polarization beam 19b, it exits the transmitting port 13 and then passes through the waveplate 31b which changes the polarization state of the light and is then incident onto the MEM device 30b. The incident light will be reflected back by individual micro-mirrors or pixels of the MEM device at different angles according to the pixels' states: "on" or "off". Images are encoded onto the MEM device by reflecting the incident light at different angles for "on" and "off" pixels. The reflected "on" pixel light beam 20b, also called the second image light beam, is along the normal of the MEM device surface. This light passes through the waveplate 31b again. The waveplate 31b is similar to waveplate 31a and changes the polarization state of the image light into the first polarization. Preferably, the waveplate 31b is a quarter-wave plate, or combinations of waveplates that rotate the polarization state from the first polarization to the second polarization, and vise versa. The image light 20b, is thus reflected by the beam-splitting surface 15 and exits the PBS from the output port 14 as beam 18 shown in FIG. 11A. For the light reflected from the "off" pixels as shown in FIG. 8A, depending on the polarization state of this light and the transmittance and reflectance of the polarizing beam splitter, some or all of the light may pass through the beam-splitting surface 15; or, some or all of the light may be reflected by the beam-splitter surface 15. The "off" pixel beams travel in different directions than those of the image light 18 and incident light 17, and will be absorbed by light absorbers not shown in the figure. For the light reflected from "flat" pixels, or any flat surfaces under or near the pixels, it will travel in different optical paths that those of the image light and the incident beam, and thus will be absorbed by light absorbers not shown in the figure. If the waveplate is not perfect, there will be some residual light in the second polarization in the image light, this light will travel in the direction of 18*b* (as shown on FIG. 6A), which is different from the image light 18 and the incident light 17, and will be absorbed by light absorbers. It will have very little impact on the contrast of the image-combining device 16.

In the fifth embodiment, as explained above, the polarizing beam-splitter combines the first image light, having the second polarization state, with the second image light, having the first polarization state. The two images can be identical 2D images, or represent left-eye and right-eye images for forming 3D stereoscopic images. The polarizing beam-splitter acts like two polarizers in series for both the image light beams. This is advantageous because any unwanted leakage from the polarizing beam-splitter will be filtered out by the polarizing beam-splitter in a different direction to those of the incident light 17 and the image light 18. As a result, very little cross-talk will exist between the two images with orthogonal polarizations and high quality 3D stereo images can be obtained. Furthermore, the requirement for the contrast ratio of the polarizing beam-splitter can be less strict. Most importantly, all the un-polarized light is used for imaging, no light is lost due to polarization. Thus, the image-combining device is very light efficient.

Yet another variation of the fifth embodiment in accordance with the present invention is shown in FIG. 11B. This variation is similar to the fifth embodiment as shown in FIG. 11A. The only difference between this variation and the embodiment shown in FIG. 11A is that the mirror 23*p* is in the form of a prism, rather than a plate. To have identical optical path, the transmitted light also has added prism 22*p*.

In the fifth embodiment and its variations, the polarizing beam-splitter operates at angles of incidence greater than 45°. It can be selected from the A, B, C or D PBS types as described in the preamble. In a Type A PBS, the first and second polarizations are s- and p-polarized, respectively. In a Type B PBS, the first and second polarizations are p- and s-polarized, respectively. A and B type PBSs consist of thin film interference coatings between glass prisms. In a type C or D PBS, the first polarization can be s- or p-polarized, thus the second polarization can be p-polarized or s-polarized, respectively.

In the fifth embodiment and its variations, the different MEM devices and light alignment approaches can be used. Because the use of mirror 23 or 23*p*, both the first and second image light beams are reflected once in the optical paths, thus identical MEM devices can be used for MEM devices 30*a* and 30*b* in the present invention. By way of example, the type III alignment approach is shown in dash-dotted lines in FIGS. 11A-11B for the incident beam 17*c*, the reflected beam 19*ac* of the first polarization and the transmitted beam 19*bc* of the second polarization. The type IV alignment approach is shown in dashed lines in FIGS. 11A-11B for the incident beam 17*d*, the reflected beam 19*ad* of the first polarization and the transmitted beam 19*bd* of the second polarization.

Without departing from the present invention, other types of MEM devices, polarization beam-splitters and light alignment approaches can be used as well in the second embodiment and its variations.

Sixth Embodiment

Figure 12A:
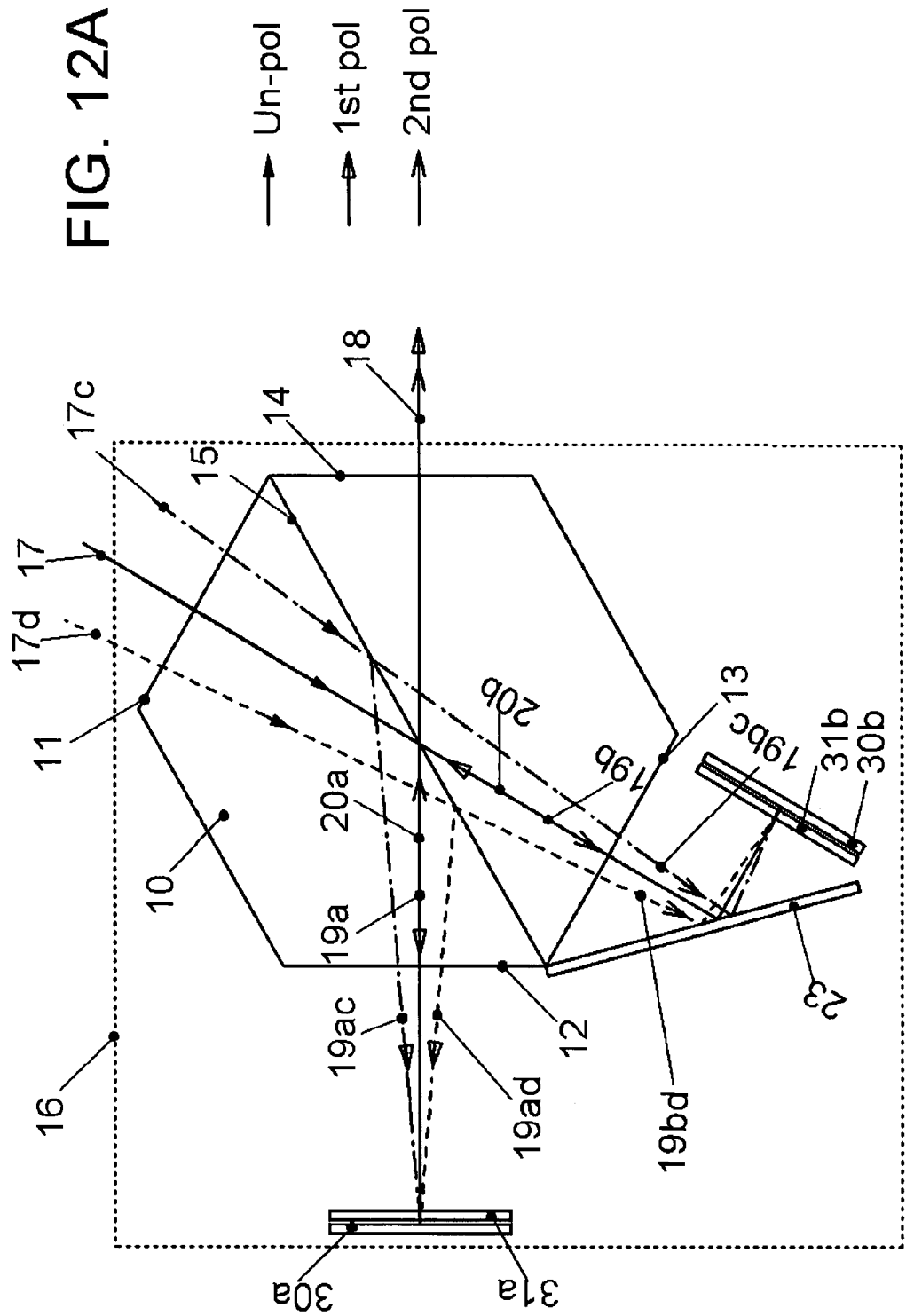
FIG. 12A is a schematic view of an image-combining device having two MEM devices, a polarizing beam-splitter with large angle of incidence and a plate mirror in the transmitted light path from the PBS in accordance with the present invention.

The sixth embodiment of an image-combining device 16 in accordance with the present invention is shown in FIG. 12A in a two-dimensional schematic view. It comprises of a polarizing beam-splitter 10 having a beam-splitting surface 15, an incident port 11, reflecting port 12, a transmitting port 13 and an output port 14; a set of a waveplate 31*b* and a MEM device 30*b* adjacent to the mirror 23; another set of a waveplate 31*a* and a MEM device 30*a*, adjacent to the reflecting port 12; and a mirror 23 adjacent to the transmitting port 13. The operation of the second embodiment is explained below.

An un-polarized incident beam 17 from the incident port 11, is incident upon the polarizing beam-splitter 10, the beam-splitting surface 15 separates the incident beam 17 into a reflected light beam 19*a* of a first polarization and a transmitted light beam 19*b* of a second polarization as shown in FIG. 12A. The first polarization and the second polarization are orthogonal to each other. In FIG. 12A, the light beams are marked with different arrows according to their polarization states of un-polarized, first polarization and second polarization, respectively.

For the reflected first polarization beam 19*a*, it exits the reflecting port 12 and towards the waveplate 31*a* and the MEM device 30*a*. The incident light will be reflected back by individual micro-mirrors or pixels of the MEM device at different angles according to the pixels' states: "on" or "off". Images are encoded onto the MEM device by reflecting the incident light at different angles for "on" and "off" pixels. The reflected "on" pixel light beam 20*a*, also called the first image light beam, is along the normal of the MEM device surface. It passes through the waveplate 31*a* and enters the PBS at port 12. The waveplate 31*a* change the polarization state of the image light into the second polarization. Preferably, the waveplate 31*a* is a quarter-wave plate, or combinations of waveplates that rotate the polarization state from the first polarization to the second polarization, and vise versa. The image light 20*a*, thus, passes through the beam-splitting surface 15 and exits the PBS from the output port 14 as beam 18 shown in FIG. 12A. For the light reflected from the "off" pixels not shown in the figure, depending on the polarization state of this light and the transmittance and reflectance of the polarizing beam splitter, some or all of the light may pass through the beam-splitting surface; or, some or all of the light may be reflected by the beam-splitter surface 15. The "off" pixel beams travel in different directions than those of the image light 18 and incident light 17, and will be absorbed by light absorbers not shown in the figure. Light reflected from "flat" pixels, or any flat surfaces under or near the pixels, will travel in different optical paths that those of the image light and the incident beam, and thus will be absorbed by light absorbers not shown in the figure. If the waveplate is not perfect, there will be some residual light of the first polarization in the image light, this light will be in a different path than those of the image light 18 and the incident light 17, and will be absorbed by light absorbers. It will have very little impact on the contrast of the image-combining device 16.

For the transmitted second polarization beam 19*b*, it exits the transmitting port 13 and is reflected by the mirror 23 towards to the waveplate 31*b* and the MEM device 30*b*. It passes through the waveplate 31*b* which changes the polarization state of the light and is then incident onto the MEM device 30b. The incident light will be reflected back by individual micro-mirrors or pixels of the MEM device at different angles according to the pixels' states: "on" or "off". Images are encoded onto the MEM device by reflecting the incident light at different angles for "on" and "off" pixels. The reflected "on" pixel light beam 20b, also called the second image light beam, is along the normal of the MEM device surface. This light passes through the waveplate 31b again. The waveplate 31b is similar to waveplate 31a and changes the polarization state of the image light into the first polarization. Preferably, the waveplate 31b is a quarter-wave plate, or combinations of waveplates that rotate the polarization state from the first polarization to the second polarization, and vise versa. The image light 20b, is thus reflected by the beam-splitting surface 15 and exits the PBS from the output port 14 as beam 18 shown in FIG. 12A. For the light reflected from the "off" pixels as shown in FIG. 6A, depending on the polarization state of this light and the transmittance and reflectance of the polarizing beam splitter, some or all of the light may pass through the beam-splitting surface 15; or, some or all of the light may be reflected by the beam-splitter surface 15. The "off" pixel beams travel in different directions than those of the image light 18 and incident light 17, and will be absorbed by light absorbers not shown in the figure. For the light reflected from "flat" pixels, or any flat surfaces under or near the pixels, it will travel in different optical paths to those of the image light and the incident beam, and thus will be absorbed by light absorbers not shown in the figure. If the waveplate is not perfect, there will be some residual light in the second polarization in the image light, this light will travel in the direction of 18b, which is different from the image light 18 and the incident light 17, and will be absorbed by light absorbers. It will have very little impact on the contrast of the image-combining device 16.

In the sixth embodiment, as explained above, the polarizing beam-splitter combines the first image light, having the second polarization state, with the second image light, having the first polarization state. The two images can be identical 2D images, or represent left-eye and right-eye images for forming 3D stereoscopic images. The polarizing beam-splitter acts like two polarizers in series for both the image light beams. This is advantageous because any unwanted leakage from the polarizing beam-splitter will be filtered out by the polarizing beam-splitter in the different direction than those of the incident light 17 and the image light 18. As a result, very little cross-talk will exist between the two images with orthogonal polarizations and high quality 3D stereo images can be obtained. Furthermore, the requirement for the contrast ratio of the polarizing beam-splitter can be less strict. Most importantly, all the un-polarized light is used for imaging, no light is lost due to polarization. Thus, the image-combining device is very light efficient.

Figure 12B:
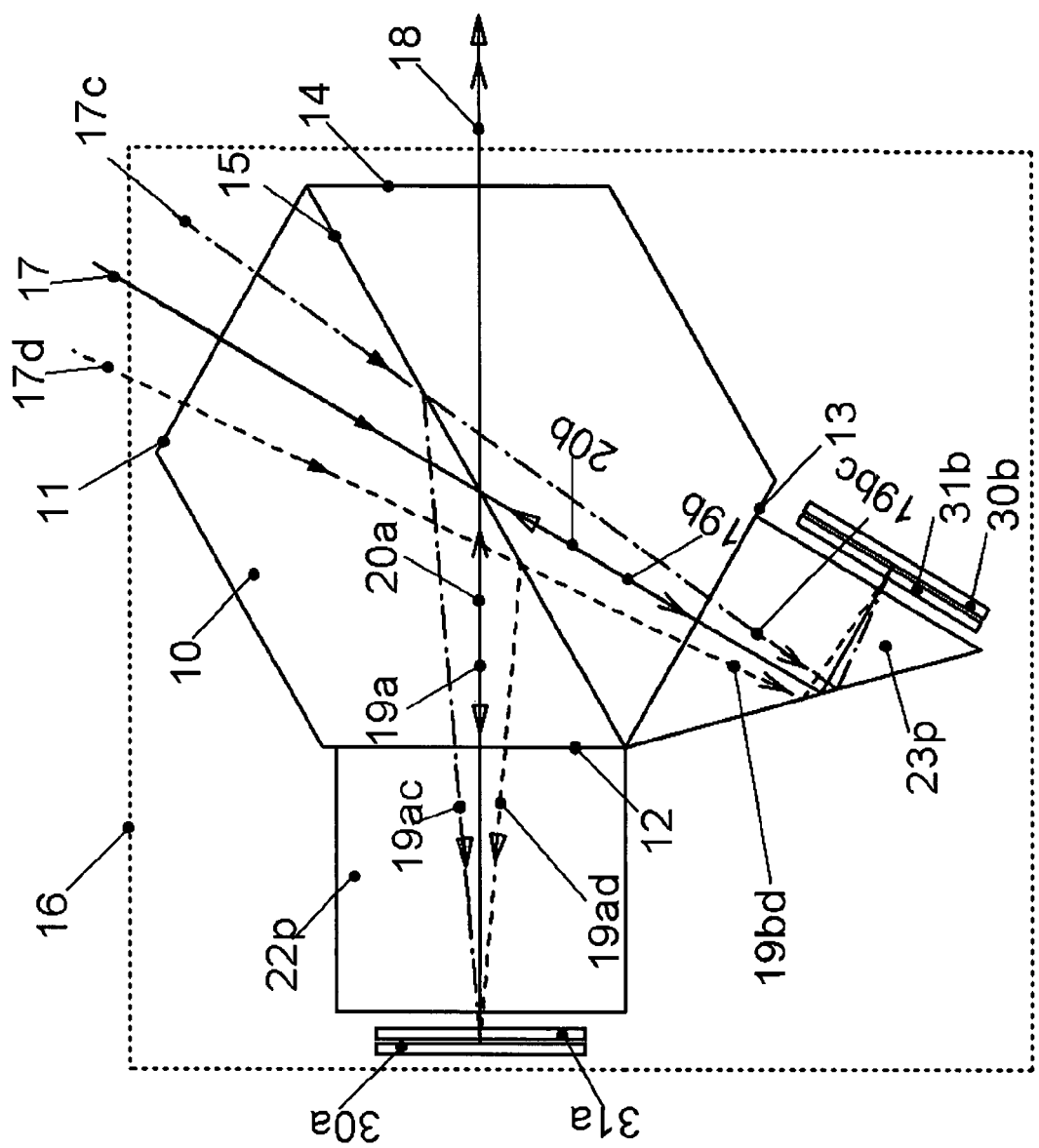
FIG. 12B is a schematic view of an image-combining device having two MEM devices, a polarizing beam-splitter with large angle of incidence and a prism mirror in the transmitted light path from the PBS in accordance with the present invention.

Yet another variation of the sixth embodiment in accordance with the present invention is shown in FIG. 12B. This variation is similar to the sixth embodiment as shown in FIG. 12A. The only difference between this variation and the embodiment shown in FIG. 12A is that the mirror 23p is in the form a prism, rather than a plate. To have identical optical path, the transmitted light also has added prism 22p.

In the sixth embodiment and its variations, the polarizing beam-splitter operates at angles of incidence greater than 45°. It can be selected from the A, B, C or D PBS types as described in the preamble. In a Type A PBS, the first and second polarizations are s- and p-polarized, respectively. In a Type B PBS, the first and second polarizations are p- and s-polarized, respectively. Type A and B PBSs consist of thin film interference coatings between glass prisms. In a type C or D PBS, the first polarization can be s- or p-polarized, thus the second polarization can be p-polarized or s-polarized, respectively.

In the sixth embodiment and its variations, the different MEM devices and light alignment approaches can be used. Because the use of mirror 23 or 23p, both the first and second image light beams are reflected once in the optical paths, thus identical MEM devices can be used for MEM devices 30a and 30b in the present invention. By way of example, the type III alignment approach is shown in dash-dotted lines in FIGS. 12A-12B for the incident beam 17c, the reflected beam 19ac of the first polarization and the transmitted beam 19bc of the second polarization. The type IV alignment approach is shown in dashed lines in FIGS. 12A-12B for the incident beam 17d, the reflected beam 19ad of the first polarization and the transmitted beam 19bd of the second polarization.

Without departing from the present invention, other types of MEM devices, polarization beam-splitters and light alignment approaches can be used as well in the second embodiment and its variations.

Seventh Embodiment

Figure 13A:
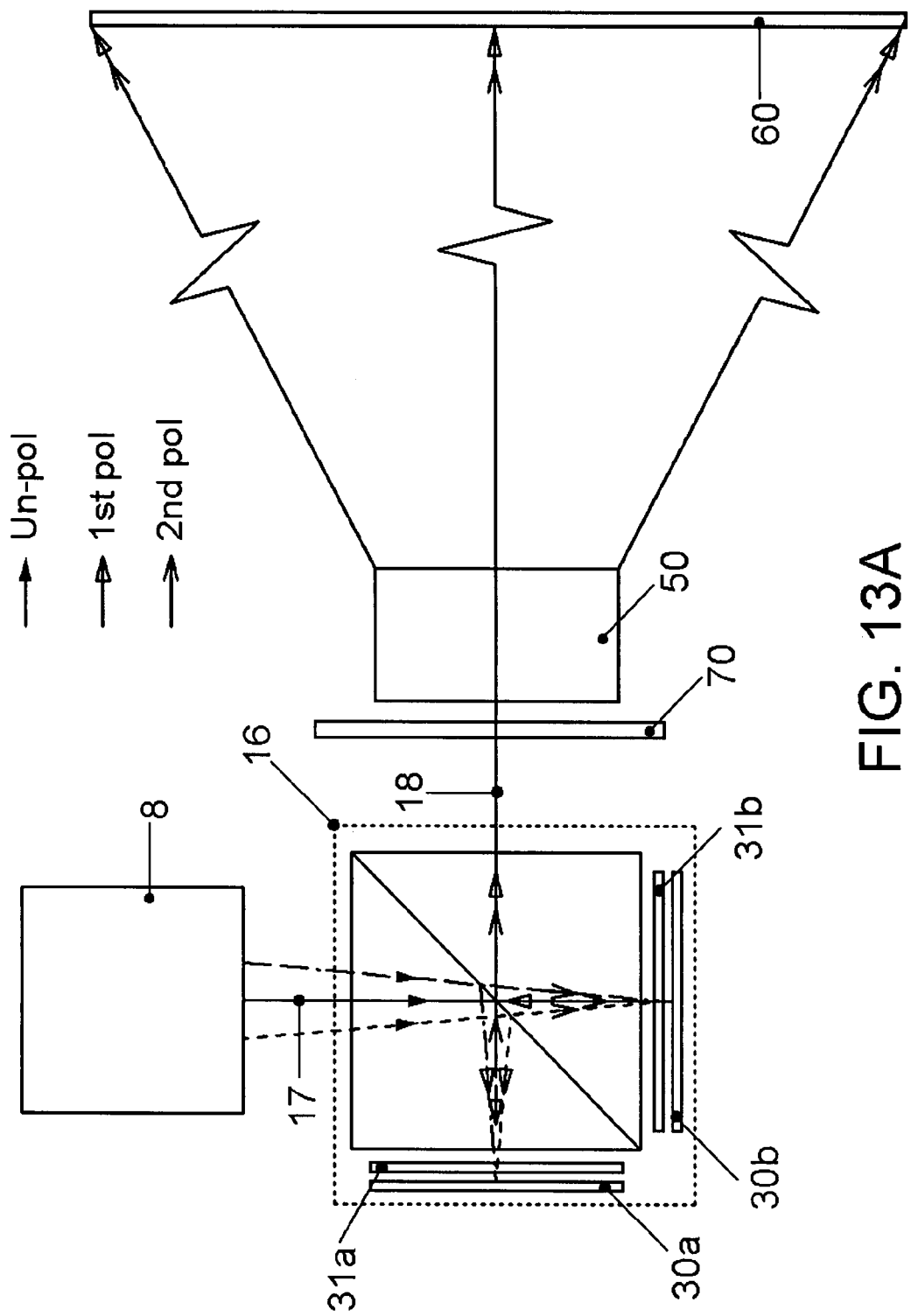
FIG. 13A is a schematic view of an embodiment of the projection display apparatus in accordance with present invention having an image-combining device for forming orthogonal polarized images, an illumination system, a projection lens and a screen.

In accordance with the present invention, a projection display apparatus as shown in FIG. 13A, comprises of an image-combining device 16; an illumination system 10 for directing light to the image-combining device 16; a projection lens 50, an optional waveplate 70 and an optional screen 60.

Figure 13B:
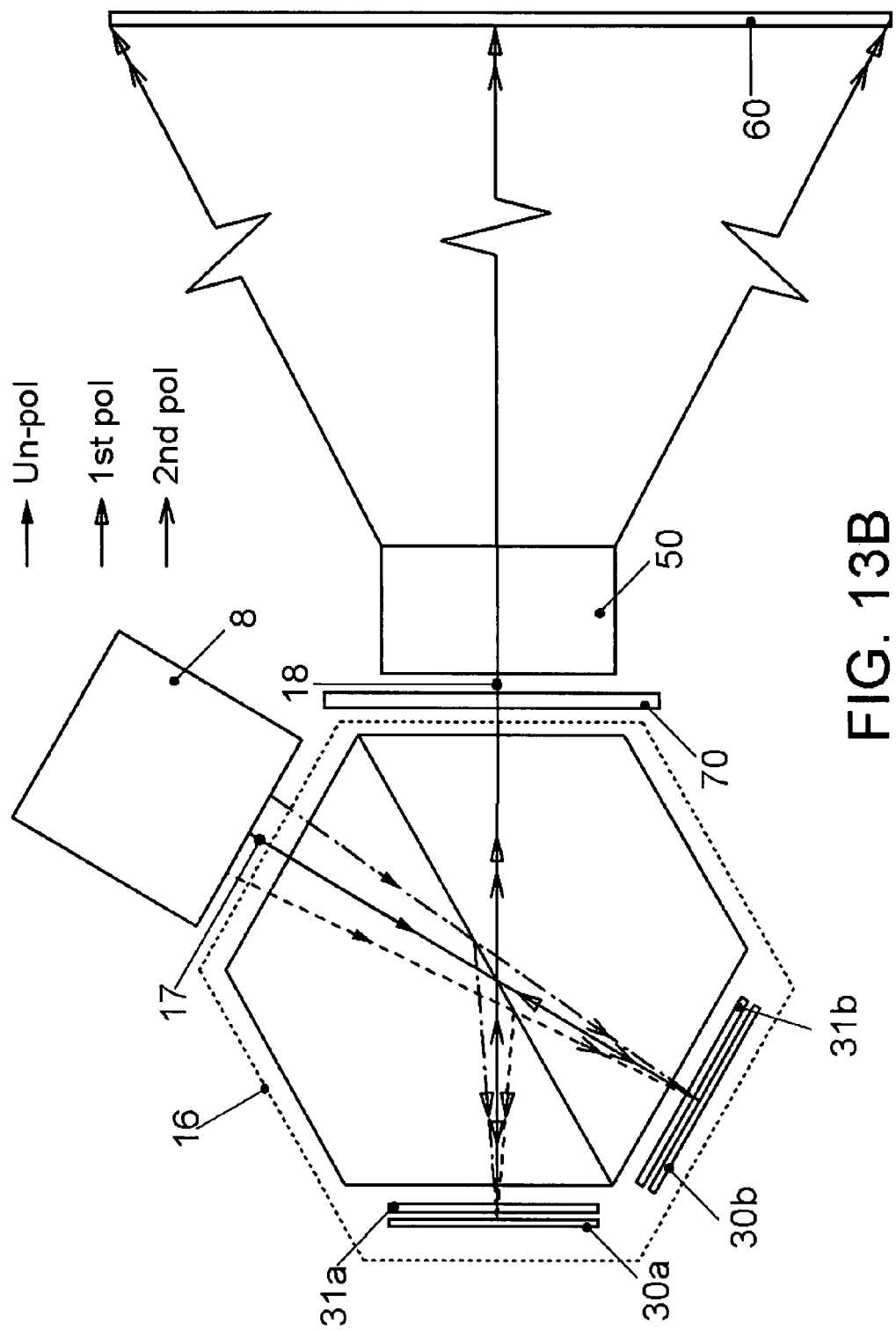
FIG. 13B is a schematic view of a variation of the embodiment in FIG. 13A of the projection display apparatus in accordance with present invention having an image-combining device for forming orthogonal polarized images, an illumination system, a projection lens and a screen.
Figure 13C:
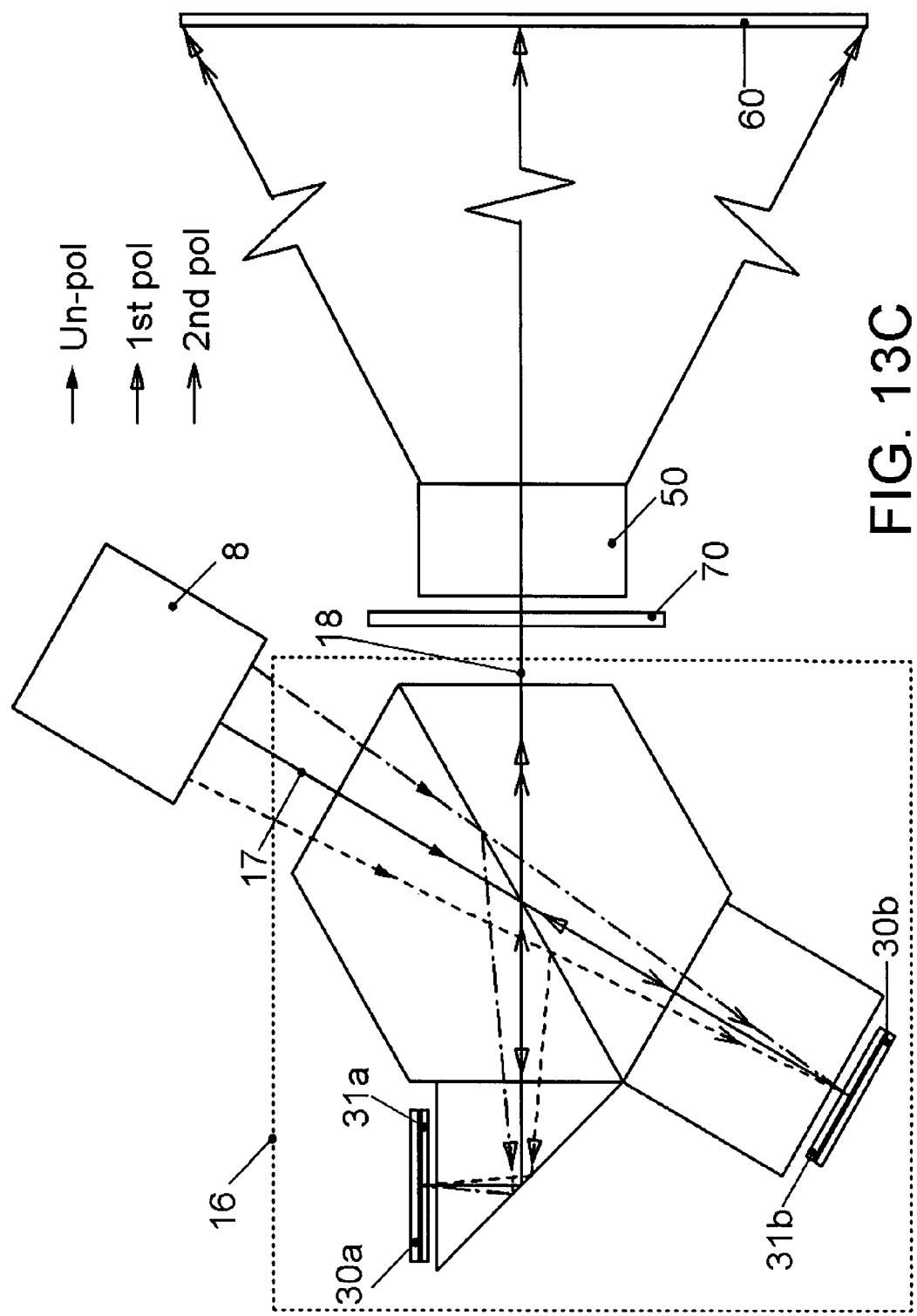
FIG. 13C is a schematic view of another variation of the embodiment in FIG. 13A of the projection display apparatus in accordance with present invention having an image-combining device for forming orthogonal polarized images, an illumination system, a projection lens and a screen.

The image-combining device 16 comprises of a polarizing beam-splitter 10, a set of a MEM device 30a and a waveplate 31a, and another set of MEM device 30b and a waveplate 31b. It can be selected from the above described first, second, third, fourth, fifth and sixth embodiments and their variations which are incorporated therefore. The pair of the MEM devices 30a and 30b can be selected from either M1, M2, M3 or M4 MEM devices or M1, M2, M3 & M4 MEM devices in various combinations. The light alignments between the MEM devices and the polarizing beam-splitters can be alignment II, III and IV, shown as solid, dash-dotted and dashed lines in FIG. 13A-13C. The polarizing beam-splitter can be selected from the type A, B, C or D PBS described in the preamble. In the seventh embodiment as shown in FIG. 13A, the polarizing beam-splitter operates around the 45° angle of incidence. In a different layout of the seventh embodiment as shown in FIG. 13B, the polarizing beam-splitter operates at angles of incidence larger than 45°. In another different layout of the seventh embodiment as shown in FIG. 13C, the polarizing beam-splitter operates at angles of incidence larger than 45° and a mirror reflection is added to the reflected beam path.

When an un-polarized incident beam 17 from the illumination system 10 is incident upon the image combining apparatus 16, the PBS separates the beam into a reflected light beam of the first polarization and a transmitted light beam of the second polarization. The first polarization and the second polarization are orthogonal to each other. For the reflected light beam of the first polarization, it will be reflected back by the MEM device 30a with encoded images and its polarization state is changed from the first polarization to the second polarization. This "on" pixel light, also called the first image light, then passes through the PBS and exits the image combining apparatus as beam 18. The first image light consists of light of the second polarization state.

For the transmitted light beam in the second polarization state, it is directed to the MEM device 30b and the waveplate 31b. The light will be reflected with encoded image by the MEM device 30b and its polarization will be changed from the second polarization to the first polarization. This "on"

pixel light, also called the second image light, is then reflected by the PBS and exits the image combining apparatus as beam 18. The second image light consists of light of the first polarization state.

The combined image light as beam 18, then, passes through the optional waveplate 70, the projection lens 50 and is projected onto the optional screen 60. In a front projector layout of the present invention of the projection display apparatus, the optional screen 60 is separate from the projector. In a rear projector layout of the present invention, such as rear projection TVs, the screen 60 can be an integral part of the projector and additional mirrors may be required between the screen and the projector to reduce the effective back projection length.

In the case where the combined images from the MEM devices 30a and 30b are identical, 2D images are shown on the screen 60, thus, the projection display apparatus works in the 2D display mode. In the case of the images from the MEM devices 30a and 30b representing left-eye and right-eye images, respectively (and vise versa), and if the screen preserves the polarization states of the light, viewers wearing polarizing glasses will be able to see 3D images because the polarizing glasses allow only the correct images to be received by the correct eyes, thus the projection display apparatus works in a 3D display mode. Most importantly, all the un-polarized light is used for imaging, no light is lost due to polarization. Thus, the image-combining device is very light efficient for both 2D and 3D displays.

In the seventh embodiment of the present invention of projection display apparatus, 2D and 3D modes can be switched electronically by feeding 2D images or left- and right-stereoscopic images to the MEM devices 30a and 30b. This feature is advantageous because it allows 3D images to be projected with a single projector with low cost and high performance, unlike in the prior art, where dual projectors are often needed for projecting 3D images. In addition, the projection display apparatus is very light efficient, the only additional loss of light in 3D mode is due to the use of the polarizing glasses by viewers. The left- and right-eye images as output from the image combining elements 16 are orthogonally linearly polarized. Orthogonally polarized and linearly polarized filters are used in the polarizing glasses usually used to view in 3D. However, if the viewer tilts his or her head while viewing, left- and right-eye image cross-talk can be introduced. To minimize any discomfort due to the tilting of a viewers' head and the corresponding rotation of the linearly polarized filter glasses, the optional waveplate 70 can be installed either before or after the projection lens to convert the first and second polarization linear polarized light to the left- and right-circular polarized light respectively, or verse visa. Viewers can wear a pair of circular polarizing glasses and will then be able to view the 3D images without introducing left- and right-eye image cross-talk when their head is tilted.

In the seventh embodiment of a projection display apparatus, to form full colour images, a time sequential colour scheme is used. The illumination system 10 provides different primary colours at different times, such as red, green and blue time-sequential colour. This can be done using a colour filter wheel with a white light source, or using pulsed red, green and blue light sources such as light emitting diodes or lasers. Preferably, a colour recovery scheme is used in the illumination system, such as the one described in U.S. Pat. No. 6,771,325, to recover some un-used colour light. In this case, the PBS must work for a broadband of wavelength in the visible from 420-680 nm as well as over a wide angular field which depends on the particular arrangement used for alignment as well as the apertures of the illuminating system and the projection system.

In the seventh embodiment of the present invention, the polarizing beam-splitter provides the function of a TIR prism to separate the illumination light from the imaging light. The physical separation between the illumination light and the image light is much larger in the present invention than that of the common TIR prism and micro-mirror arrangement, thus, better image quality can be obtained in the present invention. In addition, unlike in prior art which use a TIR prism, large aperture optics, greater than the limitation imposed by the tilting angle of the MEM devices can be used, allowing more light to be used for imaging. Furthermore, because light from "off" pixels is out of the projection lens, thus high contrast displays can be obtained, unlike in prior art in 3D displays with liquid crystal on silicon (LCOSs) panels. In addition, the polarizing beam-splitter does not have to have very high contrast because the polarizing beam-splitter acts like two polarizers in series for both the image light beams. Any unwanted leakage from the polarizing beam-splitter will be filtered out by the polarizing beam-splitter in the different direction than those of the incident light 17 and the image light 18. As a result, very little cross-talk will exist between the two images with orthogonal polarizations and high quality 3D stereo images can be obtained.

Without departing from the spirit of the present invention, other embodiments of the present invention of a projection display apparatus can be used.

Eighth Embodiment

Figure 14A:
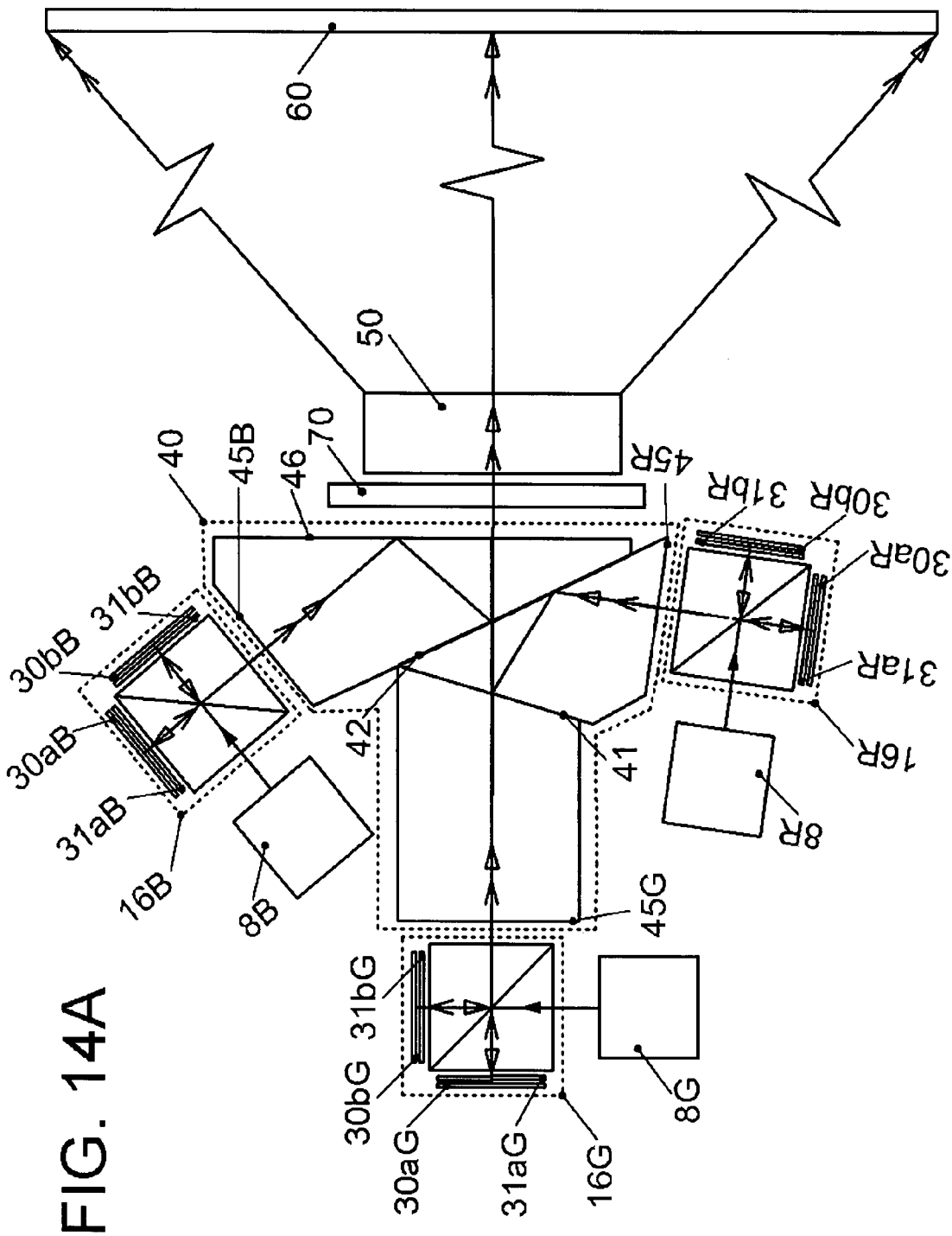
FIG. 14A is a schematic view of an embodiment of the projection display apparatus in accordance with present invention having three image-combining devices for forming images with orthogonal polarized light, three illumination systems, a Philip prism for combing colour images, a projection lens and a screen.

In accordance with the present invention, a projection display apparatus, as shown in FIG. 14A, comprise of three image-combining devices 16R, 16G and 16B; three illumination systems 8R, 8G and 8B for directing different colour light to the three image-combining devices 16R, 16G and 16B, respectively; a colour combining device 40 for combining colour images from the three image-combining devices 16R, 16G and 16B; a projection lens 50, an optional waveplate 70 and an optional screen 60.

Figure 14B:
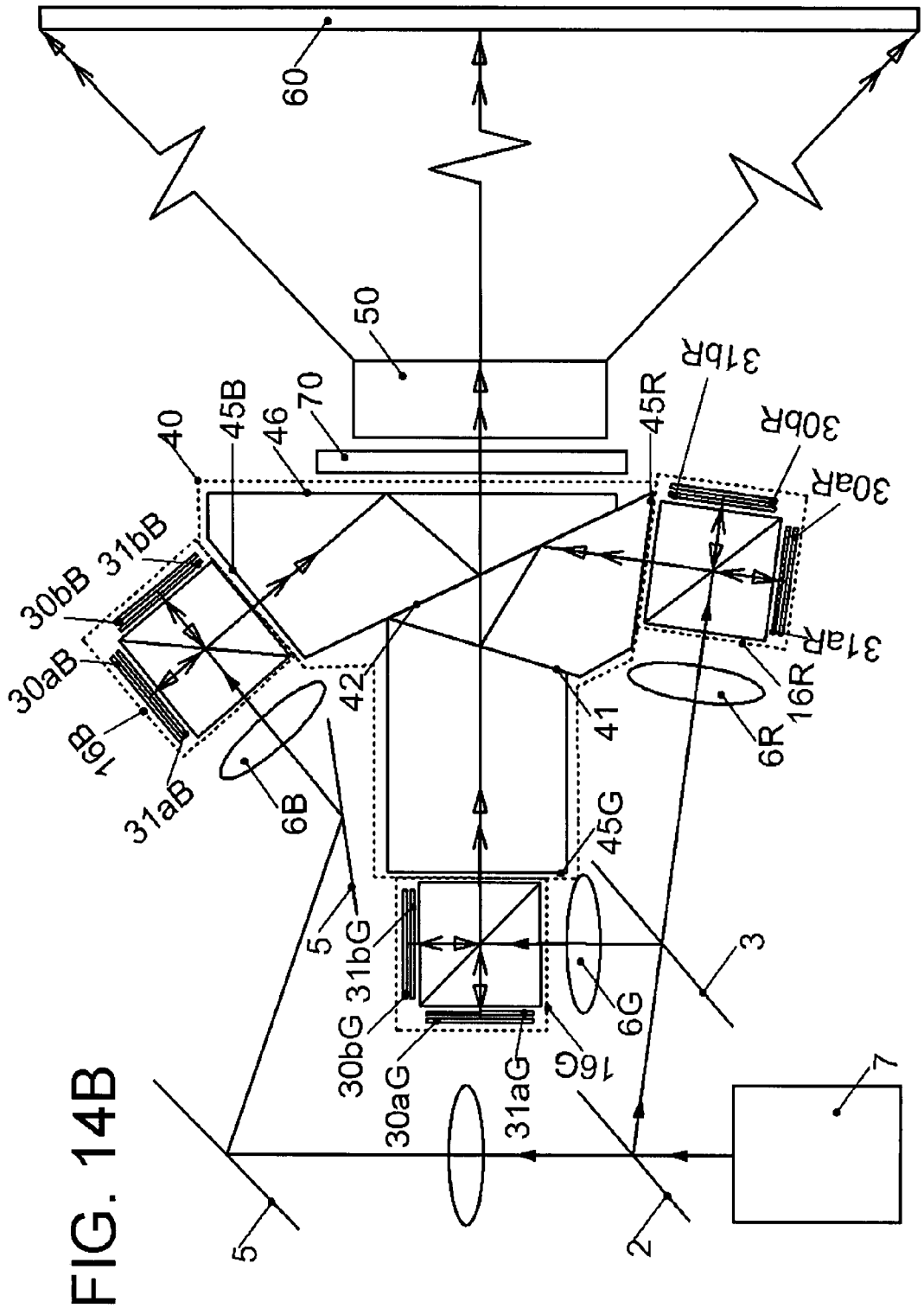
FIG. 14B is a schematic view of a variation of the embodiment in FIG. 14A of the projection display apparatus in accordance with present invention having three image-combining devices for forming images with orthogonal polarized light, a white light source with dichroic filters and plural mirrors, a Philips prism for combing colour images, a projection lens and a screen.

The three illumination systems provide un-polarized three primary color lights C1, C2 and C3 to the three image-combining devices. C1, C2 and C3 can be red, green and blue light, respectively, to cover the full visible spectrum. As an example, the illumination system 8R can provide C1 light to the image-combining device 16R; 8G provides C2 light to the image-combining device 16G; and 8B provides C3 light to the image-combining device 16B. The illumination systems 8R, 8G and 8B can each have a colour light source, such as a colour light emitting diode light source or a colour laser light source. Alternatively, a white light source 7 can be used as shown in FIG. 14B. In this case, the white light will be separated into three colour lights C1, C2 and C3 by using dichroic filters 2 and 3. The three light colours C1, C2 and C3 are then delivered to the three image-combining device 16R, 16G and 16B with lens and mirrors.

The image-combining device 16R comprises of a polarizing beam-splitter, a set of a MEM device 30aR and a waveplate 31aR, and another set of MEM device 30bR and a waveplate 31bR. The image-combining device 16G comprises of a polarizing beam-splitter, a set of a MEM device 30aG and a waveplate 31aG, and another set of MEM device 30bG and a waveplate 31bG. The image-combining device 16B comprises of a polarizing beam-splitter, a set of a MEM device 30aB and a waveplate 31aB, and another set of MEM device 30bB and a waveplate 31bB. The image-combining device 16R, 16G and 16B can be selected from the above described first, second, third, fourth, fifth and sixth embodiments and their variations which are incorporated therefore. The MEM devices 30aR, 30aG, 30aB and 30bR, 30bG and 30bB can be selected from either M1, M2, M3 or M4 MEM devices or M1, M2, M3 & M4 MEM devices in various combinations. The light alignments between the MEM devices and the polarizing beam-splitters can be alignment II, III and IV. The polarizing beam-splitter 10R, 10G and 10B can be selected from the type A, B, C or D PBS described in the preamble. The polarizing beam-splitter reflects light of a first polarization and transmits light of a second polarization. The first polarization and the second polarization are orthogonal to each other. In the eighth embodiment as shown in FIG. 14A, the polarizing beam-splitter operates around the 45° angle of incidence. Other angles of incidence can be used as well.

Figure 14C:
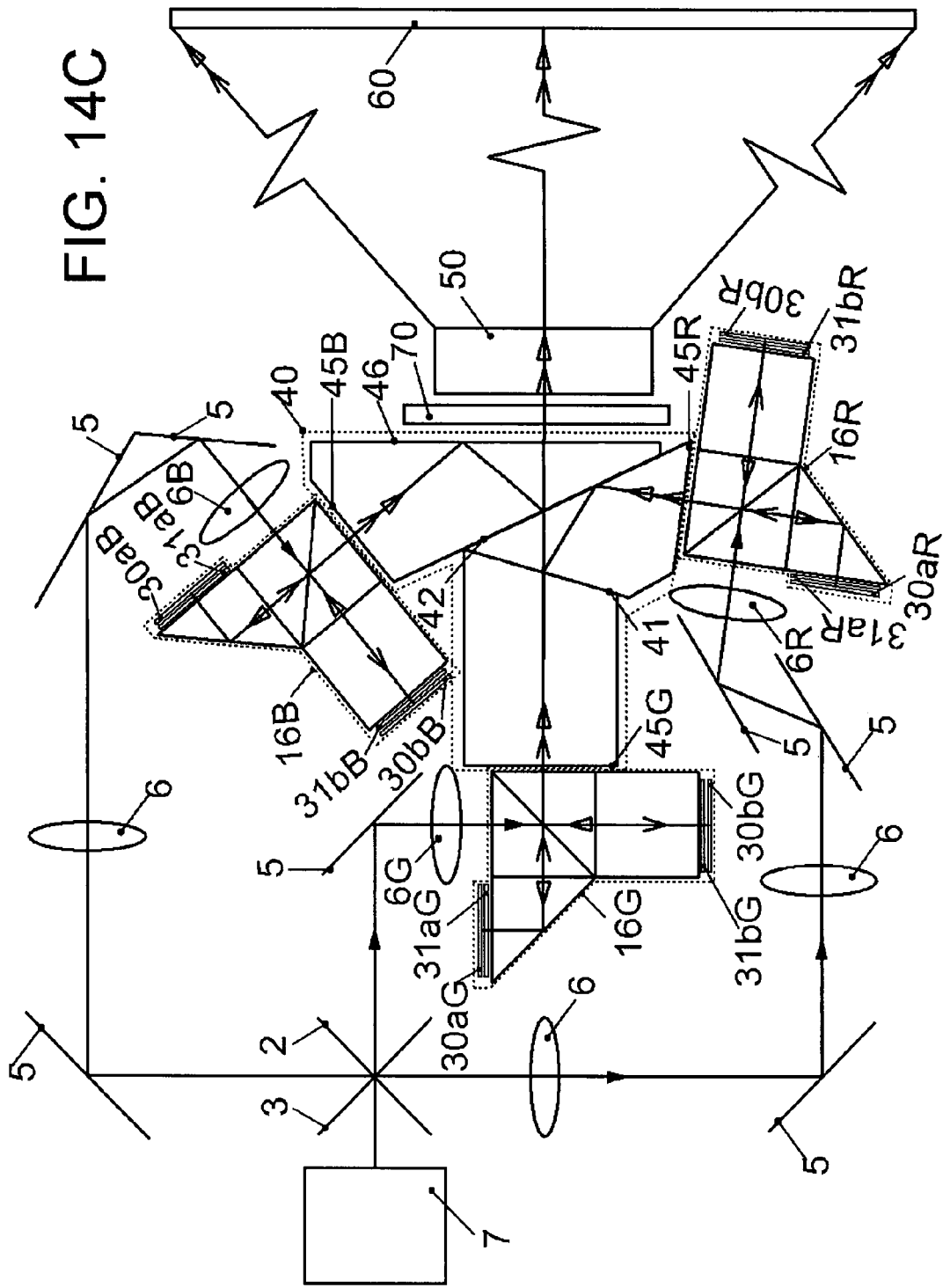
FIG. 14C is a schematic view of a variation of the embodiment in FIG. 14A of the projection display apparatus in accordance with present invention having three image-combining devices for forming images with orthogonal polarized light with an additional mirror in the reflected beam within the image-combining devices, a Philips prism for combing colour images, an illumination system with a white light source and mirror and lens, a projection display apparatus and a screen.

A variation of the present invention of a projection display apparatus is shown in FIG. 14C in which three image-combining devices are selected following the third embodiment of an image-combining device and also, a white light source 7 is used. In this case, the white light will be separated into three colour lights C1, C2 and C3 by using dichroic filters 2 and 3. The three light colours C1, C2 and C3 are then delivered to the three image-combining device 16R, 16G and 16B with lens and mirrors.

The image-combining device 16R combines a first and a second C1 colour image light. The first C1 image light is from the MEM device 30aR and is in the second polarization and the second C1 image light is from the MEM device 30bR and is in the first polarization. The image-combining device 16G combines two C2 colour image light beams. The first C2 image light is from the MEM device 30aG and is in the second polarization and the second C2 image light is from the MEM device 30bG and is in the first polarization. The image-combining device 16B combines two C3 colour image light beams. The first C3 image light is from the MEM device 30aB and is in the second polarization and the second C3 image light is from the MEM device 30bB and is in the first polarization. The first and second polarizations are orthogonal to each other.

The colour-combining device 40 is used to combine the three colours C1, C2 and C3 images from the image-combining device 16R, 16G and 16B to form full colour images. The colour-combining device 40 can be a Philips prism as shown in FIG. 14A or an x-cube as shown in FIG. 14D. The colour-combining device 40 has two color coatings 41 and 42; three input ports 45R, 45G and 45B; an output port 46. The colour coating 41 can transmit C2 light and reflect C1 light and the colour coating 42 can transmit C1 and C2 and reflect C3 light. C1, C2 and C3 can be red, green and blue, or blue, green and red, respectively. The output ports of the image-combining device 16R, 16G and 16B are aligned with the input ports 45R, 45G and 45B of the colour-combining device 40, respectively. Thus, the colour-combining device combines three colour images from the three colour forming devices and forms a full colour image light as shown as 18 in FIG. 14A. The combined full colour image light as beam 18, then, passes through the optional waveplate 70, the projection lens 50 and is projected onto the optional screen 60. In a front projector layout of the present invention of the projection display apparatus, the optional screen 60 is separate from the projector. In a rear projector layout of the present invention, such as rear projection TVs, the screen 60 can be an integral part of the projector and additional mirrors may be required between the screen and the projector to reduce the effective back projection length.

In the case where the two C1 colour images from MEM devices 30aR and 30bR with orthogonal polarizations, the two C2 colour images from MEM devices 30aG and 30bG with orthogonal polarizations, and the two C3 colour images from MEM devices 30aB and 30bB with orthogonal polarizations are identical, then full colour 2D images are shown on the screen 60, thus, the projection display apparatus works in the 2D display mode. In the case where the colour images in the second polarization from the MEM devices 30aR, 30aG and 30aB, represent full colour right-eye images, and the colour images in the first polarization from the MEM devices 30bR, 30bG and 30bB, represent full colour left-eye images, or vice-versa, and if the screen preserves the polarization states of the light, viewers wearing polarizing glasses will be able to see 3D images because the polarizing glasses allow only the correct images to be seen by the correct eyes, thus the projection display apparatus works in a 3D display mode.

In the eight embodiment of the present invention of a projection display apparatus, 2D and 3D modes can be switched electronically be feeding 2D images or left- and right-stereoscopic images to the MEM devices 30aR, 30aG and 30aB, and 30bR, 30bG and 30bB. This feature is advantageous because it allows 3D images to be projected with a single projector with low cost and high performance, unlike in the prior art, where dual projectors are often needed for projecting 3D images. In addition, the projection display apparatus is very light efficient, the only loss of light in 3D mode is due to the use of the polarizing glasses by viewers. To minimize any discomfort due to the tilting of the viewers' head, the optional waveplate 70 can be installed either before or after the projection lens to convert the first and second polarization linear polarized light to the left- and right-circular polarized light respectively, or verse visa. Viewers can wear a pair of circular polarizing glasses and will then be able to view the 3D images with low left-eye/right-eye image cross-talk while tilting their head from side to side.

In the eighth embodiment of the present invention, the polarizing beam-splitter provides the function of a TIR prism to separate the illumination light from the imaging light. The physical separation between the illumination light and the imaging light is much larger in the present invention than that of the TIR prism, thus, better image quality can be obtained in the present invention. In addition, unlike in prior art which uses a TIR prism, large aperture optics, greater than the limitation imposed by the deflection angle α of the MEM devices can be used, allowing more light to be used for imaging. Furthermore, because light from "off" pixels is out of the projection lens, high contrast displays can be obtained, unlike in prior art in 3D displays with liquid crystal on silicon (LCOSs) panels. In addition, the polarizing beam-splitter does not have to be very high contrast because the polarizing beam-splitter acts like two polarizers in series for both the image light beams. Any unwanted leakage from the polarizing beam-splitter will be filtered out by the polarizing beam-splitter in a different direction than those of the incident light 17 and the image light 18. As a result, very little cross-talk will exist between the two images with orthogonal polarizations and high quality 3D stereo images can be obtained. Most importantly, all the un-polarized light is used for imaging, no light is lost due to polarization. Thus, the image-combining device is very light efficient for both 2D and 3D displays.

Without departing from the spirit of the present invention, other embodiments of the present invention of a projection display apparatus can be used.

I claim:

1. A projection display apparatus comprising:
   first and second reflective light modulators for receiving incident light beams and impressing first and second images on corresponding returned light beams, each of said first and second reflective light modulators having light reflective pixel elements pivotal about respective rotation axes that are aligned in an alignment direction;
   a polarizing beam splitter having a beam splitting surface reflecting incident light in a first polarization as a reflected beam and transmitting incident light in a second polarization as a transmitted beam, a first port for receiving an incident light beam having said first and second polarizations, second and third ports for directing said reflected and transmitted beams toward said respective first and second reflective light modulators, said second and third ports also receiving first and second returned beams reflected by said respective first and second light modulators carrying said respective first and second images, and a fourth port for outputting a combined image beam comprising said first and second returned beams for projection onto a display screen;
   a first waveplate, placed between said second port of said polarizing beam-splitter and said first reflective light modulator, for converting light of said first polarization to said second polarization, whereby said reflected beam from said first reflective light modulator has said second polarization after passing through said first waveplate; and
   a second waveplate placed between said third port of said polarizing beam-splitter and said second reflective light modulator for converting light of said second polarization to said first polarization, whereby said reflected beam from said second reflective light modulator has said first polarization after passing through said second waveplate; and
   wherein said polarizing beam splitter has an incident plane defined by the normal of said beam splitting surface and said returned light beams carrying said impressed first and second images at said beam splitting surface;
   wherein said first and second light modulators are aligned so that the corresponding alignment directions of said first and second said light modulators are projected on to said fourth port as a common alignment direction;
   wherein said incident plane and said common alignment direction form an angle $\gamma$; and
   wherein said polarizing beam-splitter and said first and second reflective light modulators are oriented such that the angle $\gamma$ is $0° \leq \gamma \leq 45°$.

2. A projection display apparatus as claimed in claim 1, wherein said reflective light modulators are micro-electro-mechanical mirror arrays.

3. A projection display apparatus as claimed in claim 2, wherein said polarizing beam splitter is selected from the group consisting of: the type employing thin film interference and the type employing thin film interference and frustrated total internal reflection.

4. A projection display apparatus as claimed in claim 3, wherein said first and second images are selected from the group consisting of: identical two-dimensional images in a 2D display mode and left- and right-eye images in a stereoscopic 3D display mode.

5. A projection display apparatus as claimed in claim 2, wherein said second reflective light modulator is selected such that the rotation axes of the pixel elements are mirror images of the rotation axes of the pixel elements of said first reflective light modulator.

6. A projection display apparatus as claimed in claim 2, wherein said first and second reflective light modulator comprise micromirrors arranged as a rectangular panel, and the rotation axes of said micromirrors are oriented vertically with respect to said panel.

7. A projection display apparatus as claimed in claim 1, wherein a plate mirror is located between said first reflective light modulator and said second port of said polarizing beam-splitter.

8. A projection display apparatus as claimed in claim 1, wherein a plate mirror is located between said second reflective light modulator and said third port of said polarizing beam-splitter.

9. A projection display apparatus as claimed in claim 1, wherein a prism mirror is located between said first reflective light modulator and said second port of said polarizing beam-splitter, and a matching prism is located between said second reflective light modulator and said third port of said polarizing beam-splitter.

10. A projection display apparatus as claimed in claim 1, wherein a prism mirror is located between said second reflective light modulator and said third port of said polarizing beam-splitter and a matching prism is located between said first reflective light modulator and said second port of said polarizing beam-splitter.

11. A projection display apparatus as claimed in claim 7, wherein said first and second reflective light modulators are identical to each other.

12. A projection display apparatus as claimed claim 1, wherein the alignment of said first and second light modulators is such that the projections of the corresponding pixel elements of each light modulator onto said fourth port are coincident to permit the image from each light modulator to be projected onto said display screen as a common image.

13. A projection display apparatus as claimed in claim 1, wherein a waveplate is located downstream of the fourth port of said polarizing beam-splitter to convert the polarization states of said returned light beams having said impressed first and second images from linear polarized states to circular polarized states.

14. A projection display apparatus comprising:
   a) at least two subsystems, each subsystem processing light of a different color and comprising:
      (i) first and second reflective light modulators for receiving incident light beams and impressing first and second images on corresponding returned light beams; and
      (ii) a polarizing beam splitter having a beam splitting surface reflecting incident light in a first polarization as a reflected beam and transmitting incident light in a second polarization as a transmitted beam, a first port for receiving an incident light beam having said first and second polarizations, second and third ports for directing said reflected and transmitted beams toward said respective first and second reflective light modulators, said second and third ports also receiving first and second returned beams reflected by said respective first and second light modulators carrying said respective first and second images, and a fourth port for outputting a combined image beam comprising said first and second returned beams for projection onto a display screen;
      (iii) a first waveplate, placed between said second port of said polarizing beam-splitter and said first reflective light modulator, for converting light of said first polarization to said second polarization, whereby said reflected beam from said first reflective light modulator has said second polarization after passing through said first waveplate;

(iv) a second waveplate placed between said third port of said polarizing beam-splitter and said second reflective light modulator for converting light of said second polarization to said first polarization, whereby said reflected beam from said second reflective light modulator has said first polarization after passing through said second waveplate; and b) a color combiner for combining the output beams of the respective subsystems into a common output beam containing more than one color for projection onto a display screen.

15. A projection display system as claimed in claim 14, wherein said light modulators are micro-electro-mechanical mirror arrays.

16. A projection display system as claimed in claim 14, comprising three said subsystems, each corresponding to a primary color, wherein said display system provides full color projection images.

17. A projection display system as claimed in claim 14, wherein said color combiner comprises a Philips prism.

18. A projection display system as claimed in claim 14, wherein said color combiner comprises an X cube.

19. A projection display system as claimed in claim 14, wherein the polarizing beam splitter associated with each subsystem is in the shape of a cube and is associated with a respective light source having a color corresponding to the color processed by that subsystem.

20. A projection display apparatus as claimed in claim 14, wherein said polarizing beam splitter in each said subsystem is selected from the group consisting of: the type employing thin film interference and the type employing thin film interference and frustrated total internal reflection.

21. A projection display apparatus as claimed in claim 14, wherein said first and second images in each said subsystem are selected from the group consisting of: identical two-dimensional images in a 2D display mode and left- and right-eye images in a stereoscopic 3D display mode.

22. A projection display apparatus as claimed in claim 14, wherein in each said subsystem each of said first and second reflective light modulators have light reflective pixel elements pivotal about respective rotation axes that are aligned in an alignment direction, said polarizing beam splitter has an incident plane defined by the normal of said beam splitting surface and said returned light beams having said impressed first and second images at said beam splitting surface, said first and second light modulators are aligned so that the corresponding alignment directions of said first and second said light modulators are projected on to said fourth port as a common alignment direction; said incident plane and said common alignment direction form an angle γ; and said polarizing beam-splitter and said first and second reflective light modulators are oriented such that the angle γ is $0° \leq \gamma \leq 45°$.

23. A projection display apparatus as claimed in claim 14, comprising a common broadband light source, a beam splitter arrangement for directing respective incident beams from said broadband source into each said subsystem, and a color filter in each said incident beam for transmitting to the associated subsystem the color associated with that subsystem.

24. A projection display apparatus as claimed in claim 14, comprising a separate light source associated with each said subsystem.

25. A projection display apparatus as claimed in claim 14, wherein a waveplate is located downstream of the fourth port of said polarizing beam-splitter to convert the polarization states of said returned light beams having said impressed first and second images from linear polarized states to circular polarized states.

26. A projection display apparatus comprising:

a) at least three subsystems, each subsystem processing light of a different color and comprising:

(i) first and second reflective light modulators for receiving incident light beams and impressing first and second images on corresponding returned light beams, each of said first and second reflective light modulators having light reflective pixel elements pivotal about respective rotation axes that are aligned in an alignment direction;

(ii) a polarizing beam splitter having a beam splitting surface reflecting incident light in a first polarization as a reflected beam and transmitting incident light in a second polarization as a transmitted beam, a first port for receiving an incident light beam having said first and second polarizations, second and third ports for directing said reflected and transmitted beams toward said respective first and second reflective light modulators, said second and third ports also receiving first and second returned beams reflected by said respective first and second light modulators carrying said respective first and second images, and a fourth port for outputting a combined image beam comprising said first and second returned beams for projection onto a display screen;

(iii) a first waveplate, placed between said second port of said polarizing beam-splitter and said first reflective light modulator, for converting light of said first polarization to said second polarization, whereby said reflected beam from said first reflective light modulator has said second polarization after passing through said first waveplate; and (iv) a second waveplate placed between said third port of said polarizing beam-splitter and said second reflective light modulator for converting light of said second polarization to said first polarization, whereby said reflected beam from said second reflective light modulator has said first polarization after passing through said second waveplate; and (v) wherein said polarizing beam splitter has an incident plane defined by the normal of said beam splitting surface and said returned light beams having said impressed first and second images at said beam splitting surface;

(vi) wherein said first and second light modulators are aligned so that the corresponding alignment directions of said first and second said light modulators are projected on to said fourth port as a common alignment direction;

(vii) wherein said incident plane and said common alignment direction form an angle γ; and (vii) wherein said polarizing beam-splitter and said first and second reflective light modulators are oriented such that the angle γ is $0° \leq \gamma \leq 45°$; and b) a color combiner for combining the output beams of the respective subsystems into a common output beam containing said at least three colors for projection onto a display screen to provide a full color display.

27. A projection display apparatus as claimed in claim 26, wherein said reflective light modulators are micro-electro-mechanical mirror arrays.

28. A projection display apparatus as claimed in claim 26, wherein said first and second images in each said subsystem are selected from the group consisting of: identical two-dimensional images in a 2D display mode and left- and right-eye images in a stereoscopic 3D display mode.

29. A projection display apparatus as claimed in claim 26, wherein said polarizing beam splitter is selected from the group consisting of the type employing thin film interference and the type employing thin film interference and frustrated total internal reflection.

30. A projection display apparatus as claimed in claim 26, wherein a waveplate is located downstream of the fourth port of said polarizing beam-splitter to convert the polarization states of said returned light beams having said impressed first and second images from linear polarized states to circular polarized states.

* * * * *